United States Patent
Miyasaka et al.

(10) Patent No.: US 9,939,561 B2
(45) Date of Patent: Apr. 10, 2018

(54) PROJECTOR HAVING DIFFUSER

(71) Applicant: ASAHI GLASS COMPANY, LIMITED, Tokyo (JP)

(72) Inventors: Koji Miyasaka, Tokyo (JP); Shuichi Yamashita, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 60 days.

(21) Appl. No.: 14/750,770

(22) Filed: Jun. 25, 2015

(65) Prior Publication Data

US 2015/0293271 A1 Oct. 15, 2015

Related U.S. Application Data

(63) Continuation of application No. PCT/JP2013/084693, filed on Dec. 25, 2013.

(30) Foreign Application Priority Data

Dec. 28, 2012 (JP) .................................. 2012-287196
Jul. 9, 2013 (JP) .................................. 2013-143561
(Continued)

(51) Int. Cl.
*G02B 5/02* (2006.01)
*H04N 9/31* (2006.01)
(Continued)

(52) U.S. Cl.
CPC ......... *G02B 5/0221* (2013.01); *G02B 3/0037* (2013.01); *G02B 5/02* (2013.01);
(Continued)

(58) Field of Classification Search
CPC .. G02B 5/0221; G02B 3/0037; G02B 5/0278; G02B 5/0231; G02B 5/2026;
(Continued)

(56) References Cited

U.S. PATENT DOCUMENTS 5,771,328 A * 6/1998 Wortman .................. F21V 5/02
349/62
6,130,777 A * 10/2000 Yamashita ....... B29D 11/00278
359/456
(Continued)

FOREIGN PATENT DOCUMENTS

CN 1573582 A 2/2005
CN 1603908 A 4/2005
(Continued)

OTHER PUBLICATIONS

International Search Report dated Apr. 1, 2014 in PCT/JP2013/084693, filed Dec. 25, 2013.
(Continued)

*Primary Examiner* — Bao-Luan Le
(74) *Attorney, Agent, or Firm* — Oblon, McClelland, Maier & Neustadt, L.L.P.

(57) ABSTRACT

An optical device includes a base material including a surface on which multiple concaves are formed. The concaves include respective curved surfaces. The concaves are formed so that the bottoms of the concaves are at two or more different positions in a depth direction. In the optical device, $\frac{2}{7} \leq |(n1-n2) \times \Delta d|/\lambda \leq 10$ holds, where n1 is the refractive index of the base material, n2 is the refractive index of a medium around the concaves, $\lambda$ is the wavelength of a beam flux that enters the base material, and $\Delta d$ is a range of the positions of the bottoms in the depth direction.

24 Claims, 56 Drawing Sheets

(30) Foreign Application Priority Data

Aug. 12, 2013 (JP) .................................. 2013-167565
Sep. 12, 2013 (JP) .................................. 2013-189364

(51) Int. Cl.

| | | |
|---|---|---|
| G02B 3/00 | (2006.01) | |
| G03B 21/00 | (2006.01) | |
| G03B 21/20 | (2006.01) | |
| G03B 33/06 | (2006.01) | |
| G03B 33/12 | (2006.01) | |

(52) U.S. Cl.

CPC .......... *G02B 5/0215* (2013.01); *G02B 5/0226* (2013.01); *G02B 5/0231* (2013.01); *G02B 5/0268* (2013.01); *G02B 5/0278* (2013.01); *G03B 21/005* (2013.01); *G03B 21/208* (2013.01); *G03B 21/2033* (2013.01); *H04N 9/3152* (2013.01); *G03B 21/204* (2013.01); *G03B 33/06* (2013.01); *G03B 33/12* (2013.01)

(58) Field of Classification Search

CPC ........ G02B 5/0215; G02B 5/021; G02B 5/02; G03B 21/208; G03B 21/2033; G03B 21/14

See application file for complete search history.

(56) References Cited

U.S. PATENT DOCUMENTS

| | | | |
|---|---|---|---|
| 7,033,736 B2 | 4/2006 | Morris et al. | |
| 7,123,324 B2* | 10/2006 | Yoshii | G02B 5/0215 349/113 |
| 7,370,972 B2* | 5/2008 | Morikawa | G02F 1/0136 348/201 |
| 7,510,308 B2* | 3/2009 | Goto | G02B 3/0056 362/330 |
| 7,609,746 B2* | 10/2009 | Yamauchi | G03B 33/12 372/102 |
| 7,819,543 B2* | 10/2010 | Yamagishi | G02B 5/0215 349/61 |
| 7,901,086 B2* | 3/2011 | Ripoll | G02B 26/008 348/268 |
| 7,929,211 B2* | 4/2011 | Chuang | G02B 5/0221 359/619 |
| 8,334,937 B2* | 12/2012 | Kaise | H04N 9/3108 349/8 |
| 8,351,119 B2* | 1/2013 | Yang | G02B 5/0221 359/599 |
| 8,405,804 B2* | 3/2013 | Watanabe | G02B 5/0215 349/112 |
| 8,493,660 B2* | 7/2013 | Furui | G02B 1/11 359/580 |
| 8,503,082 B2* | 8/2013 | Ehnes | G02B 5/0221 359/620 |
| 8,547,639 B2* | 10/2013 | Watanabe | G02B 1/105 359/599 |
| 8,888,333 B2* | 11/2014 | Yapel | G02B 5/0221 359/536 |
| 8,917,452 B2* | 12/2014 | Ohashi | G02B 5/0221 359/599 |
| 9,140,829 B2* | 9/2015 | Park | G02B 5/0221 |
| 9,304,232 B2* | 4/2016 | Chen | G02B 3/0056 |
| 2002/0034710 A1* | 3/2002 | Morris | G02B 3/0043 430/321 |
| 2003/0039036 A1 | 2/2003 | Kruschwitz et al. | |
| 2004/0130790 A1 | 7/2004 | Sales | |
| 2004/0211753 A1* | 10/2004 | Shimizu | G02B 3/0025 216/26 |
| 2005/0083456 A1 | 4/2005 | Yoshii | |
| 2005/0168817 A1 | 8/2005 | Yamashita et al. | |
| 2005/0248702 A1 | 11/2005 | Hoshino | |
| 2005/0280752 A1* | 12/2005 | Kim | G02B 5/0221 349/62 |
| 2006/0078190 A1 | 4/2006 | Shibata et al. | |
| 2006/0227293 A1* | 10/2006 | Kasazumi | G02B 5/0221 353/30 |
| 2007/0070303 A1* | 3/2007 | Yonekubo | G03B 21/16 353/94 |
| 2007/0127245 A1* | 6/2007 | Magarill | G02B 27/0927 362/291 |
| 2007/0153235 A1* | 7/2007 | Morikawa | G02F 1/0136 353/20 |
| 2007/0171671 A1* | 7/2007 | Kurokawa | B32B 3/30 362/606 |
| 2007/0230179 A1* | 10/2007 | Ripoll | G02B 26/008 362/277 |
| 2007/0274075 A1 | 11/2007 | Nagamune | |
| 2008/0068716 A1* | 3/2008 | Goto | G02B 3/0056 359/599 |
| 2008/0074892 A1* | 3/2008 | Chuang | G02B 5/0221 362/355 |
| 2008/0165401 A1 | 7/2008 | Kasazumi | |
| 2008/0187012 A1* | 8/2008 | Yamauchi | G03B 33/12 372/26 |
| 2009/0161033 A1* | 6/2009 | Kaise | H04N 9/3108 349/8 |
| 2009/0161346 A1* | 6/2009 | Ahn | G02B 5/0221 362/97.2 |
| 2009/0225533 A1* | 9/2009 | Yamagishi | G02B 5/0215 362/97.2 |
| 2009/0296406 A1* | 12/2009 | Teng | G02B 5/0221 362/309 |
| 2010/0053565 A1 | 3/2010 | Mizushima et al. | |
| 2010/0134733 A1* | 6/2010 | Watanabe | B29D 11/00798 349/112 |
| 2010/0177398 A1* | 7/2010 | Watanabe | G02B 1/105 359/614 |
| 2010/0195311 A1* | 8/2010 | Furui | G02B 1/11 362/97.1 |
| 2010/0201894 A1 | 8/2010 | Nakayama et al. | |
| 2010/0265739 A1* | 10/2010 | Funabashi | G02B 5/0221 362/618 |
| 2011/0032623 A1* | 2/2011 | Ehnes | G02B 5/0221 359/625 |
| 2011/0176213 A1* | 7/2011 | Yang | G02B 5/0231 359/586 |
| 2011/0249337 A1* | 10/2011 | Ohashi | G02B 5/0221 359/599 |
| 2012/0008341 A1* | 1/2012 | Park | G02B 5/0221 362/622 |
| 2012/0147334 A1 | 6/2012 | Mizushima et al. | |
| 2012/0147593 A1* | 6/2012 | Yapel | G02B 5/0221 362/97.1 |
| 2012/0182529 A1 | 7/2012 | Otani | |
| 2012/0242961 A1* | 9/2012 | Miura | G02B 27/0961 353/38 |
| 2014/0071695 A1* | 3/2014 | Chen | G02B 3/0056 362/311.02 |

FOREIGN PATENT DOCUMENTS

| | | |
|---|---|---|
| CN | 1696802 A | 11/2005 |
| CN | 102483565 A | 5/2012 |
| JP | 2-198265 | 8/1990 |
| JP | 10-209414 A | 8/1998 |
| JP | 2002-014211 A | 1/2002 |
| JP | 2003-098476 A | 4/2003 |
| JP | 2004-287373 A | 10/2004 |
| JP | 2005-114772 A | 4/2005 |
| JP | 2005-321610 A | 11/2005 |
| JP | 2006-500621 A | 1/2006 |
| JP | 2006-98156 A | 4/2006 |
| JP | 2007-233371 A | 9/2007 |
| JP | 2010-181862 A | 8/2010 |
| JP | 2012-145804 A | 8/2012 |
| JP | 2012-159823 A | 8/2012 |
| JP | 2012-212099 A | 11/2012 |
| WO | WO 2005/008330 A1 | 1/2005 |
| WO | WO 2005/062114 A1 | 7/2005 |

(56) References Cited

FOREIGN PATENT DOCUMENTS

| WO | WO 2006/090681 A1 | 8/2006 |
| WO | WO 2008/114502 A1 | 9/2008 |
| WO | WO 2009/142015 A1 | 11/2009 |

OTHER PUBLICATIONS

Haixin Zhu, et al. "Characterization of deep wet etching of fused silica glass for single cell and optical sensor deposition", Journal of Micromechanics and Microengineering, 19 (2009) 065013, pp. 1-8, May 20, 2009.

\* cited by examiner

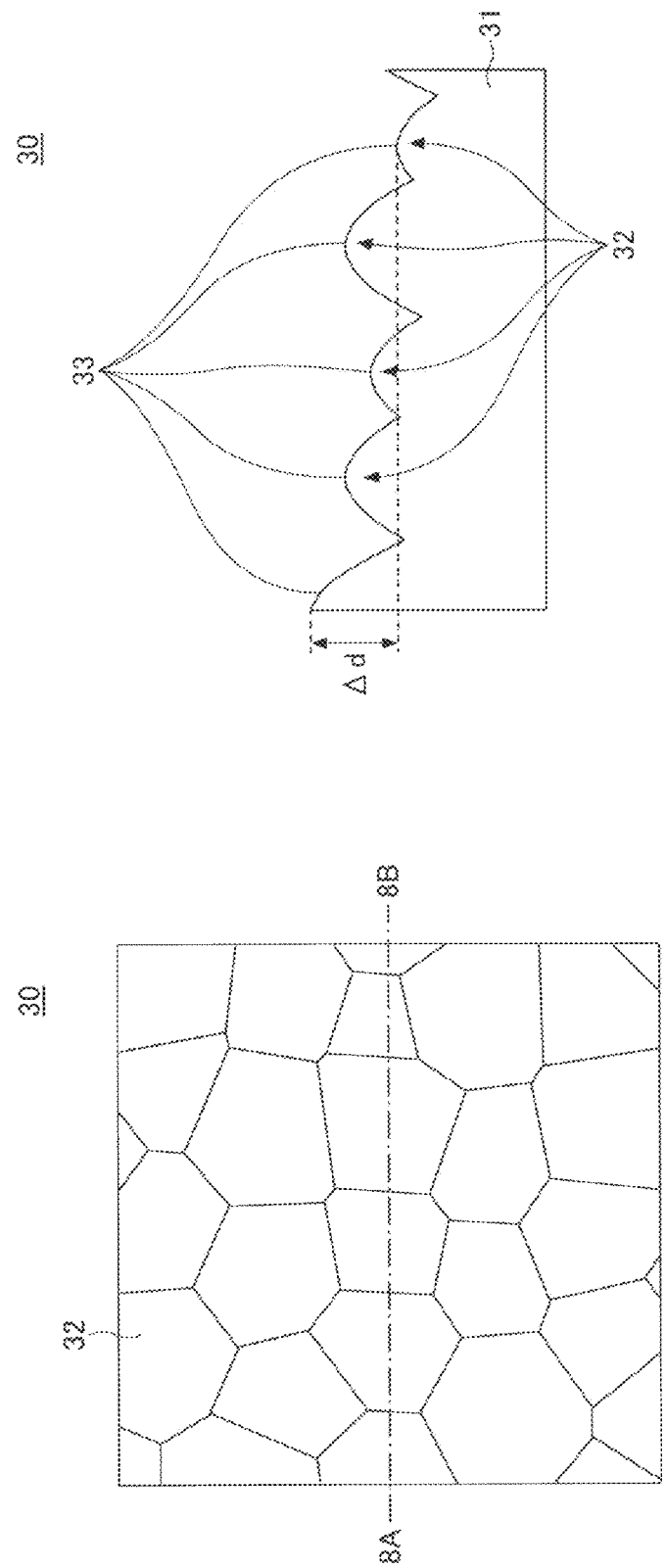

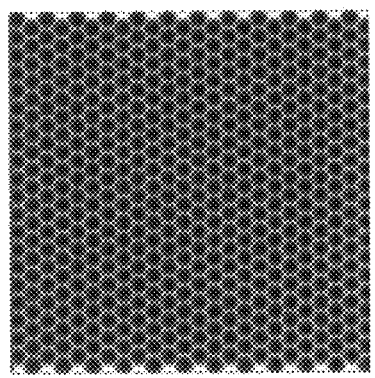
FIG. 13A
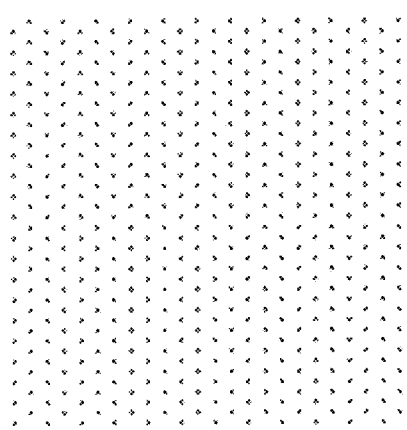
FIG. 13B
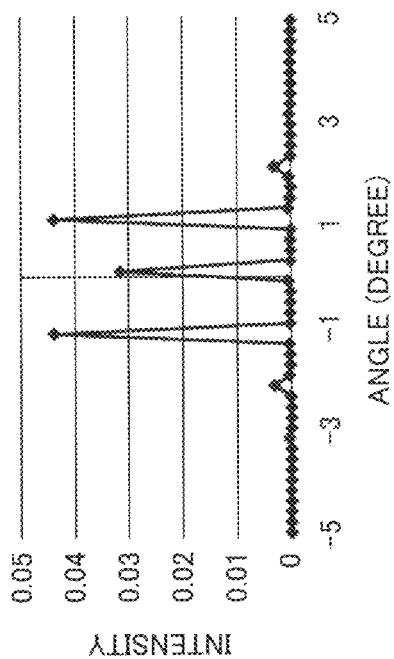
FIG. 13C
FIG. 13D

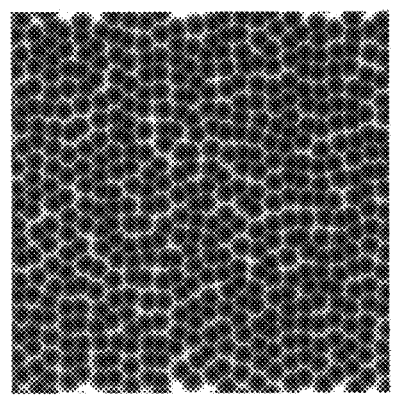
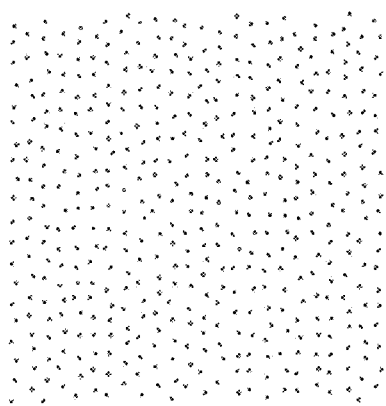
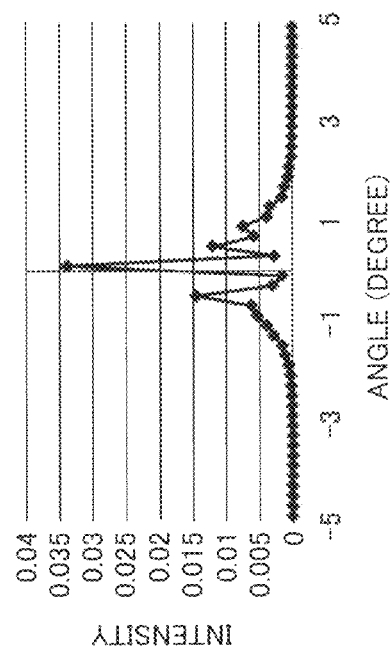
FIG. 14A
FIG. 14B
FIG. 14C
FIG. 14D

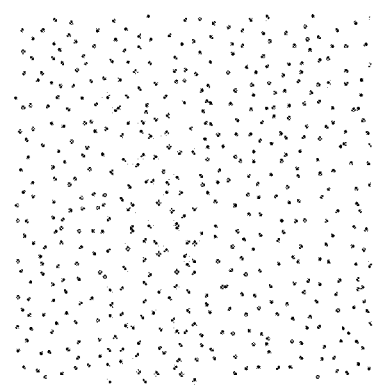
FIG.15A
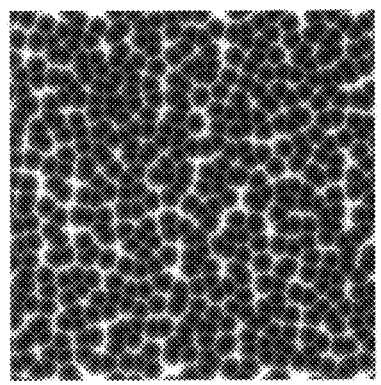
FIG.15B
FIG.15C
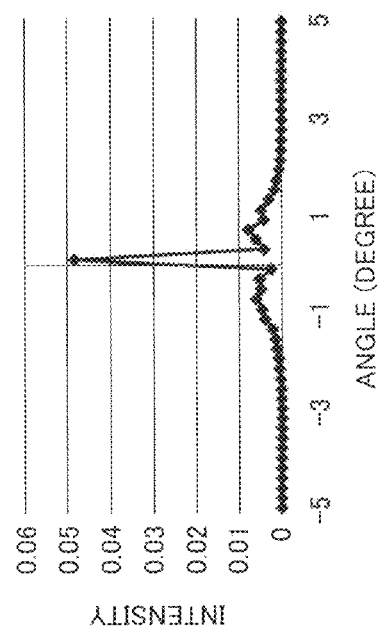
FIG.15D

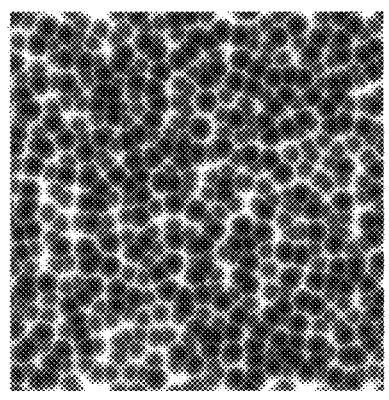
FIG.18B
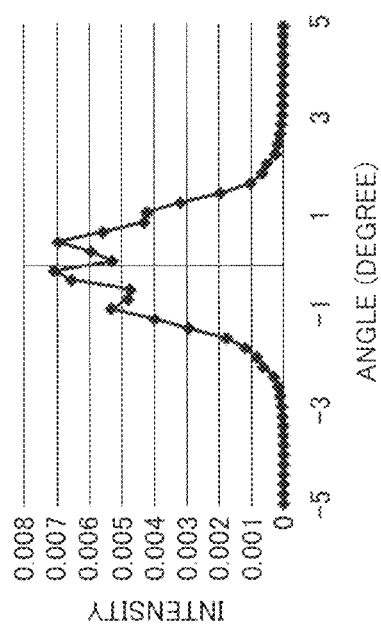
FIG.18D
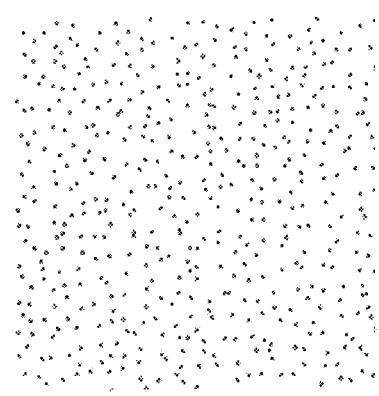
FIG.18A
FIG.18C

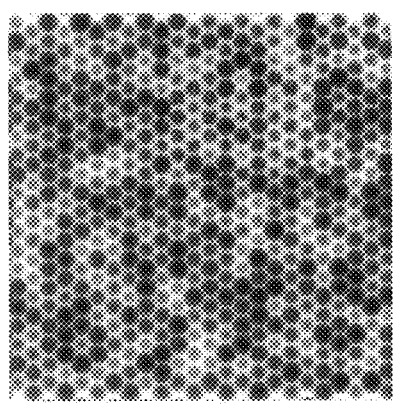
FIG. 19B
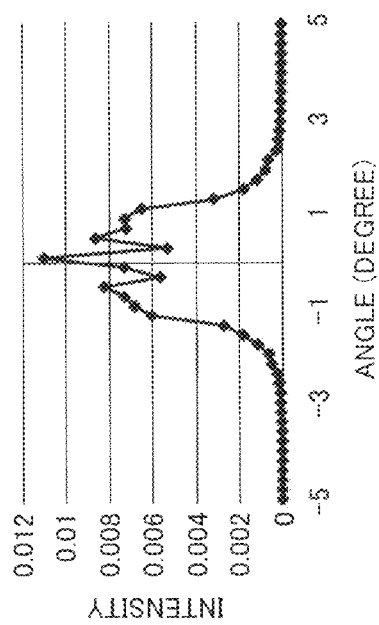
FIG. 19D
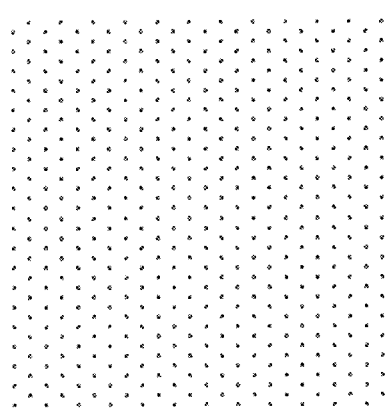
FIG. 19A
FIG. 19C

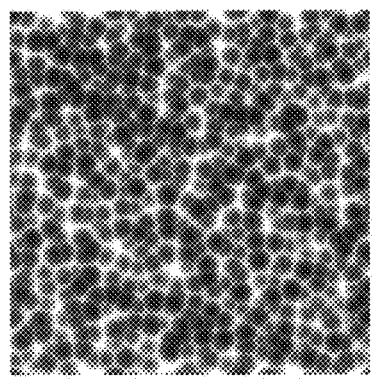
FIG.21B
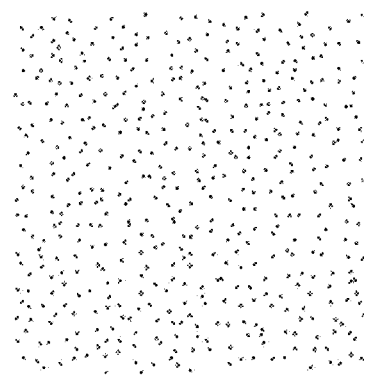
FIG.21A
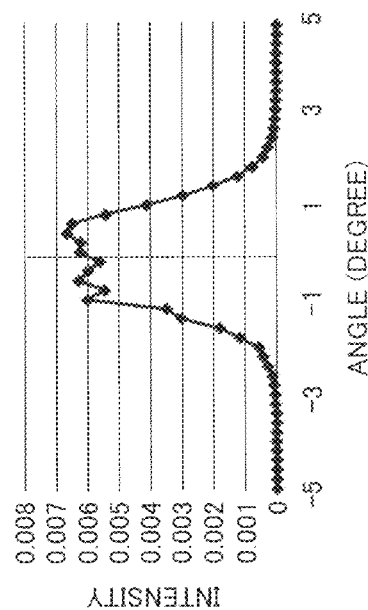
FIG.21D
FIG.21C

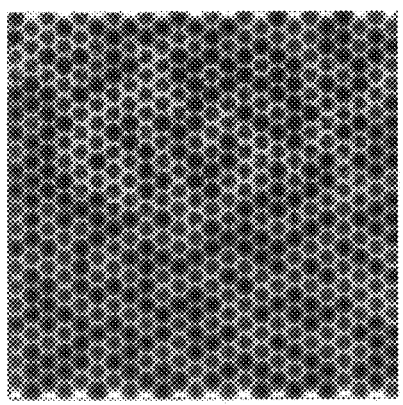
FIG.22B
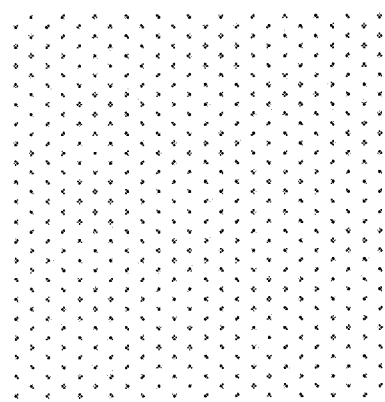
FIG.22A
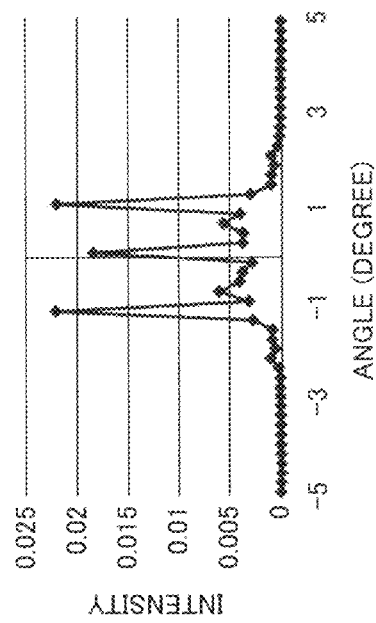
FIG.22D
FIG.22C

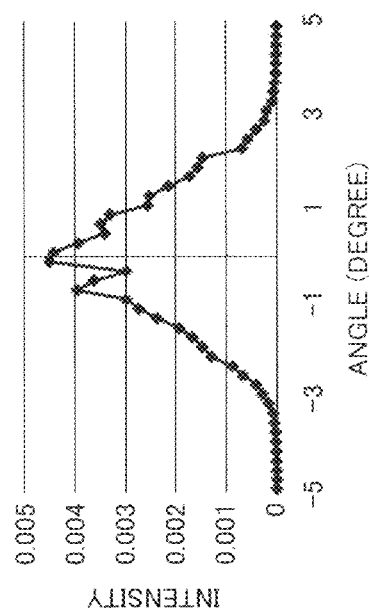
FIG.23B
FIG.23D
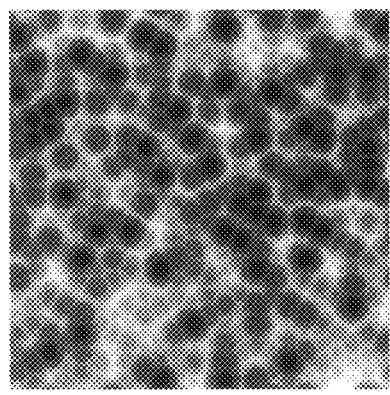
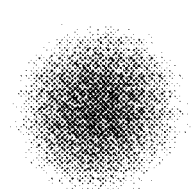
FIG.23A
FIG.23C

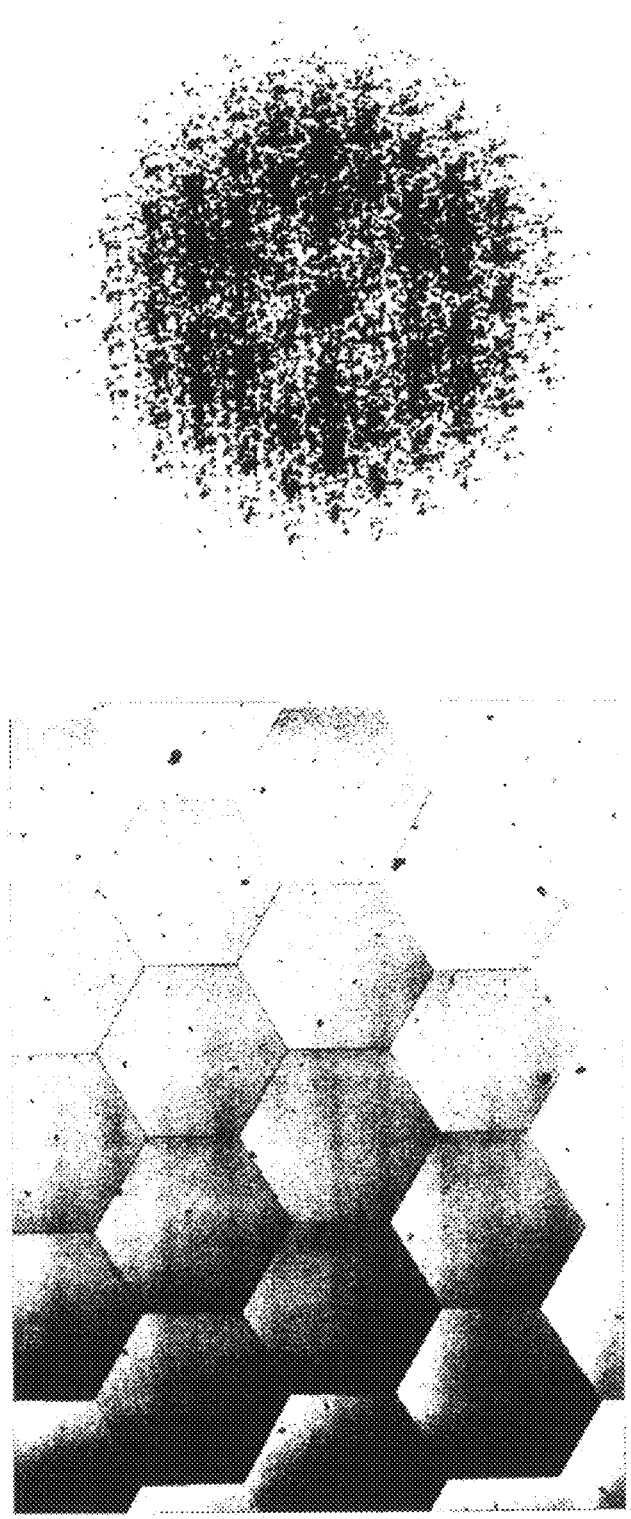

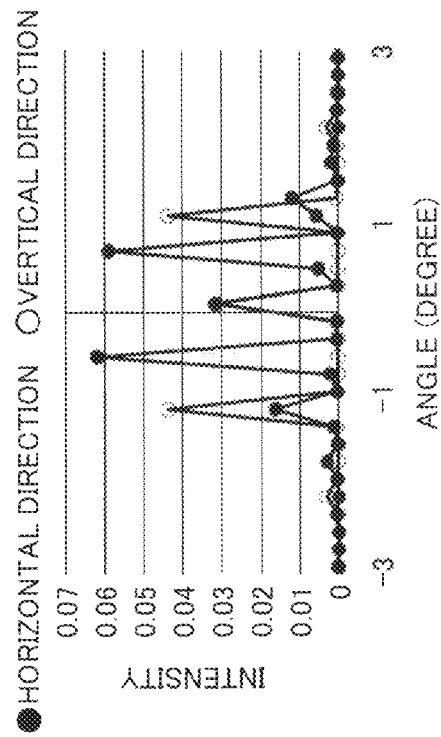
FIG.32B
FIG.32D
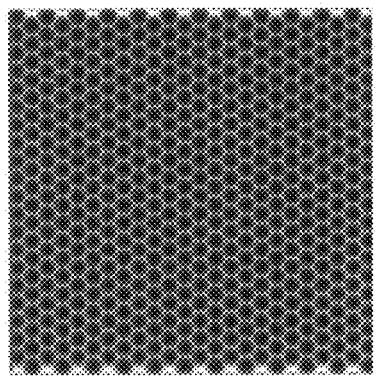
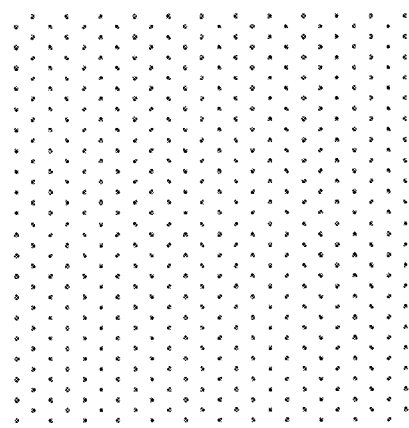
FIG.32A
FIG.32C

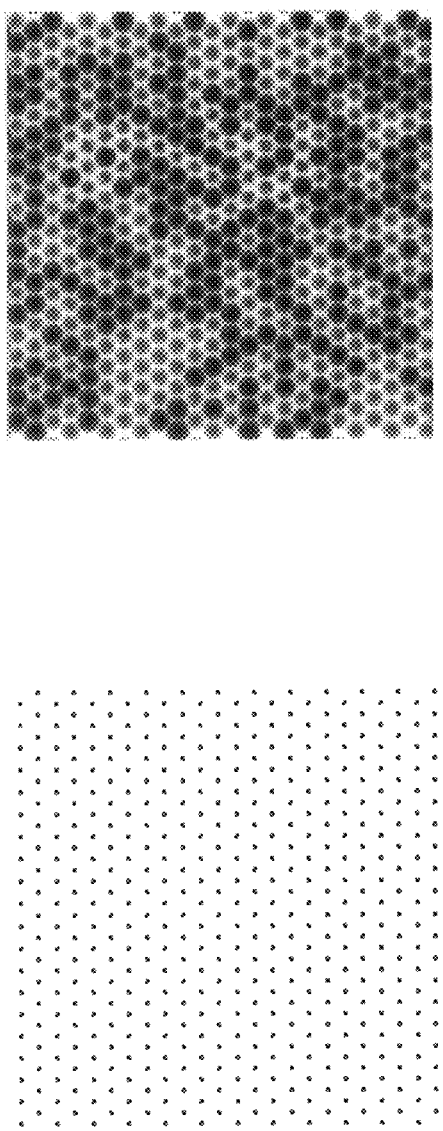
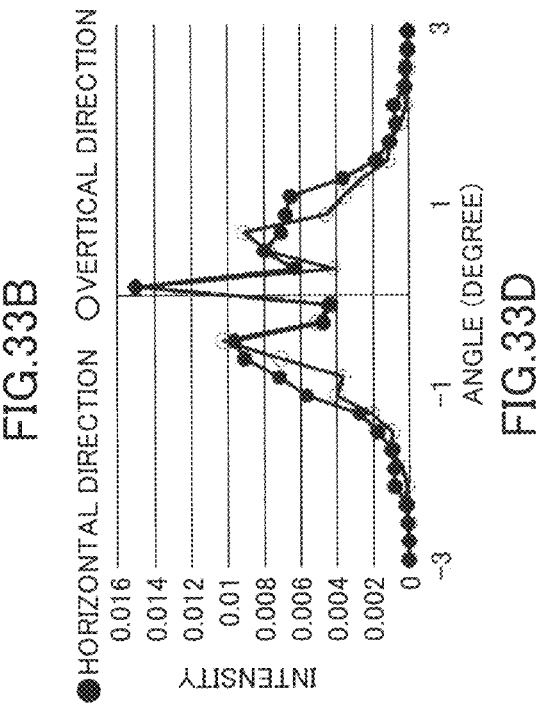

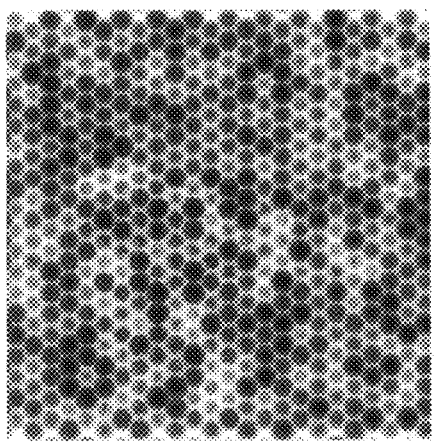
FIG.34B
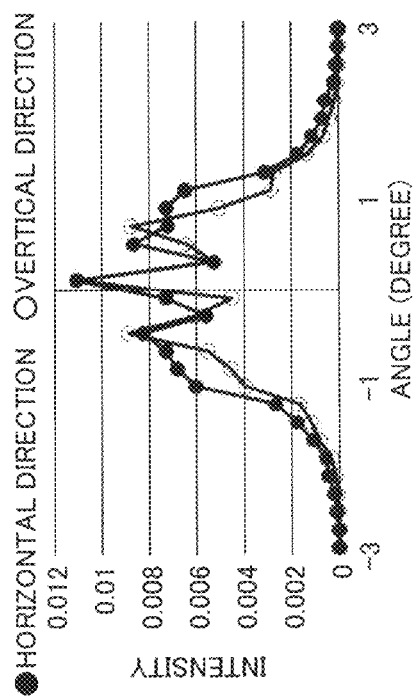
FIG.34D
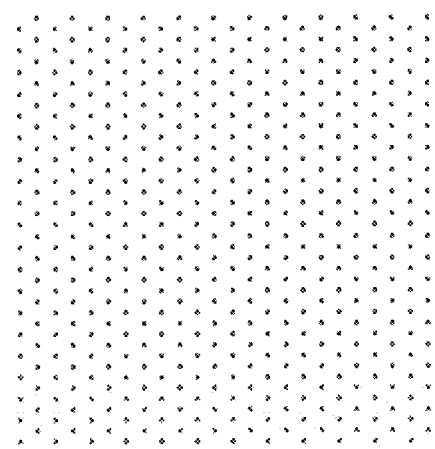
FIG.34A
FIG.34C

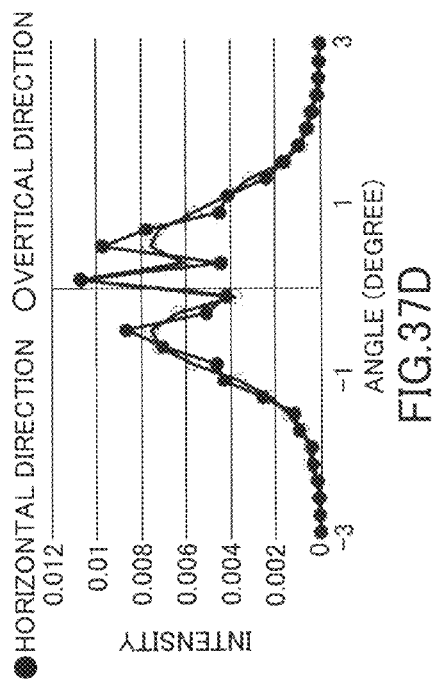
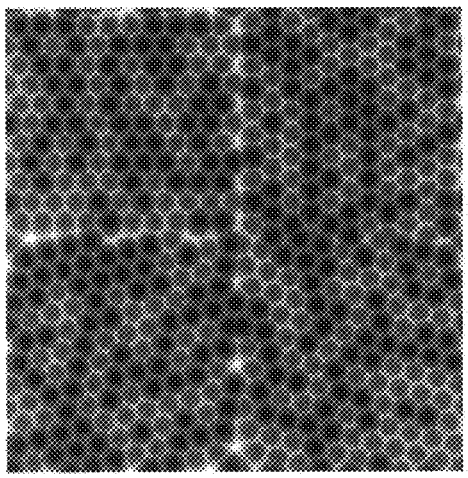
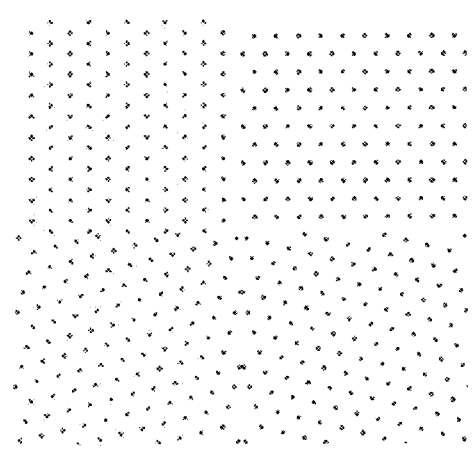

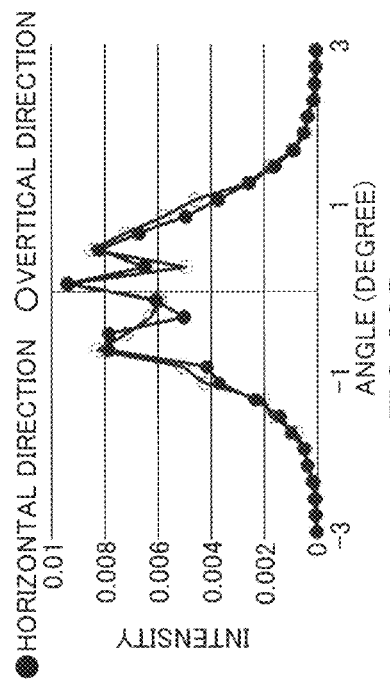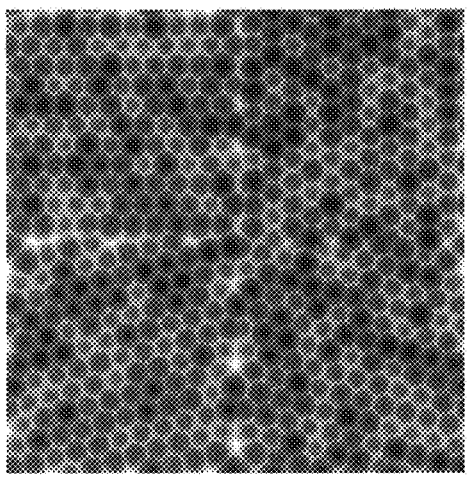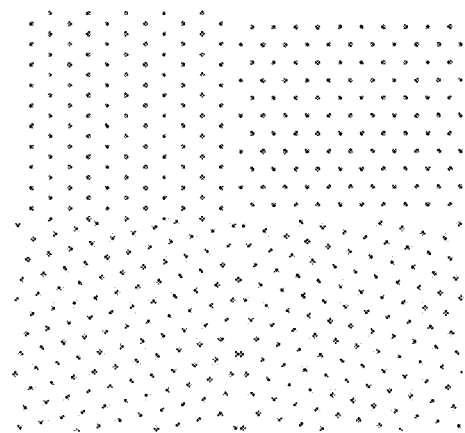

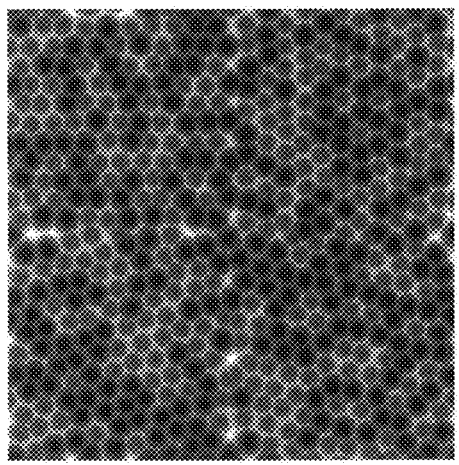
FIG. 39B
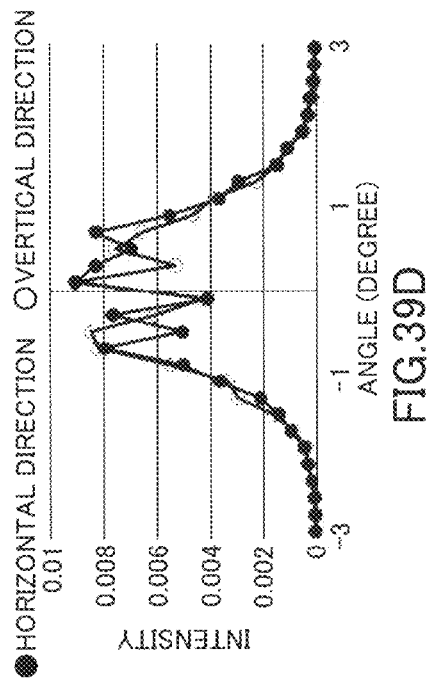
FIG. 39D
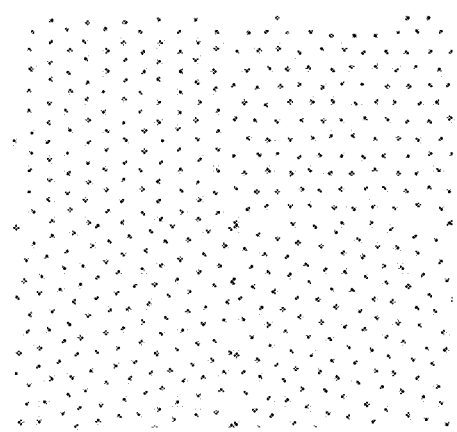
FIG. 39A
FIG. 39C

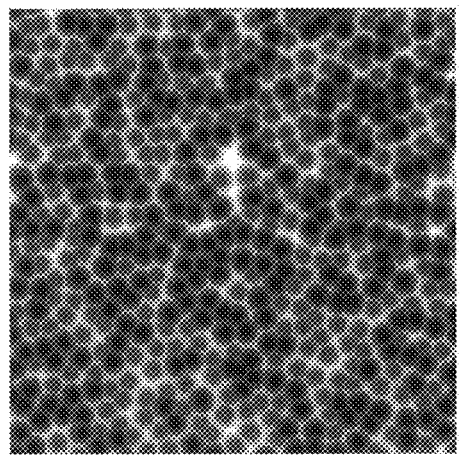
FIG. 40B
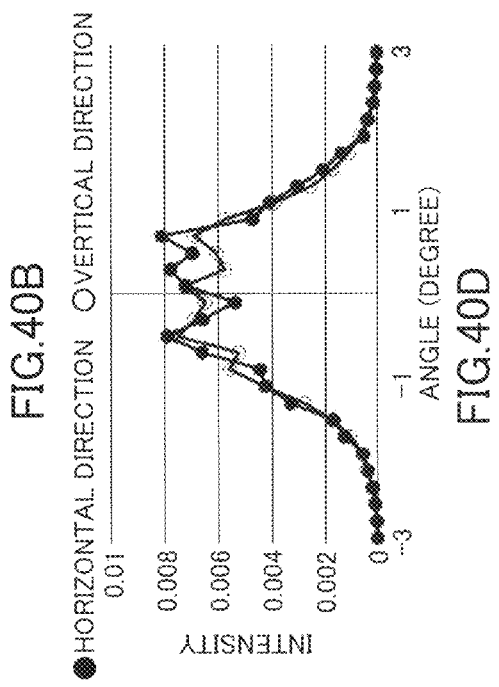
FIG. 40D
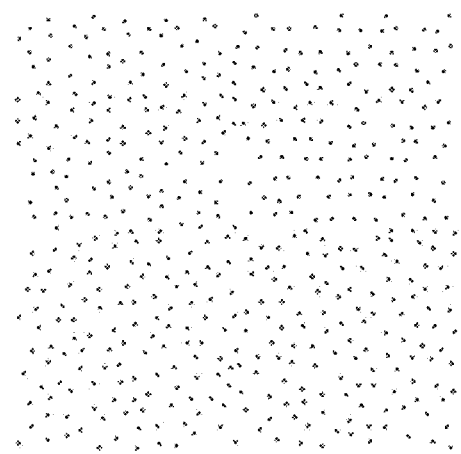
FIG. 40A
FIG. 40C

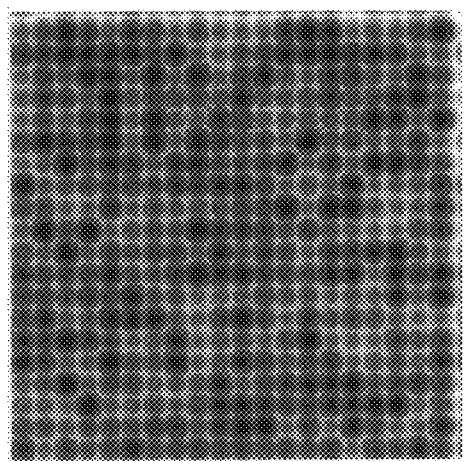
FIG.44B
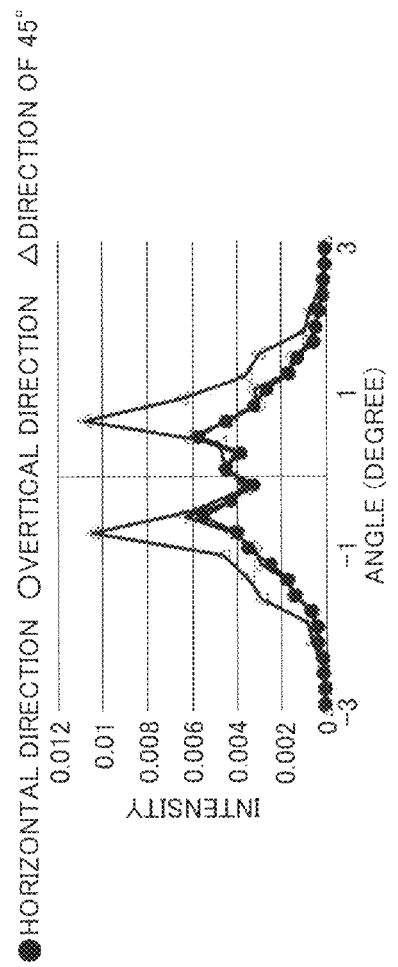
FIG.44D
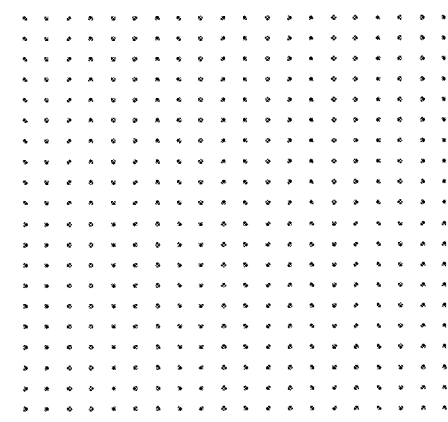
FIG.44A
FIG.44C

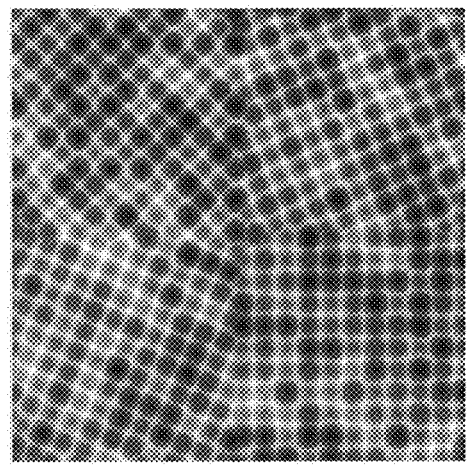
FIG. 45B
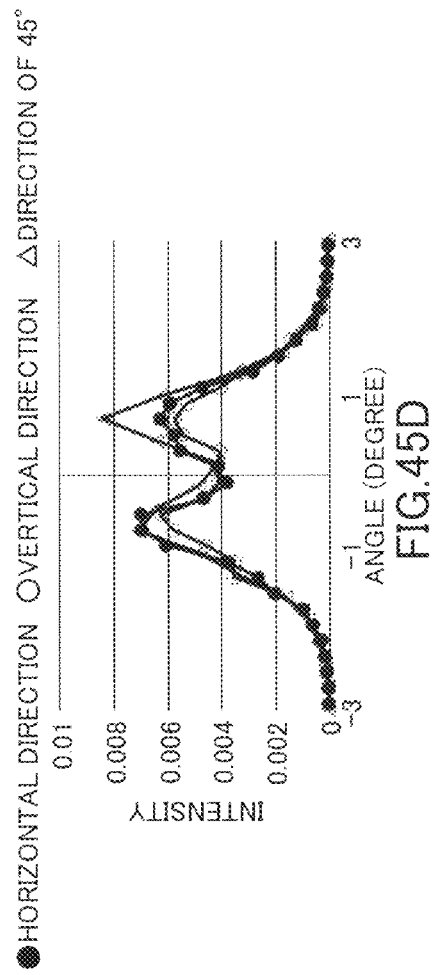
FIG. 45D
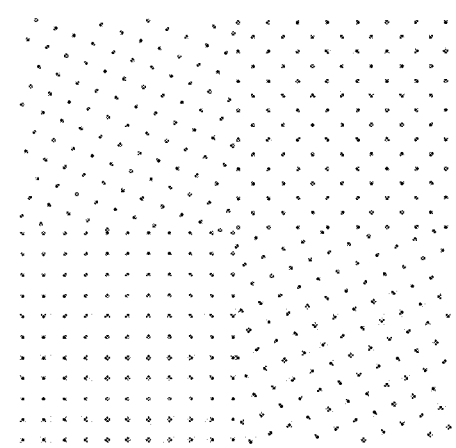
FIG. 45A
FIG. 45C

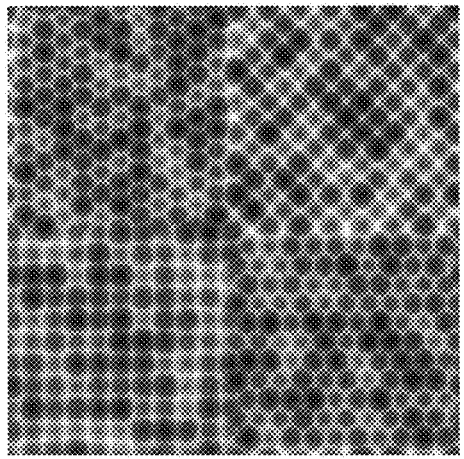
FIG. 46B
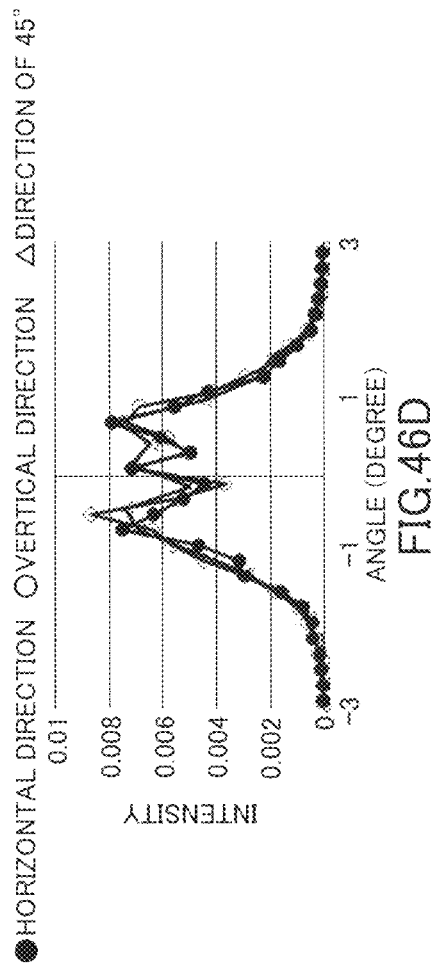
FIG. 46D
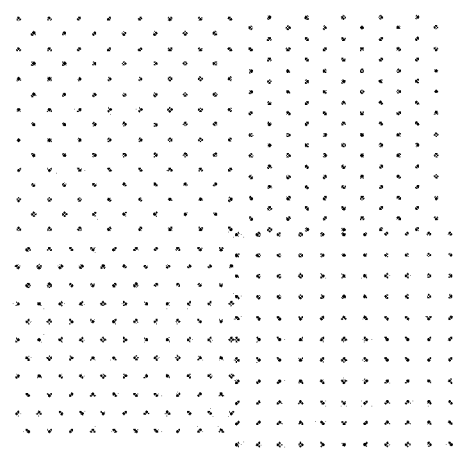
FIG. 46A
FIG. 46C

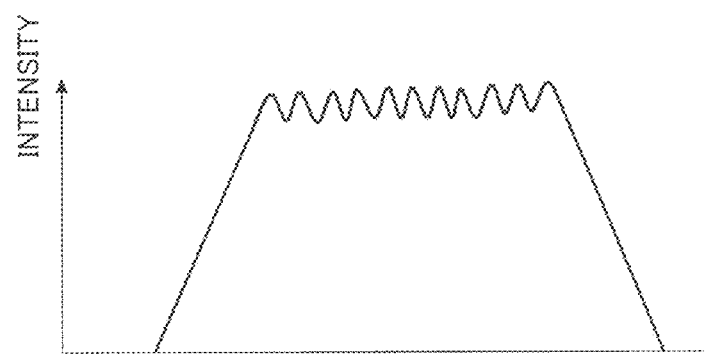
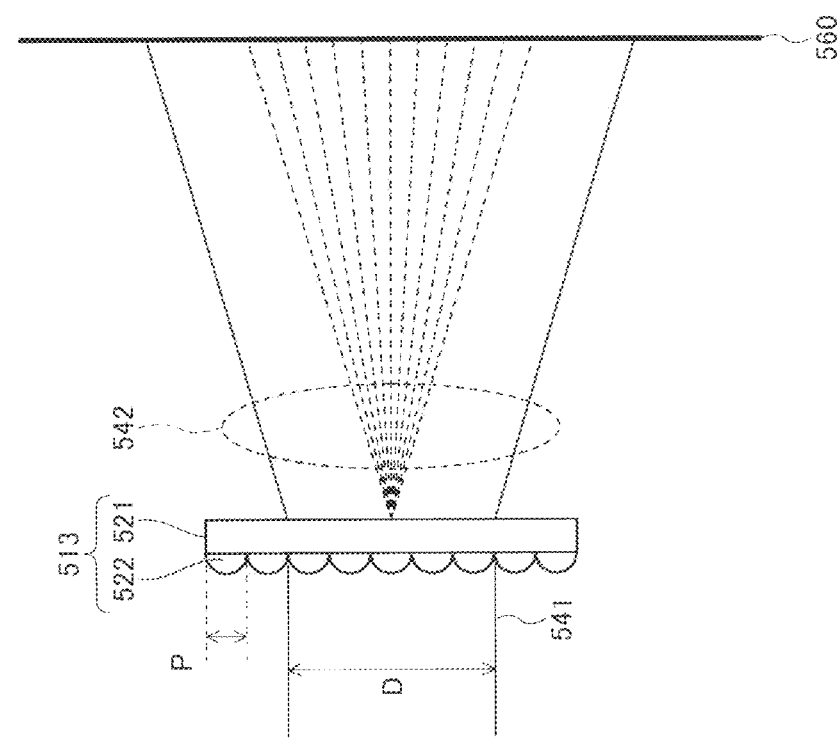

US 9,939,561 B2

PROJECTOR HAVING DIFFUSER

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2013/084693, filed on Dec. 25, 2013 and designating the U.S., which claims priority to Japanese Patent Applications No. 2012-287196, filed on Dec. 28, 2012, No. 2013-143561, filed on Jul. 9, 2013, No. 2013-167565, filed on Aug. 12, 2013, and No. 2013-189364, filed on Sep. 12, 2013. The entire contents of the foregoing applications are incorporated herein by reference.

BACKGROUND OF THE INVENTION

1. Field of the Invention

The present invention relates to optical devices, projectors, and methods of producing optical devices.

2. Description of the Related Art

Some projectors that employ a laser as a light source use such a diffuser plate as disclosed in Japanese Laid-Open Patent Application No. 2007-233371 in order to correct the intensity distribution of a beam flux emitted from the laser. The diffuser plate, however, diffuses light using random irregularities on its surface, and therefore, is generally inefficient in using light. Thus, optical devices that keep the diffusion of light within a predetermined range by a refraction effect, such as a microlens array, are preferred. Japanese Laid-Open Patent Application No. 2012-145804 discloses using a microlens array in a projector.

In the case of using a highly coherent light source such as a laser, the intensity distribution of a beam flux may be insufficiently corrected with regularly arranged microlenses because diffracted light is generated only in a predetermined direction in accordance with the regularity of the arrangement. As a method for reducing such a diffraction effect, it is known to introduce irregularity to a microlens array. In particular, it is known to diffuse light within a predetermined angular range by introducing irregularity within a controlled range. U.S. Pat. No. 7,033,736 discloses microstructures into which irregularity is introduced in a depth direction, where the range of distribution of microstructures in the depth direction is, for example, 10 μm or more.

SUMMARY OF THE INVENTION

According to an aspect of the present invention, an optical device includes a base material including a surface on which multiple concaves are formed. The concaves include respective curved surfaces. The concaves are formed so that the bottoms of the concaves are at two or more different positions in a depth direction. In the optical device, $2/7 \leq |(n1-n2) \times \Delta d|/\lambda \leq 10$ holds, where n1 is the refractive index of the base material, n2 is the refractive index of a medium around the concaves, $\lambda$ is the wavelength of a beam flux that enters the base material, and $\Delta d$ is a range of the positions of the bottoms in the depth direction.

According to an aspect of the present invention, an optical device includes a base material including a surface on which multiple convexes are formed. The convexes include respective curved surfaces. The convexes are formed so that the tops of the convexes are at two or more different positions in a height direction. In the optical device, $2/7 \leq |(n1-n2) \times \Delta d|/\lambda \leq 10$ holds, where n1 is the refractive index of the base material, n2 is the refractive index of a medium around the convexes, $\lambda$ is the wavelength of a beam flux that enters the base material, and $\Delta d$ is a range of the positions of the tops in the height direction.

According to an aspect of the present invention, a projector includes any of the above-described optical devices and a light source that emits light that enters the optical device.

According to an aspect of the present invention, a projector includes a light source that emits laser light, a microlens array including multiple lens parts formed on a surface thereof through which the laser light enters the microlens array, a spatial modulator illuminated with a beam flux of the laser light transmitted through the microlens array, and a projection optical system that projects the beam flux from the spatial modulator. In the projector, $\sin \delta > 2\lambda/P > 6\lambda/D$ is satisfied, where $\lambda$ is the wavelength of the laser light, D is the diameter of the beam flux of the laser light that enters the microlens array, $\delta$ is the angle of divergence of the microlens array, and P is the adjacent lens part pitch of the microlens array.

According to an aspect of the present invention, a projector includes a light source that emits laser light, a microlens array including multiple lens parts formed on a surface thereof through which the laser light enters the microlens array, a spatial modulator illuminated with a beam flux of the laser light transmitted through the microlens array, and a projection optical system that projects the beam flux from the spatial modulator. At least one of the aperture size, the radius of curvature, and the pitch of the lens parts differs between adjacent ones of the lens parts in the microlens array.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIGS. 8A and 8B are diagrams illustrating a structure of an optical device according to the first embodiment;

FIGS. 13A through 13D are diagrams for illustrating an optical device of Example 1;

FIGS. 14A through 14D are diagrams for illustrating an optical device of Example 2;

FIGS. 15A through 15D are diagrams for illustrating an optical device of Example 3;

FIGS. 18A through 18D are diagrams for illustrating an optical device of Example 6;

FIGS. 19A through 19D are diagrams for illustrating an optical device of Example 7;

FIGS. 21A through 21D are diagrams for illustrating an optical device of Example 9;

FIGS. 22A through 22D are diagrams for illustrating an optical device of Example 10;

FIGS. 23A through 23D are diagrams for illustrating an optical device of Example 11;

FIGS. 25A and 25B are diagrams for illustrating an optical device of Example 13;

FIGS. 32A through 32D are diagrams for illustrating an optical device of Example 15;

FIGS. 33A through 33D are diagrams for illustrating an optical device of Example 16;

FIGS. 34A through 34D are diagrams for illustrating an optical device of Example 17;

FIGS. 37A through 37D are diagrams for illustrating an optical device of Example 20;

FIGS. 38A through 38D are diagrams for illustrating an optical device of Example 21;

FIGS. 39A through 39D are diagrams for illustrating an optical device of Example 22;

FIGS. 40A through 40D are diagrams for illustrating an optical device of Example 23;

FIGS. 44A through 44D are diagrams for illustrating an optical device of Example 26;

FIGS. 45A through 45D are diagrams for illustrating an optical device of Example 27;

FIGS. 46A through 46D are diagrams for illustrating an optical device of Example 28;

FIGS. 50A and 50B are diagrams for illustrating the microlens array;

DETAILED DESCRIPTION OF THE PREFERRED EMBODIMENTS

Figure 1B:
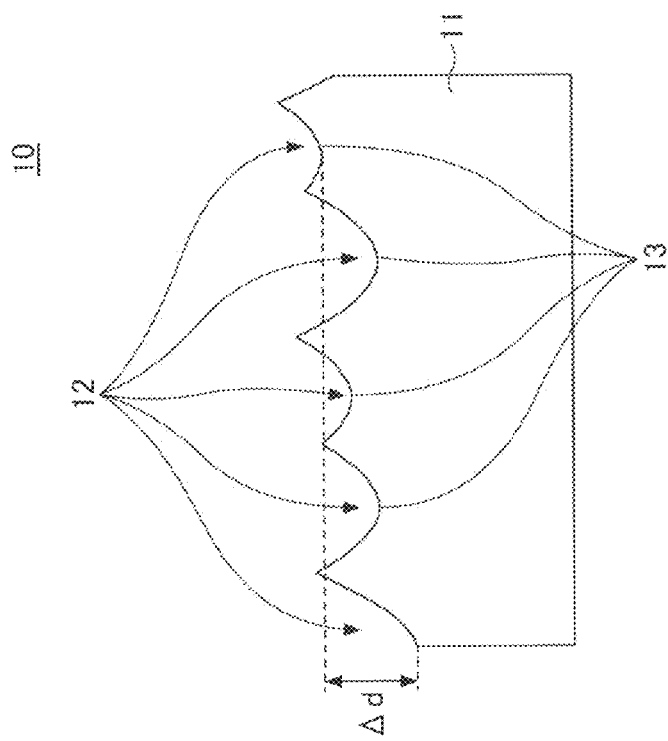
FIGS. 1A and 1B are diagrams illustrating a structure of an optical device according to a first embodiment.

There is a demand that such optical devices as described above be processable using wet etching and serve as diffuser plates that enjoy a high light use efficiency.

Furthermore, there is a demand that projectors that employ a laser as a light source and uses a microlens array be free of variations in brightness, color, etc.

According to an aspect of the present invention, an optical device that enjoys high light use efficiency is provided. Furthermore, according to an aspect of the present invention, a projector that is free of variations in brightness, color, etc., is provided.

A description is given below of embodiments of the present invention. In the following description, the same members as those described above are referred to by the same reference numerals, and their description is omitted.

[First Embodiment]

The above-described microstructures according to U.S. Pat. No. 7,033,736, which are widely distributed in the depth direction, may generate unnecessary scattered light in the case of light that obliquely enters, such as diverging light.

Furthermore, resistance to light may be required when laser light is caused to enter. Therefore, optical devices are preferably formed using a light resistant material such as glass as a base material. One method of making a surface of glass or the like uneven is wet etching. In general, however, the shapes that may be formed by wet etching are limited. In the case of forming an uneven surface with deep concaves that differ in depth as illustrated in U.S. Pat. No. 7,033,736, it is difficult to form a desired shape with wet etching.

Other methods of making a surface of glass or the like uneven include dry etching and press forming. In the case of forming an uneven surface with deep concaves, however, the dry etching has the problem of a relatively long processing time and the press forming has a problem in that a part that air enters during press forming turns into a defect.

Therefore, there is a demand for optical devices that are processable using wet etching and serve as diffuser plates that enjoy high light use efficiency.

According to this embodiment, it is possible to provide optical devices that are processable using wet etching and serve as diffuser plates that enjoy high light use efficiency.

Figure 1A:
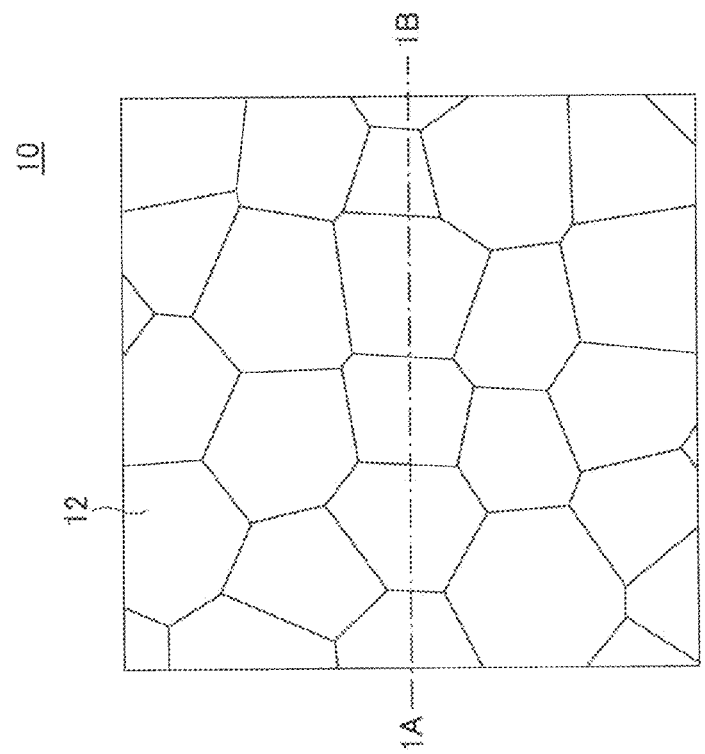

A description is given, with reference to FIGS. 1A and 1B, of an optical device according to the first embodiment. FIG. 1A is a plan view of an optical device according to the first embodiment. FIG. 1B is a schematic cross-sectional view of the optical device, taken along a plane including a one-dot chain line 1A-1B in FIG. 1A.

An optical device 10 according to this embodiment includes a base material 11 having a surface on which multiple concaves 12 are formed. According to this embodiment, while a description is given of the case where the concaves 12 are formed on a surface of the base material 11, multiple convexes may alternatively be formed on a surface of the base material 11 according to the optical device of this embodiment.

According to the optical device 10 illustrated in FIGS. 1A and 1B, the deepest part of each concave 12 defines a bottom 13, and the positions of the bottoms 13 of the concaves 12 in a depth (vertical) direction are not uniform but take two or more values. The difference between the depth position of the deepest bottom 13 and the depth position of the shallowest bottom 13 among the bottoms 13 of the concaves 12, that is, the height (level) difference of the bottoms 13, is Δd.

Figure 2B:
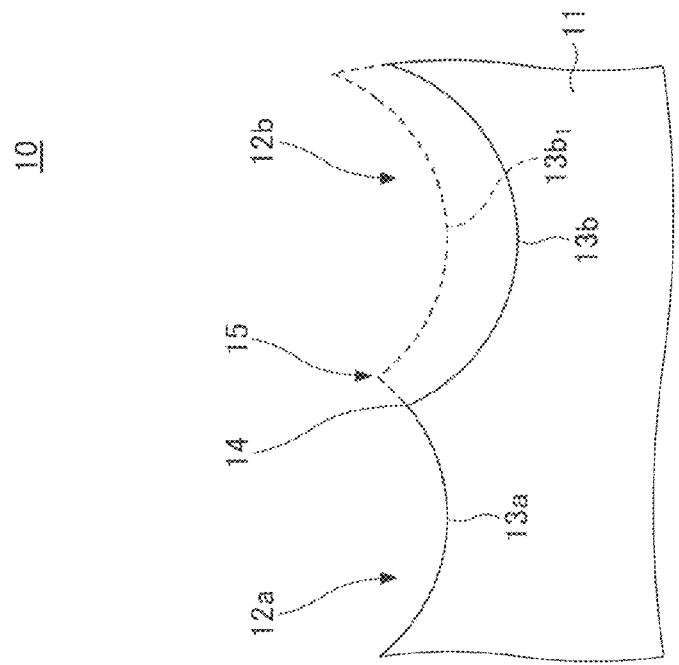
FIGS. 2A and 2B are diagrams illustrating the optical device according to the first embodiment.
Figure 2A:
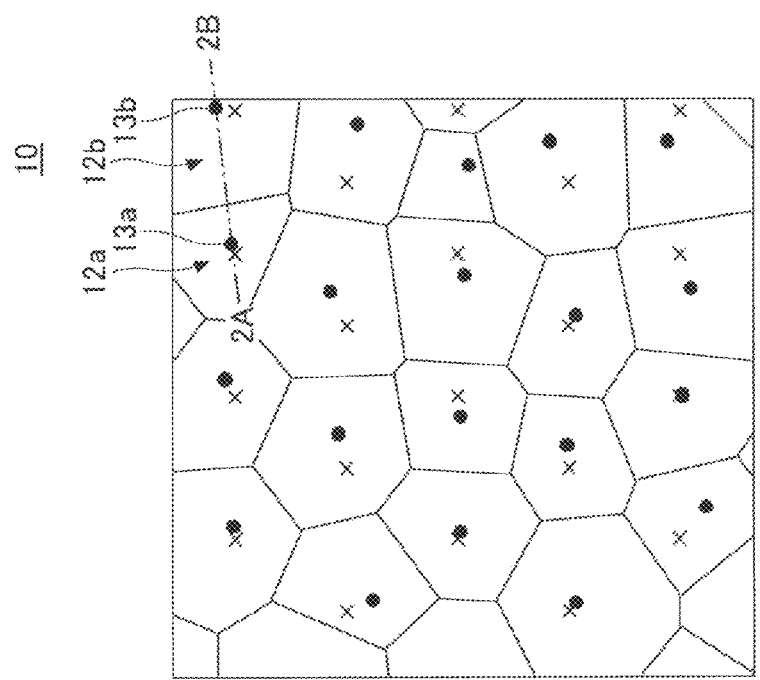
Figure 3:
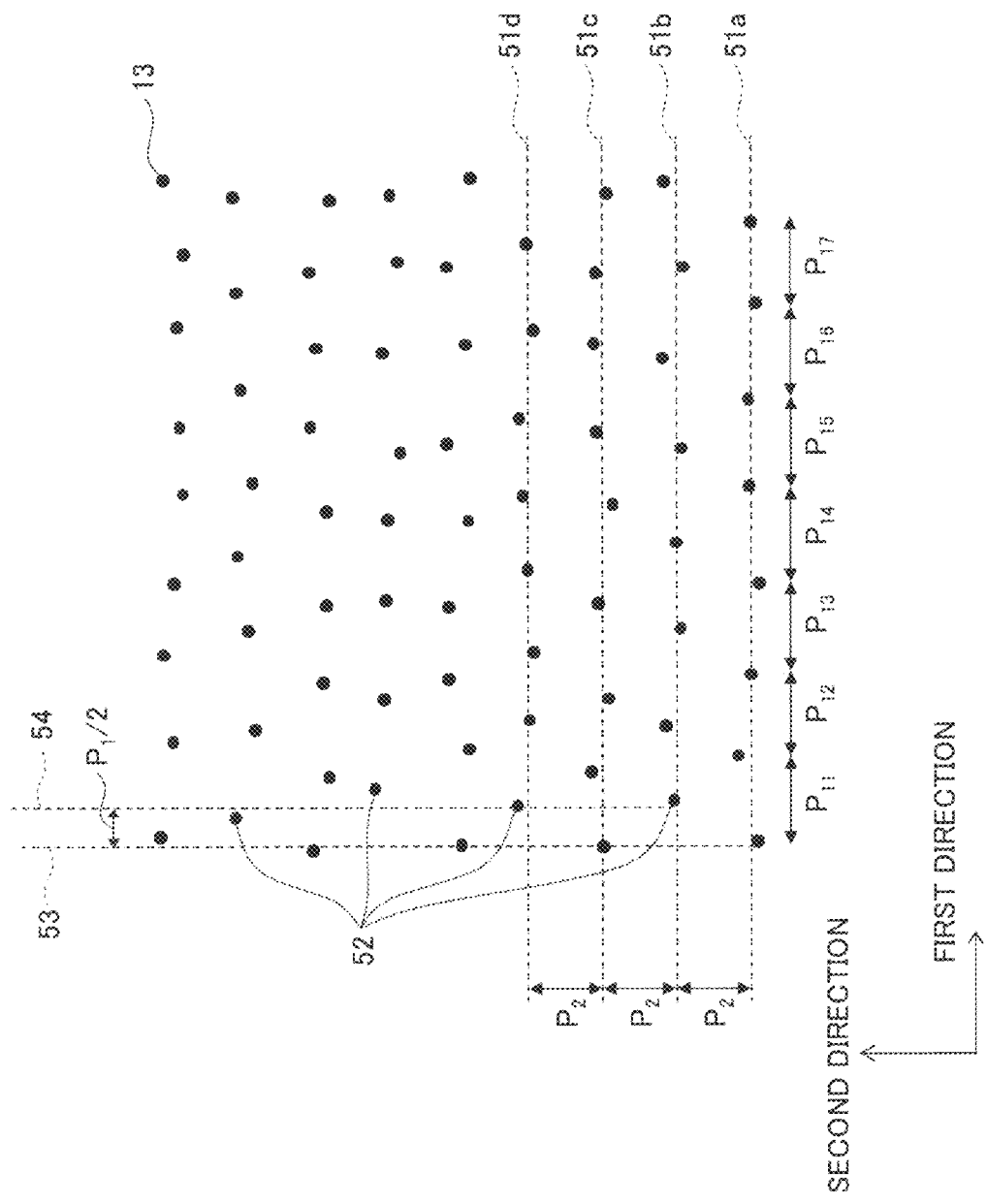
FIG. 3 is a diagram illustrating the optical device according to the first embodiment.

Next, a description is given, with reference to FIGS. 2A, 2B and 3, of planar positions of the bottoms 13. In FIG. 2A, the positions of the bottoms 13 are indicated by black circles (●). The positions of the bottoms 13 may be either regularly arranged, that is, arranged at a predetermined period or at predetermined intervals, or irregularly arranged. In the case where the positions of the bottoms 13 are irregularly arranged, letting the pitch of the regular arrangement be P, the bottoms 13 are preferably formed to be present within a circle of preferably a radius of 0.5×P, and more preferably, formed to be present within a circle of a radius of 0.25×P, with reference to the center points (regularly arranged points) of the bottoms 13 in the case where the positions of the bottoms 13 are regularly arranged. In FIG. 2A, the positions of the regularly arranged points are indicated by crosses (x). The regular arrangement illustrated in FIG. 2A is an arrangement where the closest regularly arranged points are connected to form triangles.

Alternatively, the bottoms 13 may be arranged so that the average interval of the bottoms 13 is $P_1$ relative to a first direction. In this case, letting a direction perpendicular to the first direction be a second direction, the bottoms 13 may be arranged so that the centroids of the positions of the bottoms 13 of the rows of the bottoms 13 formed in the first direction are arranged at intervals $P_2$. Such an arrangement, which is not based on a regular arrangement, makes it possible to further reduce the effect of periodicity due to a regular arrangement. FIG. 3 illustrates an example of such an arrangement. In FIG. 3, the positions of the bottoms 13 are indicated by black circles (●). Furthermore, in FIG. 3, the bottoms 13 are arranged in multiple rows in the first direction, and the centroid positions of some of the rows in the second direction are indicated by dotted lines 51a, 51b, 51c and 51d. In the row of the bottoms 13 whose centroid position is indicated by the dotted line 51a, the intervals of the bottoms 13 in the first direction are $P_{11}, P_{12} \ldots P_{17}$, and their average is $P_1$. The positions of the bottoms 13 in each row of the bottoms 13 are irregularly arranged relative to the second direction while the dotted lines 51a, 51b, 51c and 51d, which are centroid positions in the second direction, are at intervals $P_2$. Referring to FIG. 3, the centroid position (a dotted line 53) of the bottoms 13 at the left ends of the odd-numbered ($1^{st}$, $3^{rd}$, etc.) rows counted from the bottom of FIG. 3 in the first direction and the centroid position (a dotted line 54) of the bottoms 13 at the left ends of the even-numbered ($2^{nd}$, $4^{th}$, etc.) rows counted from the bottom of FIG. 3 in the first direction are at an interval of $P_1/2$ so as to satisfy $3^{0.5}/2 \times P_1 = P_2$. The bottoms 13 in each row of the bottoms 13 are preferably at intervals of $(1\pm0.25)P_1$, and more preferably, at intervals of $(1\pm0.15)P_1$, in the first direction. Furthermore, the positions of the bottoms 13 are preferably $\pm0.25P_2$, and more preferably, $\pm0.15P_2$, relative to the centroid positions of the rows of the bottoms 13 in the second direction.

Furthermore, when the bottoms 13 are irregularly arranged, the bottoms 13 may be symmetrically arranged with respect to a point or line in part of the region. Such an arrangement makes it possible to make asymmetry less likely to occur in a positive direction and a negative direction relative to one direction.

The optical device 10 according to this embodiment is formed as described above so as to be capable of efficiently diffusing light within a predetermined angular range as described below. Furthermore, in the case where the pitch of a regular arrangement differs from direction to direction, each bottom 13 may be positioned in an elliptical area in accordance with the pitch ratio. Alternatively, each bottom 13 may be positioned within a region bounded by the bisectors of adjacent ones of regularly arranged points. For example, the bottoms 13 may be irregularly formed to be at positions offset from respective positions in their regular arrangement, and each of the bottoms 13 may be within a corresponding one of regions bounded by bisectors of adjacent ones of points corresponding to the positions of the bottoms 13 in their regular arrangement. Furthermore, each bottom 13 is more preferably formed within a region bounded by normals each positioned at a quarter of the distance between one and an adjacent one of regularly arranged points from the one of the regularly arranged points. Here, the term "normal" refers to a line perpendicular to a line segment connecting one and an adjacent one of regularly arranged points.

FIG. 2A illustrates a case where the bottoms 13 indicated by black circles are positioned within regions of a quarter of a pitch relative to the positions of the points regularly arranged in triangles indicated by crosses. FIG. 2B illustrates a cross section taken along a plane including a one-dot chain line 2A-2B that connects a bottom 13a in a concave 12a and a bottom 13b in a concave 12b in FIG. 2A.

Referring to FIG. 2B, the bottom 13a of the concave 12a and the bottom 13b of the concave 12b are at different positions in the depth direction. When a surface that forms the concave 12a and a surface that forms the concave 12b have the same curvature, a point 14 that serves as a boundary between the concaves 12a and 12b is not positioned on the bisector of the bottoms 13a and 13b. In FIG. 2B, the case where adjacent bottoms are at the same position in the depth direction is indicated by a dotted line. In this case, a point 15 that serves as a boundary is positioned on the bisector of the bottom 13a and a bottom $13b_1$.

In general, in the case of forming concaves in a base material such as glass by wet etching, the surfaces of adjacent concaves have substantially the same curvature. Therefore, if the positions of the bottoms of concaves in the depth direction greatly differ, the point 14 serving as a boundary is significantly off the bisector.

When concaves adjoin at the point 15 serving as a boundary, the surfaces of the adjoining concaves have the same tilt angle. As a result, it is possible to make the tilt angle of the concaves at the point 15 serving as a boundary a predetermined diffusion angle, so that it is possible to efficiently diffuse light within a predetermined diffusion angle range. On the other hand, when concaves adjoin at the point 14 serving as a boundary, the surfaces of the adjoining concaves have different tilt angles, so that the tilt angle is smaller at one concave and larger at the other concave than a predetermined diffusion angle. In this case, the amount of light that diffuses out of a predetermined diffusion angle range increases.

Thus, because light is likely to diffuse out of a predetermined diffusion angle range when the positions of the bottoms 13 of the concaves 12 greatly differ in the depth direction, the difference between the positions of the bottoms 13 of the concaves 12 in the depth direction is preferably small. In the case where the positions of the bottoms 13 of the concaves 12 in the depth direction are uniform, however, a component of light that is rectilinearly transmitted increases. Therefore, in order to reduce the rectilinearly transmitted component of light, the rectilinearly transmitted component of light may be diffused by causing a diffraction phenomenon in the rectilinearly transmitted component of light.

In order to cause a diffraction phenomenon, an optical path difference caused by the positions of the bottoms 13 in the depth direction is preferably ⅔ of a wavelength or more. Furthermore, in order to cause a diffraction phenomenon most efficiently, the optical path difference caused by the positions of the bottoms 13 in the depth direction is preferably substantially a wavelength. Considering that the residue of the wavelength of an optical path difference may be considered in a diffraction phenomenon and considering controllability by processing, however, the optical path difference caused by the positions of the bottoms 13 in the depth direction is preferably ten times a wavelength or less.

A description is given above of the case where the optical device is of a transmission type. What has been described above is expressed by:

$$2/7 \leq |(n1-n2) \times \Delta d|/\lambda \leq 10, \quad (1)$$

where n1 is the refractive index of the base material 11 in which the concaves 12 are formed, n2 is the refractive index of a medium around the concaves 12, and λ is the wavelength of an entering beam flux.

According to the optical device 10 of this embodiment, the condition is preferably $$2/7 \leq |(n1-n2) \times \Delta d|/\lambda \leq 5, \quad (2)$$

and more preferably, $$2/7 \leq |(n1-n2) \times \Delta d|/\lambda \leq 2. \quad (3)$$

Furthermore, the positions of the bottoms 13 of the concaves 12 may be at multiple levels (multiple depth positions) instead of being arbitrarily determined. In this case, the above-described diffraction phenomenon may be caused when the positions of the bottoms 13 in the depth direction are at two or more levels (that is, there are two or more depth positions). In order to cause a diffraction phenomenon more efficiently, however, the positions of the bottoms 13 in the depth direction are preferably at four or more levels (that is, there are four or more depth positions). Furthermore, in order to efficiently cause a diffraction phenomenon, it is preferable that there be not many bottoms 13 distributed at a particular depth position. In the case of two levels, it is preferable that 75% or more of the bottoms 13 be not distributed at a particular position in the depth direction. Furthermore, in the case of four levels, it is preferable that 50% or more of the bottoms 13 be not distributed at a particular position in the depth direction.

Furthermore, the base material 11 may be warped, include an undulation that forms irregularities at a long pitch of several hundred μm or more, or include an undulation of a long pitch because of wet etching. In such a case, it is possible that the expression (1) is not satisfied over the entire surface of the device because of irregularities due to the warp or undulation of the base material 11. In this case, it may be possible that at least adjacent bottoms 13 satisfy the expression (1).

Furthermore, letting the difference in height (level) between the bottom 13b and the point 14, which is a boundary between the concaves 12a and 12b, be $\Delta z$, it is possible that the concaves 12a and 12b do not produce a desired effect on entering light if the optical path difference generated by the difference $\Delta z$ is small relative to the wavelength of the light. Accordingly, it is preferable to satisfy $2/7 \leq |(n1-n2) \times \Delta z_{avg}|/\lambda$, more preferably, $1/2 \leq |(n1-n2) \times \Delta z_{avg}|/\lambda$, and still more preferably, $3/4 \leq |(n1-n2) \times \Delta z_{avg}|/\lambda$, where $\Delta z_{avg}$ is the average of $\Delta z$ within the device. Here, the average shape of concaves may be determined, and $\Delta z_{avg}$ may be approximated by the height of the average shape in $r_{avg}$ from the origin, where $r_{avg}$ is the half value of the average interval of the bottoms of the concaves. For example, when the average shape of concaves is a spherical surface having a radius of curvature of $R_{avg}$, the height of the spherical surface at a distance of r from the origin may be determined by $R_{avg} - (R_{avg}^2 - r^2)^{1/2}$, so that $\Delta z_{avg}$ may be determined by $\Delta z_{avg} = R_{avg} - (R_{avg}^2 - r^2)^{1/2}$.

When the optical device 10 is a transmission optical device, a transparent material such as glass or resin may be used as a material that forms the base material 11 having the concaves 12 formed on its surface. When light from a light source such as a laser enters the base material 11, it is preferable to use an inorganic material that is highly resistant to light, such as glass.

Furthermore, according to this embodiment, an optical thin film such as an anti-reflection coating (not graphically illustrated) may be deposited on a surface of the optical device 10.

Next, a description is given of methods of producing an optical device according to this embodiment. Methods of producing the optical device 10 according to this embodiment include forming the optical device 10 by performing wet etching on the base material 11, forming the optical device 10 by forming a resist pattern by gray scale exposure and thereafter performing dry etching on the base material 11, forming the optical device 10 by press forming using a forming mold or the like, and forming the optical device 10 by imprinting.

A description is give below of four production methods as examples of methods of producing an optical device according to this embodiment by performing wet etching on the base material 11.

[First Method of Producing Optical Device]

Figure 4A:
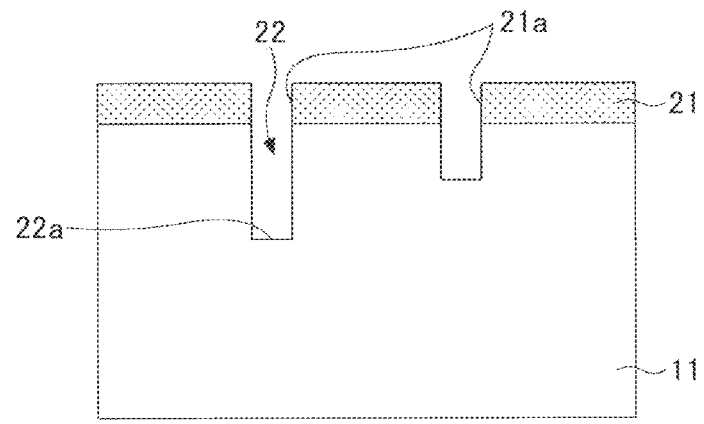
FIGS. 4A through 4C are diagrams illustrating a method of producing an optical device according to the first embodiment.
Figure 4B:
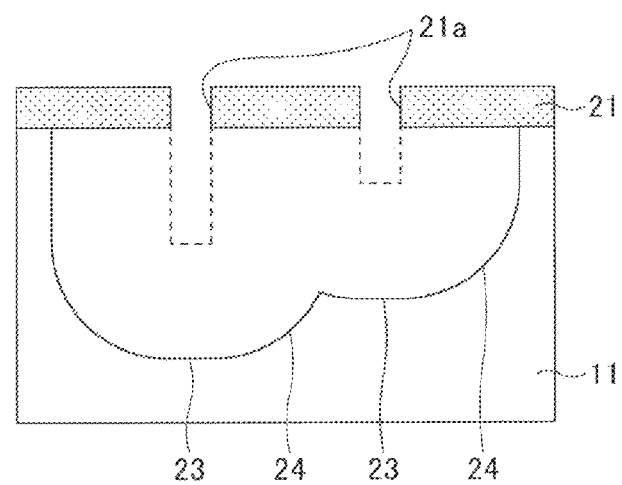
Figure 4C:
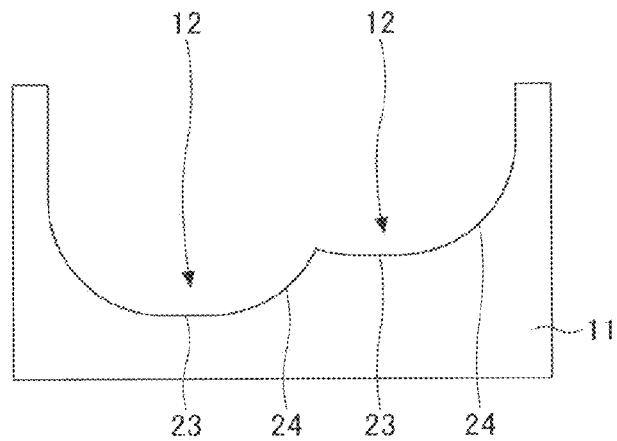

First, a description is given, with reference to FIGS. 4A through 4C, of a first method of producing an optical device.

Referring to FIG. 4A, according to this method, first, a patterned mask 21 is formed on the base material 11 formed of glass or the like, and holes 22 are formed in the base material 11 at openings 21a of the mask 21. The mask 21 and the holes 22 may be formed by a combination of processes such as photolithography and etching or lift-off or by blasting.

In general, it is difficult for blasting to control the depth of the holes 22 and the size of the openings 21a of the mask 21. Therefore, it is preferable to form the mask 21 and the holes 22 by a combination of processes such as photolithography and etching or lift-off. In the case of forming the mask 21 and the holes 22 by the combination of photolithography and etching, it is possible to employ dry etching to form the holes 22. In this case, bottom surfaces 22a of the holes 22 are processed to be flat.

Next, referring to FIG. 4B, wet etching is performed on the structure of FIG. 4A, where the mask 21 is formed on the base material 11 and the holes 22 are formed in regions of the base material 11 where the openings 21a of the mask 21 are formed. As a result, part of the base material 11 is removed by wet etching with the holes 22 serving as starting points of the wet etching, so that the concaves 12 are formed on a surface of the base material 11. Hereinafter, the concaves 12 may be collectively referred to as "concave 12" where appropriate. According to wet etching, the base material 11 is isotropically etched and partly removed, so that the bottom of the concave 12 is defined by a flat surface 23. Accordingly, the concave 12 has a surface defined by the flat surface 23 and a curved surface 24. At the curved surface 24, the concave 12 has a curved shape, which forms an arc in a cross section. When the mask 21 does not have much resistance to wet etching, a cross-sectional shape of an edge portion of the concave 12 may differ from an arc because of removal of the mask 21. In this case, at least part of the curved surface 24 that extends from the flat surface 23 forms an arc in a cross section of the concave 12. The mask 21 is preferably formed of a material that is patternable and highly resistant to wet etching, for example, a metal material such as chromium or molybdenum.

Next, referring to FIG. 4C, the mask 21 is removed, so that the optical device 10 according to this embodiment is produced.

The flat surface 23 of the concave 12 corresponds to the bottoms 13, 13a and 13b in FIGS. 1B through 2B, and is defined by a surface perpendicular to a thickness direction of the base material 11. The boundary between the flat surface 23 and the curved surface 24 may be determined by measuring the value of a radius of curvature in a cross-sectional direction. In this case, the radius of curvature near the boundary between the flat surface 23 and the curved surface 24 is observed as changing from a radius of curvature of a fixed value to an infinite radius of curvature. Such a change is ideally a sharp change. If the change at the boundary is not a sharp change, a region of a predetermined radius of curvature or more, such as a region of a radius of curvature that is a or more times that of the curved surface 24, may be regarded as the flat surface 23. The value of a is preferably 1.1 or more. A three-dimensional measurement apparatus may be used for such measurement of a radius of curvature or the like. Furthermore, when the curved surface 24 has a large curvature, it is possible that a change in the radius of curvature is not determined within the S/N range of a three-dimensional measurement apparatus. In this case, however, the boundary between the flat surface 23 and the curved surface 24 and the size of the flat surface 23 may be determined by observing the shape of the concave 12 with an electron microscope, an atomic force microscope or the like.

[Second Method of Producing Optical Device]

Figure 5A:
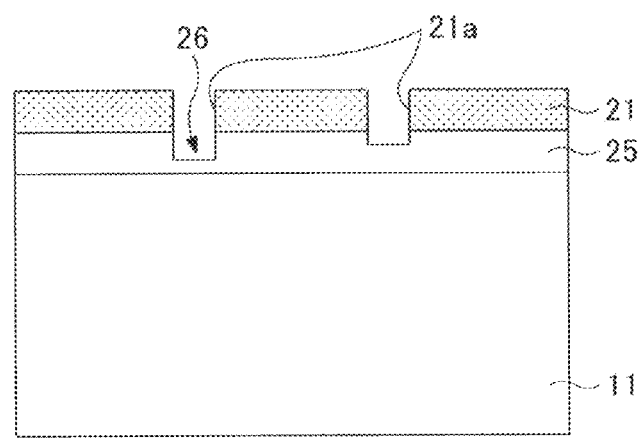
FIGS. 5A through 5C are diagrams illustrating a method of producing an optical device according to the first embodiment.
Figure 5B:
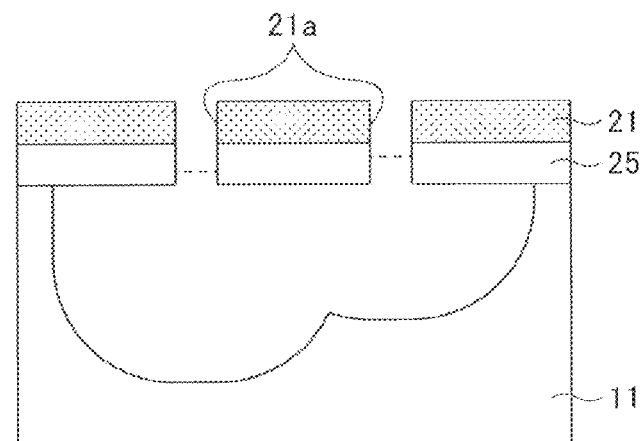
Figure 5C:
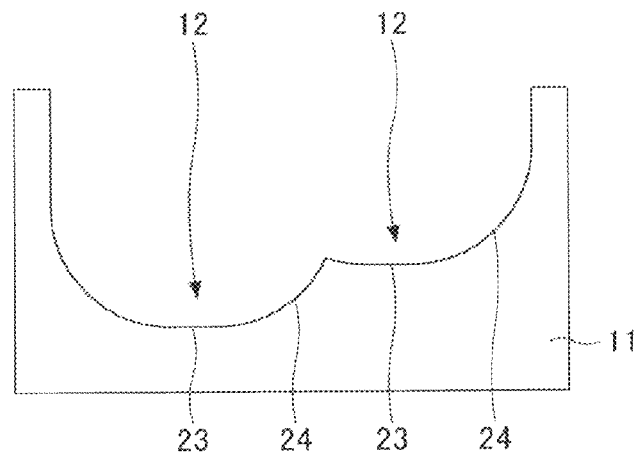

Next, a description is given, with reference to FIGS. 5A through 5C, of a second method of producing an optical device.

According to the method illustrated in FIGS. 4A through 4C, the holes 22 are formed in the base material 11 of glass or the like. In this case, depending on the kind of glass that forms the base material 11, dry etching for forming the holes 22 may take an extremely long time, and the base material 11 may be hardly processed by dry etching, thus resulting in formation of no holes 22. According to the method illustrated in FIGS. 5A through 5C, a thin film layer 25 of $SiO_2$, $Ta_2O_5$ or the like that is processable by dry etching is preformed on a surface of the base material 11.

Specifically, referring to FIG. 5A, first the thin film layer 25 of $SiO_2$, $Ta_2O_5$ or the like that is processable by dry etching is formed on a surface of the base material 11. The mask 21 is formed on the thin film layer 25, and holes 26 are formed in the thin film layer 25 at some of the openings 21a of the mask 21. This facilitates formation of the holes 26 and enables subsequent processing by wet etching.

Next, referring to FIG. 5B, the structure of FIG. 5A where the thin film layer 25 and the mask 21 are stacked in layers on the base material 11 with the holes 26 formed in the thin film layer 25 is subjected to wet etching, so that part of the thin film layer 25 and part of the base material 11 are removed. At this point, the base material 11 is isotropically etched and partly removed by wet etching, so that the concaves 12 are formed in the base material 11.

Next, referring to FIG. 5C, the mask 21 and the thin film layer 25 are removed, so that the optical device 10 according to this embodiment is produced.

The thin film layer 25 is preferably formed of a material whose etching rate is lower than that of glass. For example, Haixin Zhu et al., Journal of Micromechanics and Microengineering, 19 (2009) 065013 describes wet etching rates for various glass materials. According to this document, wet etching rates for quartz having the same composition as $SiO_2$ and a glass material may differ by ten times or more.

Letting the ratio of wet etching rates of the base material 11 and $SiO_2$ be r and letting the distribution range of the positions of the bottoms of the holes 26 of the thin film layer 25 in a depth direction be $\Delta D$, the eventual distribution range $\Delta d$ of the positions of the bottoms 13 of the concaves 12 in the depth direction equals $r\Delta D$ ($\Delta d=r\Delta D$). Accordingly, for example, if r is 10 and $\Delta d$ required is 1 μm, $\Delta D$ is 100 nm. Thus, in addition to being able to process various kinds of glass materials, it is possible to reduce the amount of processing in the holes 26. Therefore, besides dry etching, lift-off and a sol-gel process may be used to form the holes 26 in the thin film layer 25.

Besides $SiO_2$, $Ta_2O_5$, etc., sol-gel and organic materials may be used as materials for forming the thin film layer 25. In the case of using sol-gel or organic materials, the thin film layer 25 may be patterned by an imprint process.

[Third Method of Producing Optical Device]

Figure 6A:
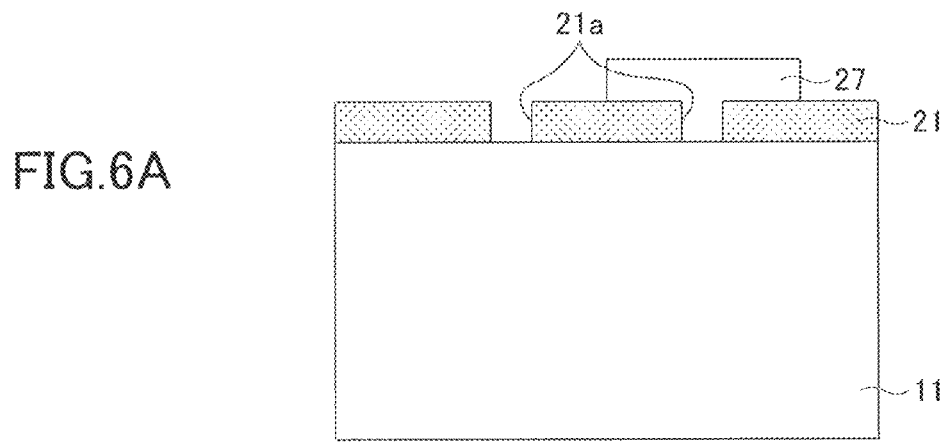
FIGS. 6A through 6C are diagrams illustrating a method of producing an optical device according to the first embodiment.
Figure 6B:
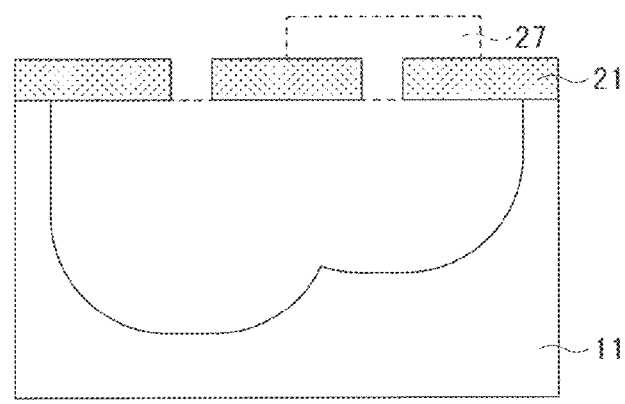
Figure 6C:
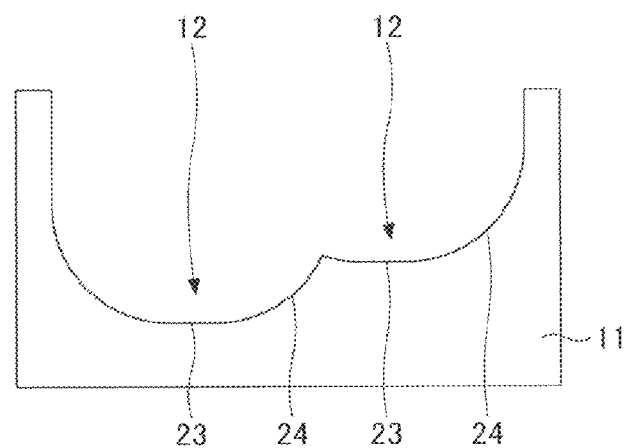

Next, a description is given, with reference to FIGS. 6A through 6C, of a third method of producing an optical device.

Like the method illustrated in FIGS. 5A through 5C, the method illustrated in FIGS. 6A through 6C controls the positions of bottoms in a depth direction using a thin film layer. Instead of forming holes in the thin film layer, however, the third method forms a thin film layer 27 on some of the openings 21a of the patterned mask 21. This makes it possible to control time before a wet etching liquid reaches the base material 11 because of a difference in thickness caused by the thin film layer 27, so that it is possible to locate the bottoms 13 of the formed concaves 12 at different positions in a depth direction.

Referring to FIG. 6A, according to the third method, first, the mask 21 having the openings 21a is formed on a surface of the base material 11, and the thin film layer 27 is formed on the base material 11 and the mask 21 in part of a region of the mask 21 where the openings 21a are formed.

Next, referring to FIG. 6B, the structure of FIG. 6A where the mask 21 and the thin film layer 27 are formed on the base material 11 is subjected to wet etching, so that the thin film layer 27 and part of the base material 11 are removed. At this point, the base material 11 is isotropically etched and partly removed by wet etching, so that the concaves 12 are formed in the base material 11.

Next, referring to FIG. 6C, the mask 21 is removed, so that the optical device 10 according to this embodiment is produced.

While a description is given of the case where the thin film layer 27 is formed on the mask 21 in FIGS. 6A through 6C, it is also possible to form the thin film layer 27 having openings on the base material 11 and form the mask 21 on the thin film layer 27. The thin film layer 27 may be formed of the same material as the thin film layer 25. Furthermore, the thin film layer 27 may be formed in the same manner as the thin film layer 25.

[Fourth Method of Producing Optical Device]

Figure 7A:
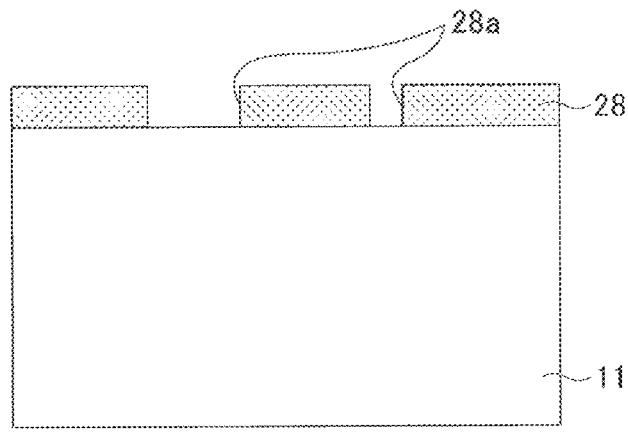
FIGS. 7A through 7C are diagrams illustrating a method of producing an optical device according to the first embodiment.
Figure 7B:
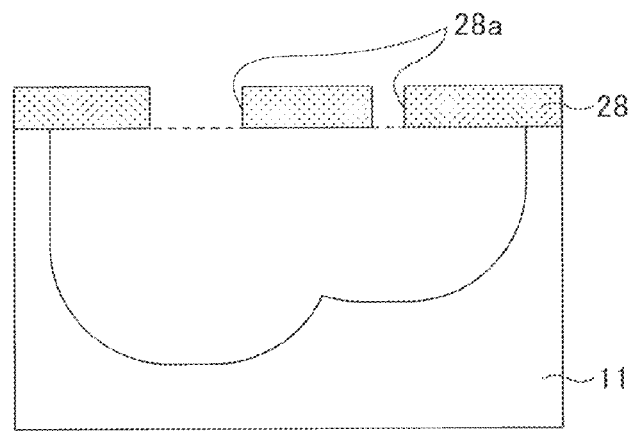
Figure 7C:
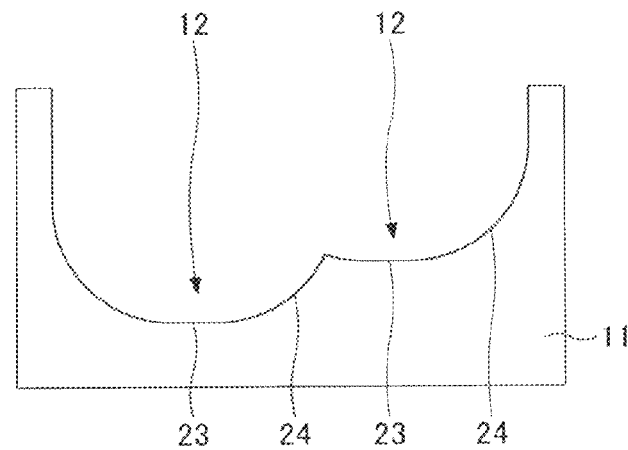

Next, a description is given, with reference to FIGS. 7A through 7C, of a fourth method of producing an optical device.

According to the method illustrated in FIGS. 5A through 5C and according to the method illustrated in FIGS. 6A through 6C, the concaves 12 are formed to have their bottoms 13 located at different positions in a depth direction by forming the thin film layer 25 and by forming the thin film layer 27, respectively. On the other hand, according to the method illustrated in FIGS. 7A through 7C, the bottoms 13 of the concaves 12 are caused to be at different positions in a depth direction by having openings 28a of different sizes in a mask 28. The mask 28 is formed of the same material as the above-described mask 21.

Referring to FIG. 7A, according to the production method illustrated in FIGS. 7A through 7C, first, the mask 28 having the openings 28a of different sizes is formed on a surface of the base material 11.

Next, referring to FIG. 7B, the structure of FIG. 7A where the mask 28 is formed on the base material 11 is subjected to wet etching, so that the base material 11 is removed at the openings 28a of the mask 28. At this point, the base material 11 is isotropically etched and partly removed by wet etching, so that the concaves 12 are formed in the base material 11.

Next, referring to FIG. 7C, the mask 28 is removed, so that the optical device 10 according to this embodiment is produced.

According to the methods illustrated in FIGS. 4A through 6C, the base material 11 formed of glass is removed through the openings 21a formed in the mask 21 by wet etching. In this case, the interchange efficiency of a portion of the etching liquid between the mask 21 and the base material 11 and a portion of the etching liquid outside the mask 21 is believed to depend on the size of the opening 21a in the mask 21. Accordingly, the portions of the etching liquid are more efficiently interchanged so that the etching rate of wet etching becomes higher in the case of a large mask opening than in the case of a small mask opening. Because a difference in the etching rate of wet etching results in a difference in depth between the concaves 12, it is possible to form the concaves 12 so that the bottoms 13 of the concaves 12 are at different positions in a depth direction. In the case of producing the optical device 10 by the method illustrated in FIGS. 7A through 7C, the flat surface 23 becomes larger as the flat surface 23 is formed at a deeper position in a depth direction in the formed concave 12 including the flat surface 23 and the curved surface 24.

According to the method of producing an optical device illustrated in FIGS. 7A through 7C, when the opening 28a in the mask 28 is too large, an area occupied by the flat surface 23 in the concave 12 becomes too large. Therefore, the openings 28a of the mask 28 are preferably 10 µm or less in width, and more preferably, 5 µm or less in width. Furthermore, when the bottoms 13 are irregularly positioned, the bottoms 13 are at irregular intervals, so that the time required to remove the base material 11 between adjacent concaves 12 may vary in the process of wet etching. In this case, the etching rate may vary from concave 12 to concave 12 because the condition of a wet etching liquid differs from concave 12 to concave 12. In this case, it is possible to cause the bottoms 13 to be at different positions in a depth direction even when the openings 21a of the mask 21 are uniform in size.

Furthermore, according to the methods illustrated in FIGS. 4A through 7C, it is possible that the concave 12 of a desired shape is not formed if there is removal of the mask 21 or 28 or a local concentration in the concentration distribution of an etching liquid. Therefore, the radius of curvature of the curved surface 24 is preferably within ±50%, more preferably, within ±30%, and still more preferably, within ±10% of the average radius of curvature.

Furthermore, in the case of employing the above-described production methods, as the bottom 13b is at a deeper position, the position of the point 14 is more distant from the point 15 as illustrated in FIG. 2B. Accordingly, there is a correlation between the area of the polygon occupied by each concave 12 in a plan view like FIG. 2A and the depth of the bottom 13. Accordingly, it is possible to employ the correlation between the area of the polygon occupied by the concave 12 and the depth of the bottom 13 as an index for determining a difference between a produced device and its design. Here, it is preferable to process an optical device so that the absolute value of the coefficient of correlation of the area of the polygon occupied by the concave 12 and the depth of the bottom 13 is 0.2 or more, and more preferably, 0.4 or more, when the coefficient of correlation is calculated.

Next, a description is given, with reference to FIGS. 8A through 9B, of optical devices having other structures according to this embodiment.

FIG. 8A is a plan view of an optical device according to this embodiment. FIG. 8B is a schematic cross-sectional view of the optical device, taken along a plane including a one-dot chain line 8A-8B in FIG. 8A.

Referring to FIGS. 8A and 8B, an optical device 30 according to this embodiment includes a base material 31 having a surface on which multiple convexes 32 are formed. According to the optical device 30, the base material 31 may be formed of the same material as the base material 11 of the optical device 10. Furthermore, according to the optical device 30, tops 33 of the convexes 32 correspond to the bottoms 13 of the concaves 12 of the optical device 10, and the positions of the tops 33 of the convexes 32 in a height direction correspond to the positions of the bottoms 13 in a depth direction.

The optical device 30 on which the convexes 32 are formed may be produced by forming a predetermined resist shape with a gray scale mask or a forming mold and transferring the predetermined shape onto a base material by dry etching, by transferring irregularities of a forming mold onto a surface of a base material by press forming, or placing a resin material between a base material and a forming mold and transferring irregularities of the forming mold onto the resin material.

In the case of performing dry etching or press forming, if the average difference in height (level) $\Delta z_{avg}$ is large, the amount of etching by dry etching increases, thus making it difficult to perform processing. Furthermore, in the case of employing press forming, there is the problem of processing deficiencies, so that it is preferable to satisfy one of the above-described expressions (1) through (3) in light of processing as well.

As forming molds in the above-described processing methods, forming molds processed by the above-described first through fourth production methods may be used in addition forming molds formed by cutting. Furthermore, replicas of forming molds processed by the above-described first through fourth production methods may be created and used as forming molds.

Figure 9B:
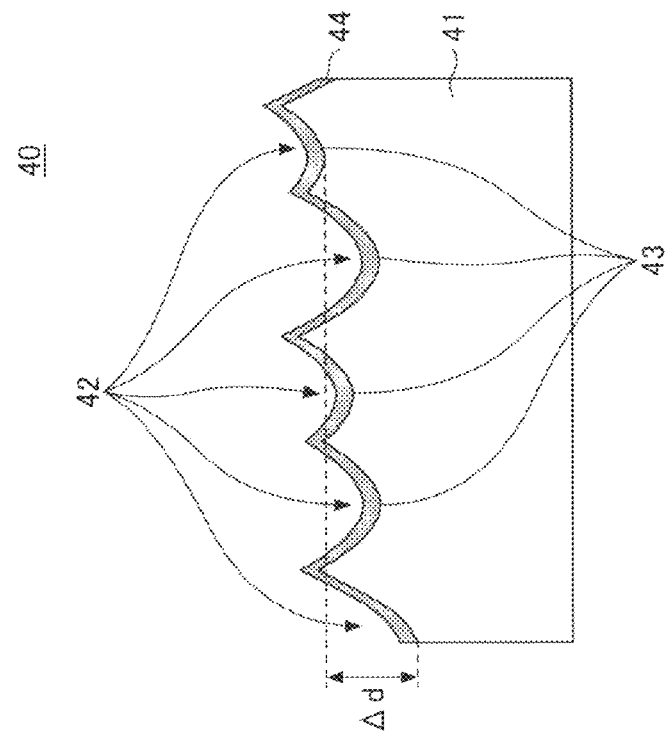
FIGS. 9A and 9B are diagrams illustrating a structure of an optical device according to the first embodiment.
Figure 9A:
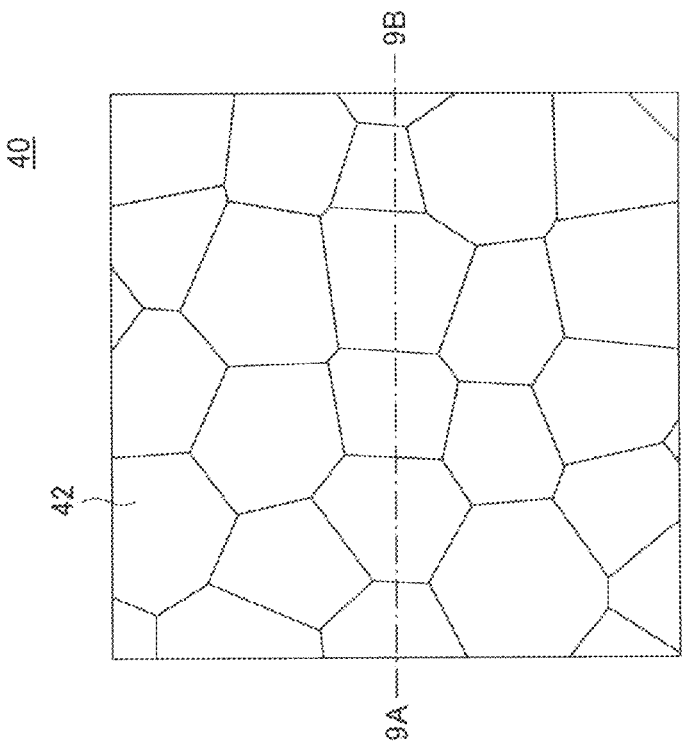

FIG. 9A is a plan view of an optical device according to this embodiment. FIG. 9B is a schematic cross-sectional view of the optical device, taken along a plane including a one-dot chain line 9A-9B in FIG. 9A.

Referring to FIGS. 9A and 9B, an optical device 40 according to this embodiment is a reflection optical device, and includes a base material 41 having a surface on which multiple concaves 42 are formed, and a reflection coating 44 formed on the surface of the base material 41 on which the concaves 42 are formed. According to the optical device 40, the concaves 42 include respective bottoms 43 the same as the concaves 12 include the bottoms 13. The reflection coating 44 may be formed of a dielectric multilayer film or a metal film. According to the optical device 40, letting the refractive index of a medium around the concaves 42 be n2 and letting the wavelength of an entering beam flux be λ, a relationship holds that is expressed by:

$$2/\pi \leq |2 \times n2 \times \Delta d|/\lambda \leq 10. \quad (4)$$

Furthermore, according to the optical device 40, preferably, a condition is satisfied that is expressed by:

$$2/\pi \leq |2 \times n2 \times \Delta d|/\lambda \leq 5, \quad (5)$$

and more preferably, a condition is satisfied that is expressed by:

$$2/\pi \leq |2 \times n2 \times \Delta d|/\lambda \leq 2. \quad (6)$$

Furthermore, in each of the transmission type and the reflection type, generally, in the case of employing an optical path difference (ΔL) corresponding to the positions of the bottoms 43 in a depth direction, a relationship holds that is expressed by:

$$2/\pi \leq |\Delta L|/\lambda \leq 10. \quad (7)$$

As described above, a smaller distribution of the positions of the bottoms 43 in a depth direction is preferable. Therefore, preferably, a relationship holds that is expressed by:

$$2/\pi \leq |\Delta L|/\lambda \leq 5, \quad (8)$$

and more preferably, a relationship holds that is expressed by:

$$2/\pi \leq |\Delta L|/\lambda \leq 2. \quad (9)$$

According to the optical device 40 illustrated in FIGS. 9A and 9B, in addition to glass, opaque materials such as metals and semiconductors may be used for the base material 41.

Next, a description is given of a projector according to this embodiment.

Figure 10:
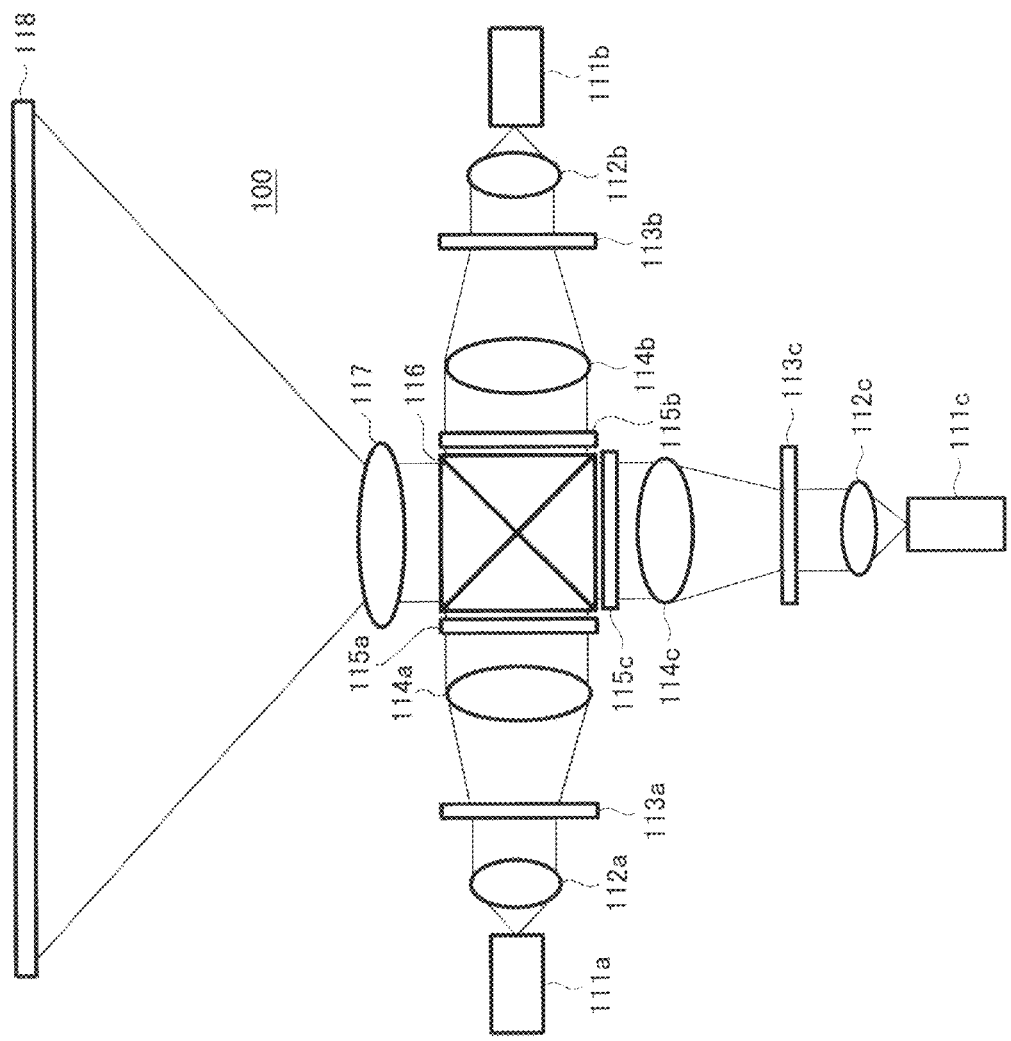
FIG. 10 is a diagram illustrating a structure of a projector according to the first embodiment.

FIG. 10 is a schematic diagram illustrating a structure of a projector 100 according to this embodiment. The projector 100 includes laser light sources 111a, 111b and 111c, lenses 112a, 112b and 112c, optical devices 113a, 113b and 113c, lenses 114a, 114b and 114c, spatial light modulators 115a, 115b and 115c, a multiplexing prism 116, and a lens 117. According to this embodiment, laser light or the like emitted from each of the laser light sources 111a, 111b and 111c may be referred to as "beam flux". Furthermore, according to the projector 100 of this embodiment, the optical devices 113a, 113b and 113c may be any of the above-described optical devices according to this embodiment, such as the optical device 10.

The laser light source 111a emits, for example, laser light in a red wavelength region. The laser light emitted from the laser light source 111a has its angle of divergence adjusted by the lens 112a, is diffused by the optical device 113a, again has its angle of divergence adjusted by the lens 114a, and enters the multiplexing prism 116 through the spatial light modulator 115a. The spatial light modulator 115a, for example, controls whether to transmit light or not pixel by pixel so as to form an image corresponding to a red color.

The laser light source 111b emits, for example, laser light in a green wavelength region. The laser light emitted from the laser light source 111b has its angle of divergence adjusted by the lens 112b, is diffused by the optical device 113b, again has its angle of divergence adjusted by the lens 114b, and enters the multiplexing prism 116 through the spatial light modulator 115b. The spatial light modulator 115b, for example, controls whether to transmit or block light pixel by pixel so as to form an image corresponding to a green color.

The laser light source 111c emits, for example, laser light in a blue wavelength region. The laser light emitted from the laser light source 111c has its angle of divergence adjusted by the lens 112c, is diffused by the optical device 113c, again has its angle of divergence adjusted by the lens 114c, and enters the multiplexing prism 116 through the spatial light modulator 115c. The spatial light modulator 115c, for example, controls whether to transmit or block light pixel by pixel so as to form an image corresponding to a blue color.

The laser light from the spatial light modulator 115a, the laser light from the spatial light modulator 115b, and the laser light from the spatial light modulator 115c enter the multiplexing prism 116 to be multiplexed and thereafter exit from the multiplexing prism 116. Thus, a laser beam of the multiplexed laser light exiting from the multiplexing prism 116 is projected onto a screen 118 through the lens 117.

According to this embodiment, various kinds of lasers such as semiconductor lasers and solid-state lasers that generate second harmonic light may be used as the laser light sources 111a, 111b and 111c. Furthermore, the laser light sources 111a, 111b and 111c may individually employ multiple lasers. The laser light sources 111a, 111b and 111c are not limited to lasers, and the exiting windows of optical fibers or the like through which beam fluxes from laser light sources propagate may also be used as equivalents of the laser light sources 111a, 111b and 111c.

Furthermore, while a laser is employed for each of the red, green, and blue beam fluxes in FIG. 10, a laser may be employed for at least one of the red, green, and blue light sources. Furthermore, while the optical devices 113a, 113b and 113c are employed for all of the red, green, and blue beam fluxes in FIG. 10, the optical device according to this embodiment may be employed for at least one of the red, green, and blue beam fluxes.

As the spatial light modulators 115a, 115b and 115c, a liquid crystal on silicon (LCOS) or a digital mirror device (DMD) may be employed. FIG. 10 illustrates a case where LCOSs are employed. In the case of using a DMD, which is a reflection spatial light modulator, the DMD may be placed at a stage subsequent to the multiplexing prism 116 so that light reflected from the DMD may be projected through the lens 117, instead of employing the transmission-type arrangement as illustrated in FIG. 10.

Figure 11:
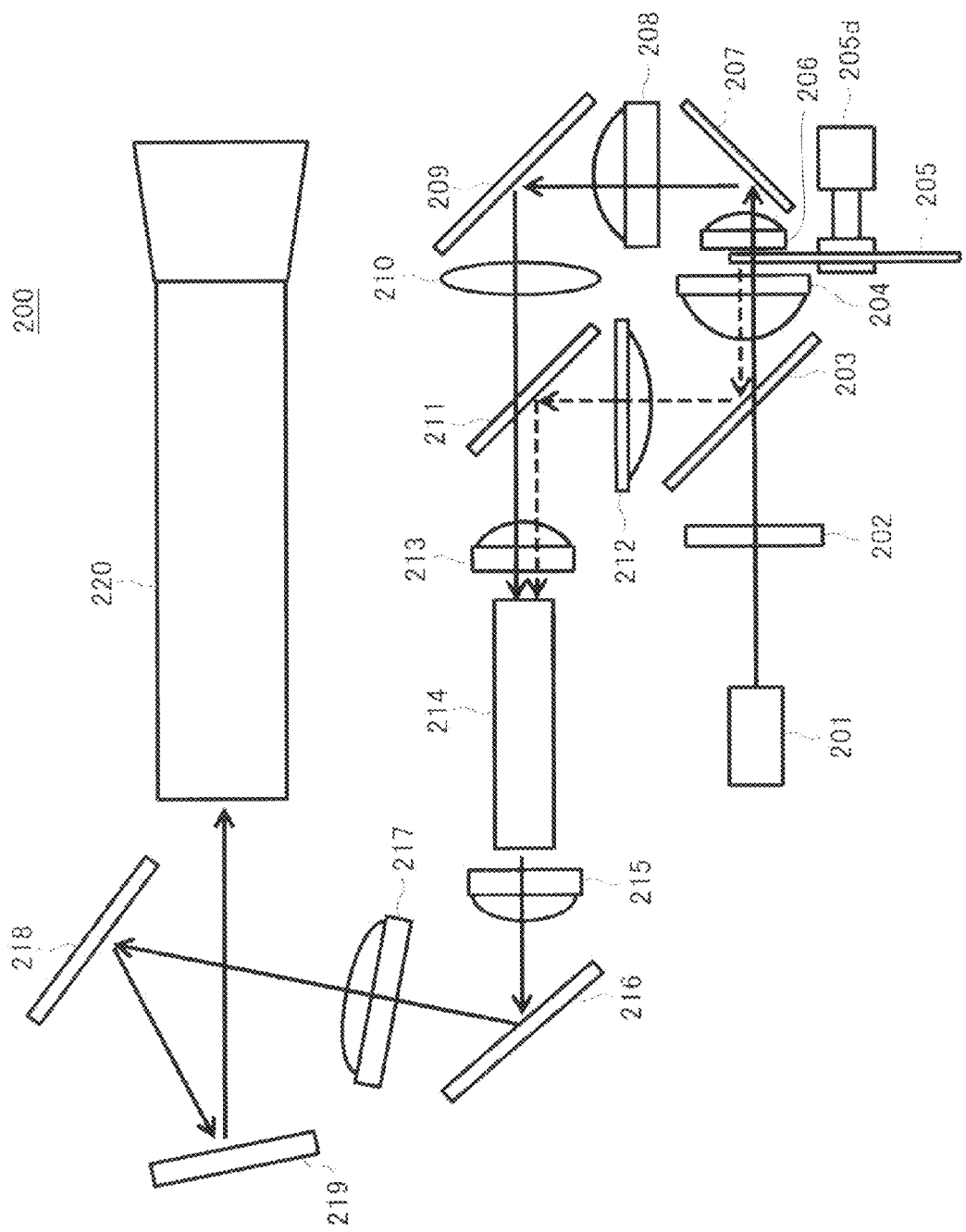
FIG. 11 is a diagram illustrating a structure of a projector according to the first embodiment.

Next, a description is given of a projector having another structure according to this embodiment. FIG. 11 is a schematic diagram illustrating a projector 200 having another structure according to this embodiment. The projector 200 includes a blue laser light source 201 as a light source. A beam flux emitted from the blue laser light source 201 is transmitted through a first optical device 202 and a dichroic mirror 203 so as to be incident on a fluorescent wheel 205 through a lens 204. One of the above-described optical devices according to this embodiment, such as the optical device 10, is used for the first optical device 202.

Figure 12:
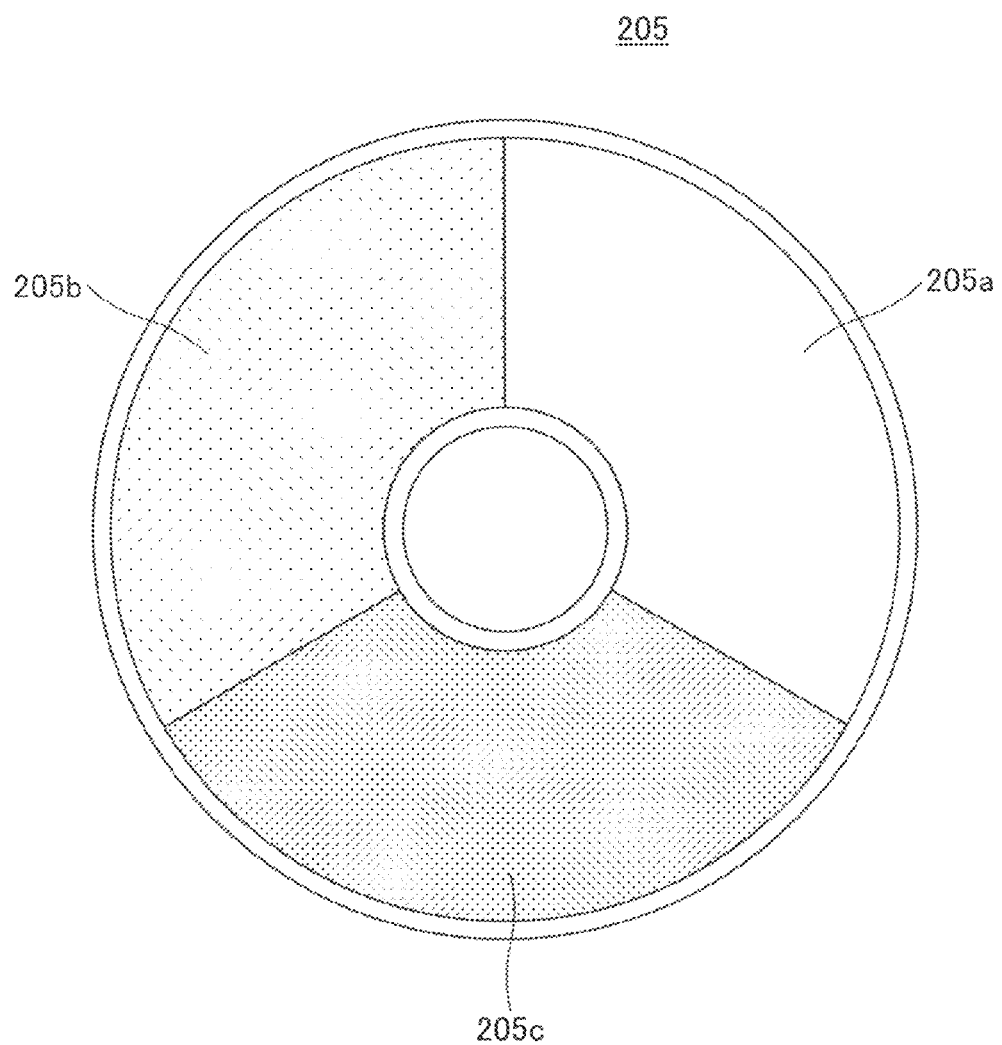
FIG. 12 is a diagram illustrating a structure of a fluorescent wheel according to the first embodiment.

FIG. 12 is a diagram illustrating a structure of a fluorescent wheel according to this embodiment. Referring to FIG. 12, the fluorescent wheel 205 is divided into the three regions of an optical device region 205a, a green fluorescent substance region 205b, and a red fluorescent substance region 205c. A second optical device is formed in the optical device region 205a. The green fluorescent substance region 205b is formed of a fluorescent substance (fluorescent material) that emits green light. The red fluorescent substance region 205c is formed of a fluorescent substance (fluorescent material) that emits red light. The second optical device in the optical device region 205a has the same structure as the optical device 10 according to this embodiment.

The fluorescent wheel 205 may be rotated by a rotary drive part 205d such as a motor, so that green light is obtained when the laser light from the blue laser light source 201 is emitted onto the green fluorescent substance region 205b and red light is obtained when the laser light from the blue laser light source 201 is emitted onto the red fluorescent substance region 205c. When the laser light from the blue laser light source 201 is emitted onto the optical device region 205a, the blue light passes through the optical device region 205a. Accordingly, the fluorescent wheel 205 may emit blue light, green light, and red light in a time division manner by being rotated by the rotary drive part 205d. Referring to FIG. 11, the fluorescent light generated in and emitted from the green fluorescent substance region 205b and the red fluorescent substance region 205c travels in the optical path indicated by a broken line. That is, the emitted fluorescent light passes through the lens 204 and is reflected by the dichroic mirror 203 to enter a lens 212, and after passing through the lens 212, is reflected by a multiplexing mirror 211 to be incident on an integrator 214 through a lens 213. According to this embodiment, a yellow fluorescent substance region formed of a yellow fluorescent substance may be provided instead of or in addition to the green fluorescent substance region 205b or the red fluorescent substance region 205c in the fluorescent wheel 205.

Examples of oxide or sulfide fluorescent substances that may be employed include YAG fluorescent substances ($Y_3Al_5O_{12}$:Ce and $(Y,Gd)_3Al_5O_{12}$:Ce) and a TAG fluorescent substance ($Tb_3Al_5O_{12}$:Ce) that emit yellow light, and silicate and alkaline-earth fluorescent substances that emit fluorescent light of various colors depending on an added element. Furthermore, α-SiAlONs that emit fluorescent light of various colors depending on an added element, β-SiAlONs (SiAlON:Eu) that emit green fluorescent light, and CASN ($CaAlSi_3N_3$:Eu) that emits red fluorescent light may be employed as nitride fluorescent substances. Furthermore, La oxynitride ($LaAl(Si_6\text{-}zAl_2)N_{10}\text{-}zO_2$:Ce) may be employed as an oxynitride fluorescent substance.

When a blue beam flux is emitted onto the second optical device in the optical device region 205a of the fluorescent wheel 205, the blue beam flux is diffused by the second optical device, and the blue beam flux passing through the second optical device has its angle of divergence changed by a lens 206. Thereafter, the blue beam flux is reflected by a mirror 207, passes through a lens 208, is reflected by a mirror 209, and passes through a lens 210, the multiplexing mirror 211, and the lens 213 to be incident on the integrator 214.

The blue, green, and red beam fluxes exiting from the integrator 214 pass through a lens 215, are reflected by a mirror 216, pass through a lens 217, and are reflected by a mirror 218 to be incident on a spatial light modulator 219. An image is formed in the spatial light modulator 219, and the formed image is projected onto an external screen (not illustrated) through a projection lens 220.

Here, the first optical device 202 has the function of making uniform the intensity distribution of light emitted onto fluorescent substances in the fluorescent wheel 205. A fluorescent substance in the fluorescent wheel 205 is a mixture of a silicon resin and a fluorescent material, and when exposed to a blue beam flux having a high peak value, suffers, for example, degradation of the silicon resin in a region exposed to the blue beam flux having a high peak value. The first optical device 202 is used to reduce such degradation. Thus, by using the first optical device 202, it is possible to achieve a top-hat exiting light distribution instead of a mountain-shaped exiting light distribution by typical diffusers. This reduces the peak value of a beam flux, thus making it possible to expose a fluorescent substance to a beam flux of greater intensity. Furthermore, the second optical device in the optical device region 205a of the fluorescent wheel 205 has the function of making a spatial intensity distribution uniform, so that it is possible to increase the uniformity by rotating the fluorescent wheel 205.

EXAMPLES

Next, a description is given of examples according to the first embodiment. Here, Examples 1 through 3 are comparative examples, and Examples 4 through 12 are examples according to this embodiment. Furthermore, Example 13 is a comparative example, and Example 14 is an example according to this embodiment. In Examples 1 through 14, the refractive index n2 of a medium around the concaves 12 is 1. Furthermore, while the case where the full width at half maximum of a diffusion angle is 3° or less is illustrated in each example, the present invention is not limited to this, and may also be applied in the case where the full width at half maximum of a diffusion is 3° or more.

Example 1

First, a description is given, with reference to FIGS. 13A through 13D, of an optical device according to Example 1.

The base material 11 formed of glass of a refractive index of 1.53 is cleaned, and a molybdenum film of 50 nm in thickness is deposited on the base material 11 as the mask 21. After deposition of the molybdenum film, a resist is applied, and openings of 1 µm in diameter are formed in the mask 21 by photolithography and etching so as to be arranged as illustrated in FIG. 13A. FIG. 13A illustrates the positions of openings within an area of approximately 1 mm square, where the openings are arranged in a plane at a pitch of 50 µm so that the nearest openings are connected to form equilateral triangles. After formation of the openings, wet etching of 480 µm is performed. Accordingly, the curved surface 24 in the concave 12 has a radius of curvature of 480 µm. FIG. 13B illustrates a planar shape of the optical device after processing. In FIG. 13B, the depth is illustrated in grayscale, so that the color becomes darker as the depth increases.

FIG. 13C illustrates a result of calculation of an exiting light distribution in the case where light of a wavelength of 450 nm enters this optical device. The calculation is performed by determining the Fourier transform of a phase difference generated from the shape of FIG. 13B. As illustrated in FIG. 13C, diffraction due to a regular arrangement occurs so that intense light is generated in particular directions. FIG. 13D illustrates a graphical representation of the intensity of the exiting light distribution of FIG. 13C in a horizontal direction, averaged at angular intervals of 0.21°, relative to the degree. As illustrated in FIG. 13D, intense light is generated in particular directions. Furthermore, in FIG. 13D, light within the range of angles of ±1.25° adds up to 75.2%, and the value of $|(n1-n2) \times \Delta d|/\lambda$ is 0.

Example 2

Next, a description is given, with reference to FIGS. 14A through 14D, of an optical device according to Example 2, focusing on differences from that of Example 1.

Openings of 1 µm in diameter are formed in the mask 21 so as to be arranged as illustrated in FIG. 14A. FIG. 14A illustrates the positions of openings within an area of approximately 1 mm square, where a positional irregularity of the value of 25% of the pitch is introduced into such an arrangement of openings in a plane at a pitch of 50 µm that the nearest openings are connected to form equilateral triangles. After formation of the openings, wet etching of 480 µm is performed. Accordingly, the curved surface 24 in the concave 12 has a radius of curvature of 480 µm. FIG. 14B illustrates a planar shape of the optical device after processing. In FIG. 14B, the depth is illustrated in grayscale, so that the color becomes darker as the depth increases.

FIG. 14C illustrates a result of calculation of an exiting light distribution in the case where light of a wavelength of 450 nm enters this optical device. The calculation is performed by determining the Fourier transform of a phase difference generated from the shape of FIG. 14B. As illustrated in FIG. 14C, diffraction due to a regular arrangement occurs so that intense light is generated in particular directions. In particular, the amount of rectilinearly transmitted light is large. FIG. 14D illustrates a graphical representation of the intensity of the exiting light distribution of FIG. 14C in a horizontal direction, averaged at angular intervals of 0.21°, relative to the degree. As illustrated in FIG. 14D, intense light is generated in particular directions. Furthermore, in FIG. 14D, light within the range of angles of ±1.25° adds up to 69.4%, and the value of $|(n1-n2) \times \Delta d|/\lambda$ is 0.

Example 3

Next, a description is given, with reference to FIGS. 15A through 15D, of an optical device according to Example 3, focusing on differences from that of Example 1.

Openings of 1 µm in diameter are formed in the mask 21 so as to be arranged as illustrated in FIG. 15A. FIG. 15A illustrates the positions of openings within an area of approximately 1 mm square, where a positional irregularity of the value of 50% of the pitch is introduced into such an arrangement of openings in a plane at a pitch of 50 µm that the nearest openings are connected to form equilateral triangles. After formation of the openings, wet etching of 480 µm is performed. Accordingly, the curved surface 24 in the concave 12 has a radius of curvature of 480 µm. FIG. 15B illustrates a planar shape of the optical device after processing. In FIG. 15B, the depth is illustrated in grayscale, so that the color becomes darker as the depth increases.

FIG. 15C illustrates a result of calculation of an exiting light distribution in the case where light of a wavelength of 450 nm enters this optical device. The calculation is performed by determining the Fourier transform of a phase difference generated from the shape of FIG. 15B. As illustrated in FIG. 15C, the amount of rectilinearly transmitted light is large in particular. FIG. 15D illustrates a graphical representation of the intensity of the exiting light distribution of FIG. 15C in a horizontal direction, averaged at angular intervals of 0.21°, relative to the degree. As illustrated in FIG. 15D, intense light is generated in the direction of rectilinear transmission. Furthermore, in FIG. 15D, light within the range of angles of ±1.25° adds up to 62.9%, and the value of $|(n1-n2) \times \Delta d|/\lambda$ is 0.

Example 4

Next, a description is given, with reference to FIGS. 16A through 16D, of an optical device according to Example 4.

Figure 16B:
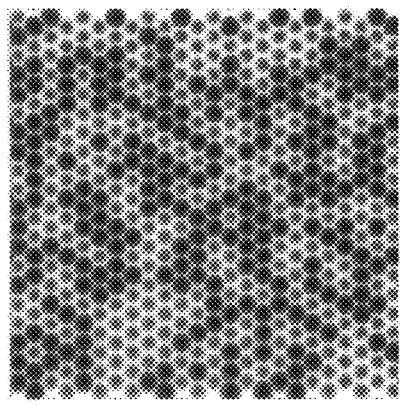
FIGS. 16A through 16D are diagrams for illustrating an optical device of Example 4.
Figure 16A:
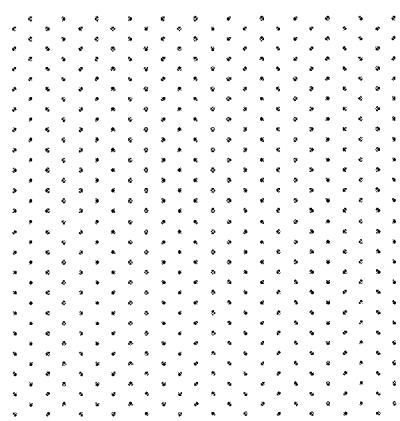

The base material 11 formed of glass of a refractive index of 1.53 is cleaned, a SiO₂ film of 45 nm in thickness is deposited on the base material 11 as the thin film layer 25, and a molybdenum film of 50 nm in thickness is deposited on the thin film layer 25 as the mask 21. After deposition of the molybdenum film, a resist is applied, and openings of 1 µm in diameter are formed in the mask 21 by photolithography and etching so as to be arranged as illustrated in FIG. 16A. FIG. 16A illustrates the positions of openings within an area of approximately 1 mm square, where the openings are arranged in a plane at a pitch of 50 µm so that the nearest openings are connected to form equilateral triangles. After formation of the openings, the SiO₂ film is patterned by photolithography and etching, so that the holes 26 of two depth values, that is, a depth of 0 nm and a depth of 45 nm relative to a reference depth, are formed. After formation of the holes 26, etching of 480 µm is performed with a wet etching liquid that is adjusted so as to cause the ratio of the etching rate of a glass base material to the etching rate of SiO₂ to be 10. Accordingly, the curved surface 24 in the concave 12 has a radius of curvature of substantially 480 µm, and the distribution range of the positions of the bottoms 13 of the concaves 12 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 16B illustrates a planar shape of the optical device after processing. In FIG. 16B, the depth is illustrated in grayscale, so that the color becomes darker as the depth increases.

Figure 16D:
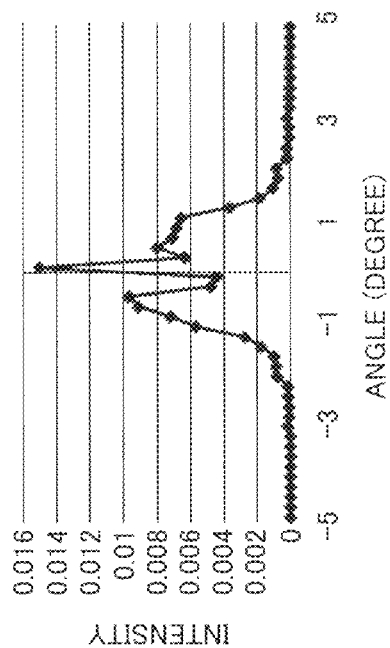
Figure 16C:

FIG. 16C illustrates a result of calculation of an exiting light distribution in the case where light of a wavelength of 450 nm enters this optical device. The calculation is performed by determining the Fourier transform of a phase difference generated from the shape of FIG. 16B. As illustrated in FIG. 16C, the effect of diffraction is reduced, so that the intensity of light caused to exit in a particular direction is reduced. FIG. 16D illustrates a graphical representation of the intensity of the exiting light distribution of FIG. 16C in a horizontal direction, averaged at angular intervals of 0.21°, relative to the degree. As illustrated in FIG. 16D, the effect of diffraction is reduced, so that the intensity of light caused to exit in a particular direction is reduced. Furthermore, in FIG. 16D, light within the range of angles of ±1.25° adds up to 71.2%, and the value of $|(n1-n2) \times \Delta d|/\lambda$ is 0.53.

Example 5

Next, a description is given, with reference to FIGS. 17A through 17D, of an optical device according to Example 5, focusing on differences from that of Example 4.

Figure 17A:
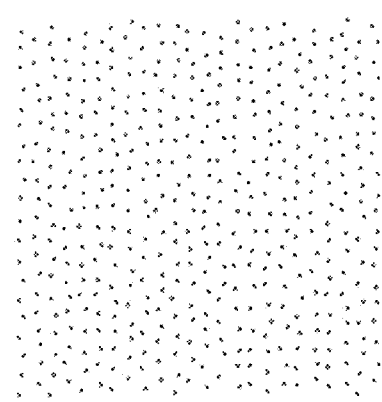
FIGS. 17A through 17D are diagrams for illustrating an optical device of Example 5.
Figure 17B:
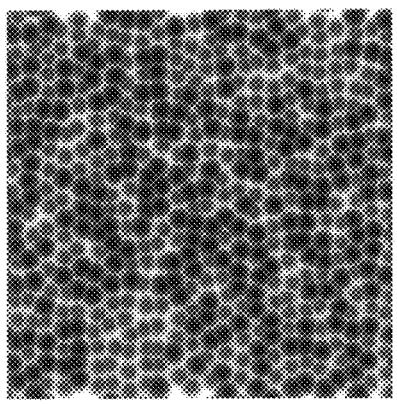

Openings of 1 μm in diameter are formed in the mask 21 so as to be arranged as illustrated in FIG. 17A. FIG. 17A illustrates the positions of openings within an area of approximately 1 mm square, where a positional irregularity of the value of 25% of the pitch is introduced into such an arrangement of openings in a plane at a pitch of 50 μm that the nearest openings are connected to form equilateral triangles. After formation of the openings, the SiO$_2$ film is patterned by photolithography and etching, so that the holes 26 of two depth values, that is, a depth of 0 nm and a depth of 45 nm relative to a reference depth, are formed. After formation of the holes 26, etching of 480 μm is performed with a wet etching liquid that is adjusted so as to cause the ratio of the etching rate of a glass base material to the etching rate of SiO$_2$ to be 10. Accordingly, the curved surface 24 in the concave 12 has a radius of curvature of substantially 480 μm, and the distribution range of the positions of the bottoms 13 of the concaves 12 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 17B illustrates a planar shape of the optical device after processing. In FIG. 17B, the depth is illustrated in grayscale, so that the color becomes darker as the depth increases.

Figure 17C:
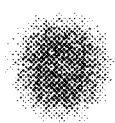
Figure 17D:
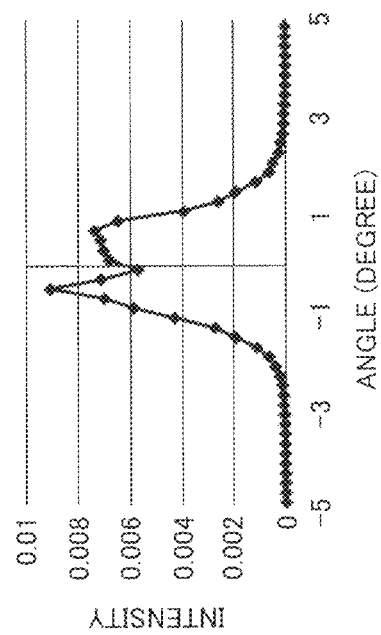

FIG. 17C illustrates a result of calculation of an exiting light distribution in the case where light of a wavelength of 450 nm enters this optical device. The calculation is performed by determining the Fourier transform of a phase difference generated from the shape of FIG. 17B. As illustrated in FIG. 17C, the effect of diffraction is reduced, so that the intensity of light caused to exit in a particular direction is reduced. FIG. 17D illustrates a graphical representation of the intensity of the exiting light distribution of FIG. 17C in a horizontal direction, averaged at angular intervals of 0.21°, relative to the degree. As illustrated in FIG. 17D, the effect of diffraction is reduced, so that the intensity of light caused to exit in a particular direction is reduced. Furthermore, in FIG. 17D, light within the range of angles of ±1.25° adds up to 67.2%, and the value of $|(n1-n2) \times \Delta d|/\lambda$ is 0.53.

Example 6

Next, a description is given, with reference to FIGS. 18A through 18D, of an optical device according to Example 6, focusing on differences from that of Example 4.

Openings of 1 μm in diameter are formed in the mask 21 so as to be arranged as illustrated in FIG. 18A. FIG. 18A illustrates the positions of openings within an area of approximately 1 mm square, where a positional irregularity of the value of 50% of the pitch is introduced into such an arrangement of openings in a plane at a pitch of 50 μm that the nearest openings are connected to form equilateral triangles. After formation of the openings, the SiO$_2$ film is patterned by photolithography and etching, so that the holes 26 of two depth values, that is, a depth of 0 nm and a depth of 45 nm relative to a reference depth, are formed. After formation of the holes 26, etching of 480 μm is performed with a wet etching liquid that is adjusted so as to cause the ratio of the etching rate of a glass base material to the etching rate of SiO$_2$ to be 10. Accordingly, the curved surface 24 in the concave 12 has a radius of curvature of substantially 480 μm, and the distribution range of the positions of the bottoms 13 of the concaves 12 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 18B illustrates a planar shape of the optical device after processing. In FIG. 18B, the depth is illustrated in grayscale, so that the color becomes darker as the depth increases.

FIG. 18C illustrates a result of calculation of an exiting light distribution in the case where light of a wavelength of 450 nm enters this optical device. The calculation is performed by determining the Fourier transform of a phase difference generated from the shape of FIG. 18B. As illustrated in FIG. 18C, the effect of diffraction is reduced, so that the intensity of light caused to exit in a particular direction is reduced. FIG. 18D illustrates a graphical representation of the intensity of the exiting light distribution of FIG. 18C in a horizontal direction, averaged at angular intervals of 0.21°, relative to the degree. As illustrated in FIG. 18D, the effect of diffraction is reduced, so that the intensity of light caused to exit in a particular direction is reduced. Furthermore, in FIG. 18D, light within the range of angles of ±1.25° adds up to 60.4%, and the value of $|(n1-n2) \times \Delta d|/\lambda$ is 0.53.

Example 7

Next, a description is given, with reference to FIGS. 19A through 19D, of an optical device according to Example 7.

The base material 11 formed of glass of a refractive index of 1.53 is cleaned, a SiO$_2$ film of 90 nm in thickness is deposited on the base material 11 as the thin film layer 25, and a molybdenum film of 50 nm in thickness is deposited on the thin film layer 25 as the mask 21. After deposition of the molybdenum film, a resist is applied, and openings of 1 μm in diameter are formed in the mask 21 by photolithography and etching so as to be arranged as illustrated in FIG. 19A. FIG. 19A illustrates the positions of openings within an area of approximately 1 mm square, where the openings are arranged in a plane at a pitch of 50 μm so that the nearest openings are connected to form equilateral triangles. After formation of the openings, the SiO$_2$ film is patterned by photolithography and etching, so that the holes 26 of eight depth values relative to a reference depth are formed at depth intervals of 11.25 nm. After formation of the holes 26, etching of 480 μm is performed with a wet etching liquid that is adjusted so as to cause the ratio of the etching rate of a glass base material to the etching rate of $SiO_2$ to be 10. Accordingly, the curved surface 24 in the concave 12 has a radius of curvature of substantially 480 μm, and the distribution range of the positions of the bottoms 13 of the concaves 12 in a depth direction is 787.5 nm. Here, the bottoms 13 are disposed so as to be irregularly positioned in the depth direction in order to prevent 50% or more of the bottoms 13 from being disposed at one of the eight values (levels) of the distribution range of the positions of the bottoms 13 in the depth direction. FIG. 19B illustrates a planar shape of the optical device after processing. In FIG. 19B, the depth is illustrated in grayscale, so that the color becomes darker as the depth increases.

FIG. 19C illustrates a result of calculation of an exiting light distribution in the case where light of a wavelength of 450 nm enters this optical device. The calculation is performed by determining the Fourier transform of a phase difference generated from the shape of FIG. 19B. As illustrated in FIG. 19C, the effect of diffraction is reduced, so that the intensity of light caused to exit in a particular direction is reduced. FIG. 19D illustrates a graphical representation of the intensity of the exiting light distribution of FIG. 19C in a horizontal direction, averaged at angular intervals of 0.21°, relative to the degree. As illustrated in FIG. 19D, the effect of diffraction is reduced, so that the intensity of light caused to exit in a particular direction is reduced. Furthermore, in FIG. 19D, light within the range of angles of ±1.25° adds up to 70.6%, and the value of $|(n1-n2) \times \Delta d|/\lambda$ is 0.93.

Example 8

Next, a description is given, with reference to FIGS. 20A through 20D, of an optical device according to Example 8, focusing on differences from that of Example 7.

Figure 20B:
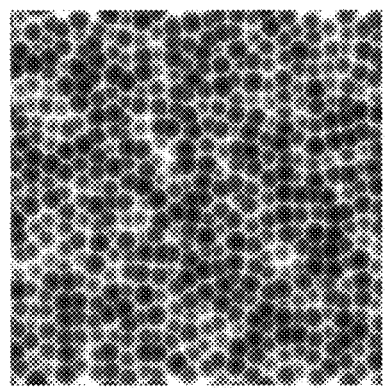
FIGS. 20A through 20D are diagrams for illustrating an optical device of Example 8.
Figure 20D:
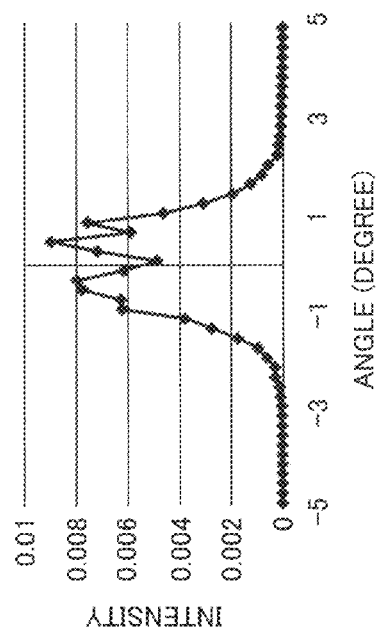
Figure 20A:
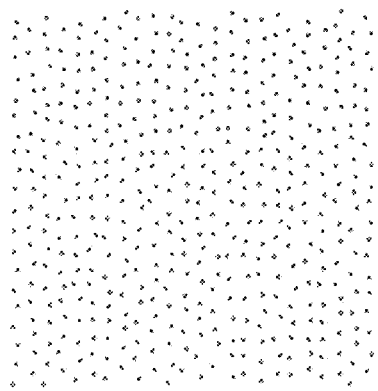

Openings of 1 μm in diameter are formed in the mask 21 so as to be arranged as illustrated in FIG. 20A. FIG. 20A illustrates the positions of openings within an area of approximately 1 mm square, where a positional irregularity of the value of 25% of the pitch is introduced into such an arrangement of openings in a plane at a pitch of 50 μm that the nearest openings are connected to form equilateral triangles. After formation of the openings, the $SiO_2$ film is patterned by photolithography and etching, so that the holes 26 of eight depth values relative to a reference depth are formed at depth intervals of 11.25 nm. After formation of the holes 26, etching of 480 μm is performed with a wet etching liquid that is adjusted so as to cause the ratio of the etching rate of a glass base material to the etching rate of $SiO_2$ to be 10. Accordingly, the curved surface 24 in the concave 12 has a radius of curvature of substantially 480 μm, and the distribution range of the positions of the bottoms 13 of the concaves 12 in a depth direction is 787.5 nm. Here, the bottoms 13 are disposed so as to be irregularly positioned in the depth direction in order to prevent 50% or more of the bottoms 13 from being disposed at one of the eight values (levels) of the distribution range of the positions of the bottoms 13 in the depth direction. FIG. 20B illustrates a planar shape of the optical device after processing. In FIG. 20B, the depth is illustrated in grayscale, so that the color becomes darker as the depth increases.

Figure 20C:
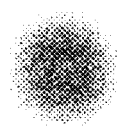

FIG. 20C illustrates a result of calculation of an exiting light distribution in the case where light of a wavelength of 450 nm enters this optical device. The calculation is performed by determining the Fourier transform of a phase difference generated from the shape of FIG. 20B. As illustrated in FIG. 20C, the effect of diffraction is reduced, so that the intensity of light caused to exit in a particular direction is reduced. FIG. 20D illustrates a graphical representation of the intensity of the exiting light distribution of FIG. 20C in a horizontal direction, averaged at angular intervals of 0.21°, relative to the degree. As illustrated in FIG. 20D, the effect of diffraction is reduced, so that the intensity of light caused to exit in a particular direction is reduced. Furthermore, in FIG. 20D, light within the range of angles of ±1.25° adds up to 66.6%, and the value of $|(n1-n2) \times \Delta d|/\lambda$ is 0.93.

Example 9

Next, a description is given, with reference to FIGS. 21A through 21D, of an optical device according to Example 9, focusing on differences from that of Example 7.

Openings of 1 μm in diameter are formed in the mask 21 so as to be arranged as illustrated in FIG. 21A. FIG. 21A illustrates the positions of openings within an area of approximately 1 mm square, where a positional irregularity of the value of 50% of the pitch is introduced into such an arrangement of openings in a plane at a pitch of 50 μm that the nearest openings are connected to form equilateral triangles. After formation of the openings, the $SiO_2$ film is patterned by photolithography and etching, so that the holes 26 of eight depth values relative to a reference depth are formed at depth intervals of 11.25 nm. After formation of the holes 26, etching of 480 μm is performed with a wet etching liquid that is adjusted so as to cause the ratio of the etching rate of a glass base material to the etching rate of $SiO_2$ to be 10. Accordingly, the curved surface 24 in the concave 12 has a radius of curvature of substantially 480 μm, and the distribution range of the positions of the bottoms 13 of the concaves 12 in a depth direction is 787.5 nm. Here, the bottoms 13 are disposed so as to be irregularly positioned in the depth direction in order to prevent 50% or more of the bottoms 13 from being disposed at one of the eight values (levels) of the distribution range of the positions of the bottoms 13 in the depth direction. FIG. 21B illustrates a planar shape of the optical device after processing. In FIG. 21B, the depth is illustrated in grayscale, so that the color becomes darker as the depth increases.

FIG. 21C illustrates a result of calculation of an exiting light distribution in the case where light of a wavelength of 450 nm enters this optical device. The calculation is performed by determining the Fourier transform of a phase difference generated from the shape of FIG. 21B. As illustrated in FIG. 21C, the effect of diffraction is reduced, so that the intensity of light caused to exit in a particular direction is reduced. FIG. 21D illustrates a graphical representation of the intensity of the exiting light distribution of FIG. 21C in a horizontal direction, averaged at angular intervals of 0.21°, relative to the degree. As illustrated in FIG. 21D, the effect of diffraction is reduced, so that the intensity of light caused to exit in a particular direction is reduced. Furthermore, in FIG. 21D, light within the range of angles of ±1.25° adds up to 59.5%, and the value of $|(n1-n2) \times \Delta d|/\lambda$ is 0.93.

Example 10

Next, a description is given, with reference to FIGS. 22A through 22D, of an optical device according to Example 10.
The base material 11 formed of glass of a refractive index of 1.53 is cleaned, a $SiO_2$ film of 24.3 nm in thickness is deposited on the base material 11 as the thin film layer 25, and a molybdenum film of 50 nm in thickness is deposited on the thin film layer 25 as the mask 21. After deposition of the molybdenum film, a resist is applied, and openings of 1 µm in diameter are formed in the mask 21 by photolithography and etching so as to be arranged as illustrated in FIG. 22A. FIG. 22A illustrates the positions of openings within an area of approximately 1 mm square, where the openings are arranged in a plane at a pitch of 50 µm so that the nearest openings are connected to form equilateral triangles. After formation of the openings, the $SiO_2$ film is patterned by photolithography and etching, so that the holes 26 of two depth values, that is, a depth of 0 nm and a depth of 24.3 nm relative to a reference depth, are formed. After formation of the holes 26, etching of 480 µm is performed with a wet etching liquid that is adjusted so as to cause the ratio of the etching rate of a glass base material to the etching rate of $SiO_2$ to be 10. Accordingly, the curved surface 24 in the concave 12 has a radius of curvature of substantially 480 µm, and the distribution range of the positions of the bottoms 13 of the concaves 12 in a depth direction is 243 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 22B illustrates a planar shape of the optical device after processing. In FIG. 22B, the depth is illustrated in grayscale, so that the color becomes darker as the depth increases.

FIG. 22C illustrates a result of calculation of an exiting light distribution in the case where light of a wavelength of 450 nm enters this optical device. The calculation is performed by determining the Fourier transform of a phase difference generated from the shape of FIG. 22B. As illustrated in FIG. 22C, the effect of diffraction is reduced, so that the intensity of light caused to exit in a particular direction is reduced. FIG. 22D illustrates a graphical representation of the intensity of the exiting light distribution of FIG. 22C in a horizontal direction, averaged at angular intervals of 0.21°, relative to the degree. As illustrated in FIG. 22D, the effect of diffraction is reduced, so that the intensity of light caused to exit in a particular direction is reduced. In particular, the amount of rectilinearly transmitted zero-order light before averaging is 1.6%, that is, reduced to the half of the amount of zero-order light of the optical device of Example 1, which is 3.2%. Furthermore, in FIG. 22D, light within the range of angles of ±1.25° adds up to 73.2%, and the value of $|(n1-n2)\times\Delta d|/\lambda$ is 0.29.

Example 11

Next, a description is given, with reference to FIGS. 23A through 23D, of an optical device according to Example 11.

The base material 11 formed of glass of a refractive index of 1.53 is cleaned, a $SiO_2$ film of 450 nm in thickness is deposited on the base material 11 as the thin film layer 25, and a molybdenum film of 50 nm in thickness is deposited on the thin film layer 25 as the mask 21. After deposition of the molybdenum film, a resist is applied, and openings of 1 µm in diameter are formed in the mask 21 by photolithography and etching so as to be arranged as illustrated in FIG. 23A. FIG. 23A illustrates the positions of openings within an area of approximately 1 mm square, where a positional irregularity of the value of 50% of the pitch is introduced into such an arrangement of openings in a plane at a pitch of 50 µm that the nearest openings are connected to form equilateral triangles. After formation of the openings, the $SiO_2$ film is patterned by photolithography and etching, so that the holes 26 of eight depth values relative to a reference depth are formed at depth intervals of 56.25 nm. After formation of the holes 26, etching of 480 µm is performed with a wet etching liquid that is adjusted so as to cause the ratio of the etching rate of a glass base material to the etching rate of $SiO_2$ to be 10. Accordingly, the curved surface 24 in the concave 12 has a radius of curvature of substantially 480 µm, and the distribution range of the positions of the bottoms 13 of the concaves 12 in a depth direction is 3937.5 nm. Here, the bottoms 13 are disposed so as to be irregularly positioned in the depth direction in order to prevent 50% or more of the bottoms 13 from being disposed at one of the eight values (levels) of the distribution range of the positions of the bottoms 13 in the depth direction. FIG. 23B illustrates a planar shape of the optical device after processing. In FIG. 23B, the depth is illustrated in grayscale, so that the color becomes darker as the depth increases.

FIG. 23C illustrates a result of calculation of an exiting light distribution in the case where light of a wavelength of 450 nm enters this optical device. The calculation is performed by determining the Fourier transform of a phase difference generated from the shape of FIG. 23B. As illustrated in FIG. 23C, the effect of diffraction is reduced, so that the intensity of light caused to exit in a particular direction is reduced. FIG. 23D illustrates a graphical representation of the intensity of the exiting light distribution of FIG. 23C in a horizontal direction, averaged at angular intervals of 0.21°, relative to the degree. As illustrated in FIG. 23D, the effect of diffraction is reduced, so that the intensity of light caused to exit in a particular direction is reduced. Furthermore, in FIG. 23D, light within the range of angles of ±1.25° adds up to 37.8%. In FIG. 23D, the value of the full width at half maximum of the light amount distribution is 2.9°, which is 1.1 times the value of the full width at half maximum of the light amount distribution in the optical device of Example 9, which is 2.6°. The value of $|(n1-n2)\times\Delta d|/\lambda$ is 4.6.

Example 12

Next, a description is given, with reference to FIGS. 24A through 24D, of an optical device according to Example 12.

Figure 24B:
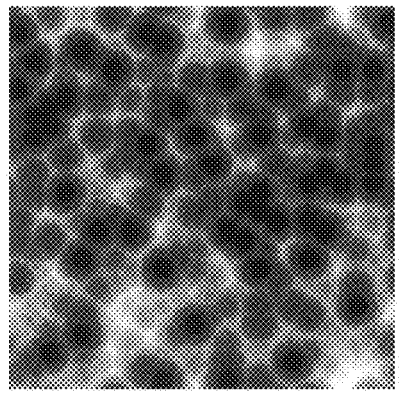
FIGS. 24A through 24D are diagrams for illustrating an optical device of Example 12.
Figure 24D:
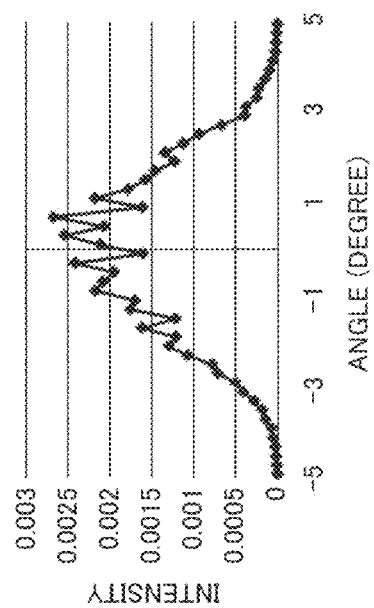
Figure 24A:
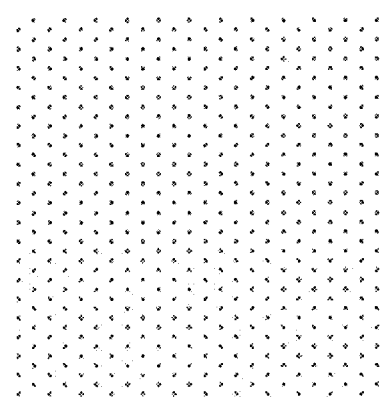

The base material 11 formed of glass of a refractive index of 1.53 is cleaned, a $SiO_2$ film of 900 nm in thickness is deposited on the base material 11 as the thin film layer 25, and a molybdenum film of 50 nm in thickness is deposited on the thin film layer 25 as the mask 21. After deposition of the molybdenum film, a resist is applied, and openings of 1 µm in diameter are formed in the mask 21 by photolithography and etching so as to be arranged as illustrated in FIG. 24A. FIG. 24A illustrates the positions of openings within an area of approximately 1 mm square, where a positional irregularity of the value of 50% of the pitch is introduced into such an arrangement of openings in a plane at a pitch of 50 µm that the nearest openings are connected to form equilateral triangles. After formation of the openings, the $SiO_2$ film is patterned by photolithography and etching, so that the holes 26 of eight depth values relative to a reference depth are formed at depth intervals of 112.5 nm. After formation of the holes 26, etching of 480 µm is performed with a wet etching liquid that is adjusted so as to cause the ratio of the etching rate of a glass base material to the etching rate of $SiO_2$ to be 10. Accordingly, the curved surface 24 in the concave 12 has a radius of curvature of substantially 480 µm, and the distribution range of the positions of the bottoms 13 of the concaves 12 in a depth direction is 7875 nm. Here, the bottoms 13 are disposed so as to be irregularly positioned in the depth direction in order to prevent 50% or more of the bottoms 13 from being disposed at one of the eight values (levels) of the distribution range of the positions of the bottoms 13 in the depth direction. FIG. 24B illustrates a planar shape of the optical device after processing. In FIG. 24B, the depth is illustrated in grayscale, so that the color becomes darker as the depth increases.

Figure 24C:
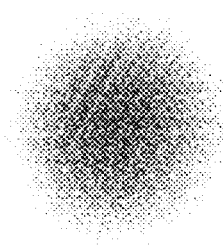

FIG. 24C illustrates a result of calculation of an exiting light distribution in the case where light of a wavelength of 450 nm enters this optical device. The calculation is performed by determining the Fourier transform of a phase difference generated from the shape of FIG. 24B. As illustrated in FIG. 24C, the effect of diffraction is reduced, so that the intensity of light caused to exit in a particular direction is reduced. FIG. 24D illustrates a graphical representation of the intensity of the exiting light distribution of FIG. 24C in a horizontal direction, averaged at angular intervals of 0.21°, relative to the degree. As illustrated in FIG. 24D, the effect of diffraction is reduced, so that the intensity of light caused to exit in a particular direction is reduced. Furthermore, in FIG. 24D, light within the range of angles of ±1.25° adds up to 23.6%. In FIG. 24D, the value of the full width at half maximum of the light amount distribution is 4.7°, which is 1.8 times the value of the full width at half maximum of the light amount distribution in the optical device of Example 9, which is 2.6°. The value of $|(n1-n2) \times \Delta d|/\lambda$, is 9.3.

Example 13

Next, a description is given, with reference to FIGS. 25A and 25B, of an optical device according to Example 13.

Glass of a refractive index of 1.52 and 2 nm in. thickness is cleaned, and a molybdenum mask of 50 nm in thickness where openings of 3 μm in diameter are arranged in a plane at a pitch of 60 μm so that the nearest openings are connected to form equilateral triangles is formed by photolithography and etching. Next, etching is performed with a wet etching liquid. When the radius of curvature of the curved surface 24 is measured at four points among the concaves 12, the average is 296 μm, and the distribution range of the positions of the bottoms 13 in a depth direction at the measurement points is 0.296 μm. FIG. 25A illustrates a planar shape of the optical device after processing.

When laser light of 633 nm in wavelength enters this optical device, a projection pattern as illustrated in FIG. 25B is obtained, and a diffraction pattern due to periodicity is observed.

Example 14

Figure 26B:
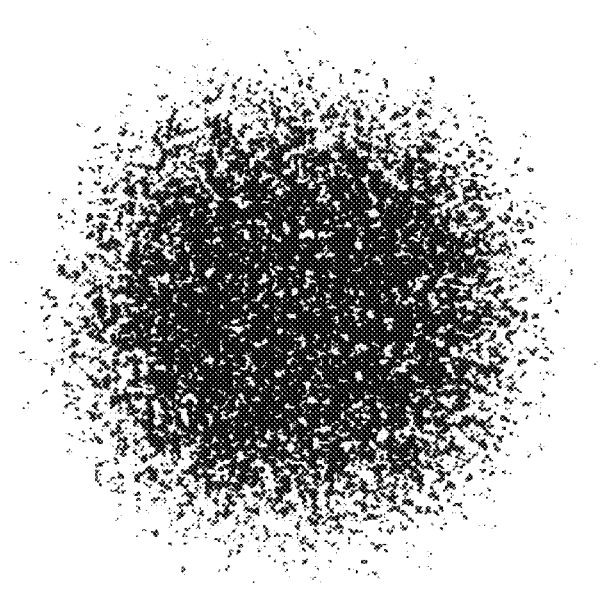
FIGS. 26A and 26B are diagrams for illustrating an optical device of Example 14.
Figure 26A:
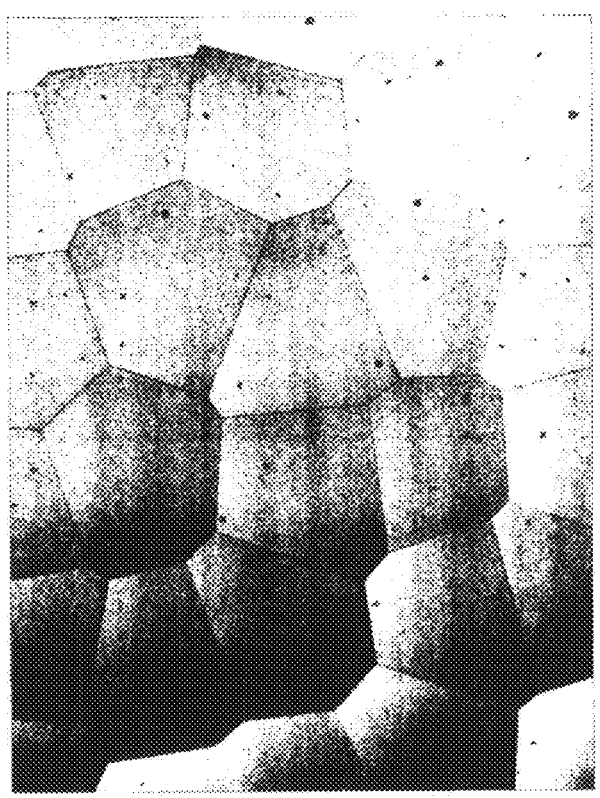

Next, a description is given, with reference to FIGS. 26A and 26B, of an optical device according to Example 14.

Glass of a refractive index of 1.52 and 2 nm in thickness is cleaned, and a molybdenum mask of 50 nm in thickness, where openings of 3 μm in diameter are arranged so that the openings are at intervals $P_1$ of 60 μm on average in a first direction and the centroids of the positions of openings of the rows of openings formed in the first direction are at intervals $P_2$ of 52 μm in a second direction perpendicular to the first direction, is formed by photolithography and etching. The positions of the openings include, in the first direction, an irregularity of ±25% of the average interval in the first direction, and include, in the second direction, an irregularity of ±25% of the average interval in the second direction. Next, etching is performed with a wet etching liquid. When the radius of curvature of the curved surface 24 is measured at nine points among the concaves 12, the average is 322 μm, and the distribution range of the positions of the bottoms 13 in a depth direction at the measurement points is 1.107 μm. FIG. 26A illustrates a planar shape of the optical device after processing.

Figure 27:
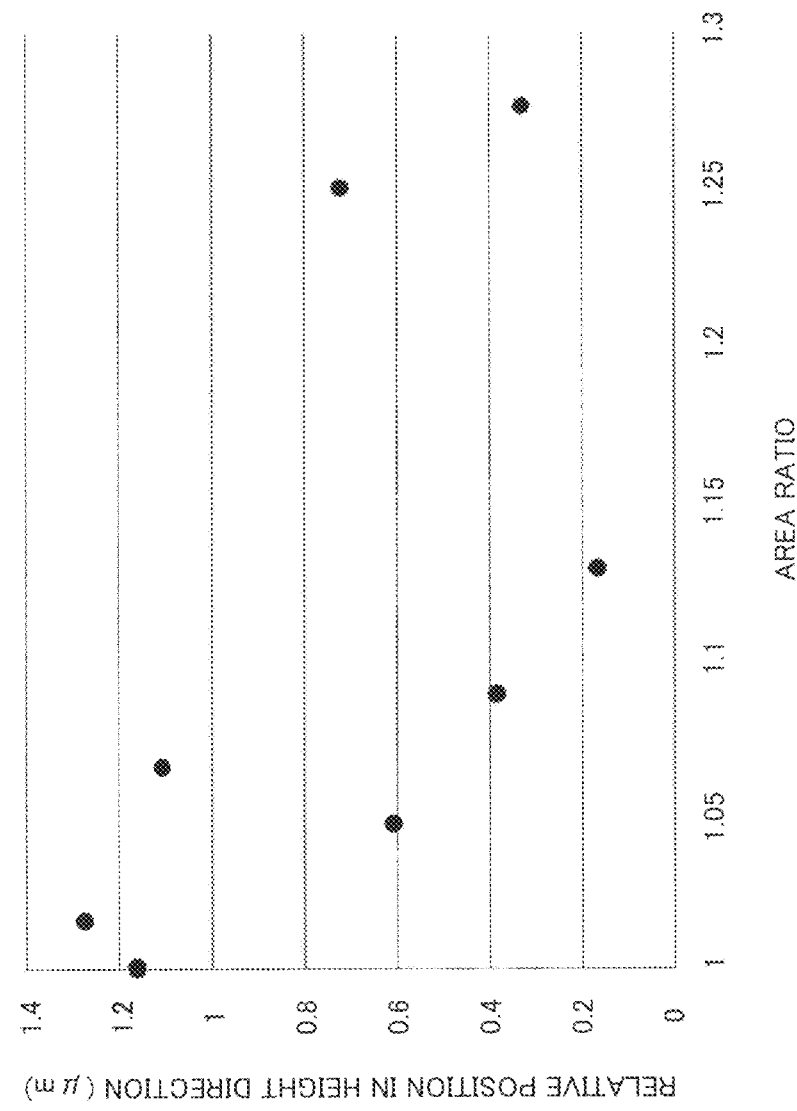
FIG. 27 is a graph illustrating a correlation between the area ratio of a concave of the optical device and the relative position of a bottom of the concave in a height direction in Example 14.

FIG. 27 illustrates the area ratio of each of the areas of polygons forming the concaves 12 serving as the nine measuring points of the radius of curvature normalized by their minimum value and the relative positions of the bottoms 13 of the concaves 12 in a height direction. The correlation coefficient determined from FIG. 27 is −0.6325.

When laser light of 633 nm in wavelength enters this optical device, a projection pattern as illustrated in FIG. 26B is obtained, and no diffraction pattern due to periodicity is observed.

[Second Embodiment]

In common illumination optical systems, it is not preferable to have an intensity distribution caused by generation of intense light in a particular direction instead of even light. Therefore, by introducing irregularity in a microlens array, it is possible to reduce generation of intense light in a particular direction by the effect of diffraction. When the introduced irregularity is large in amount, however, the amount of light outside a predetermined range increases, so that the light use efficiency may be reduced. Accordingly, there is a demand for optical devices that prevent generation of light of high intensity in a particular direction while maintaining the light use efficiency.

According to this embodiment, it is possible to provide optical devices that prevent generation of light of high intensity in a particular direction while maintaining the light use efficiency.

Figure 28B:
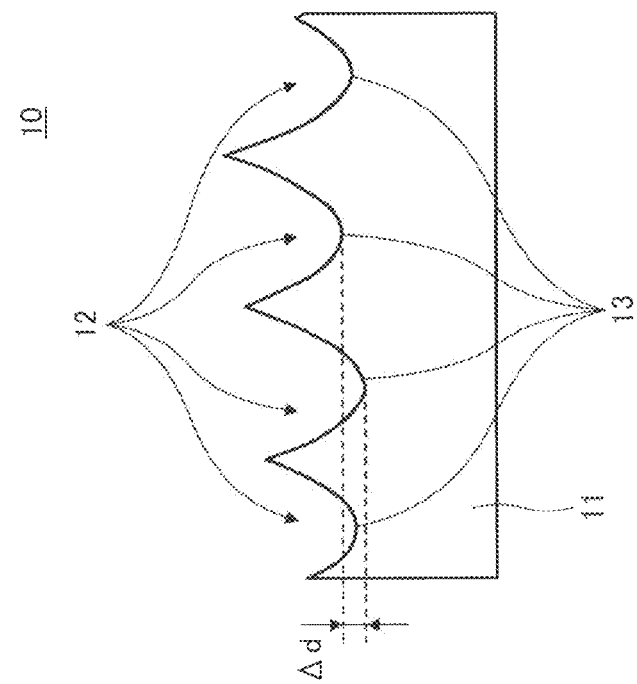
FIGS. 28A and 28B are diagrams illustrating a structure of an optical device according to a second embodiment.
Figure 28A:
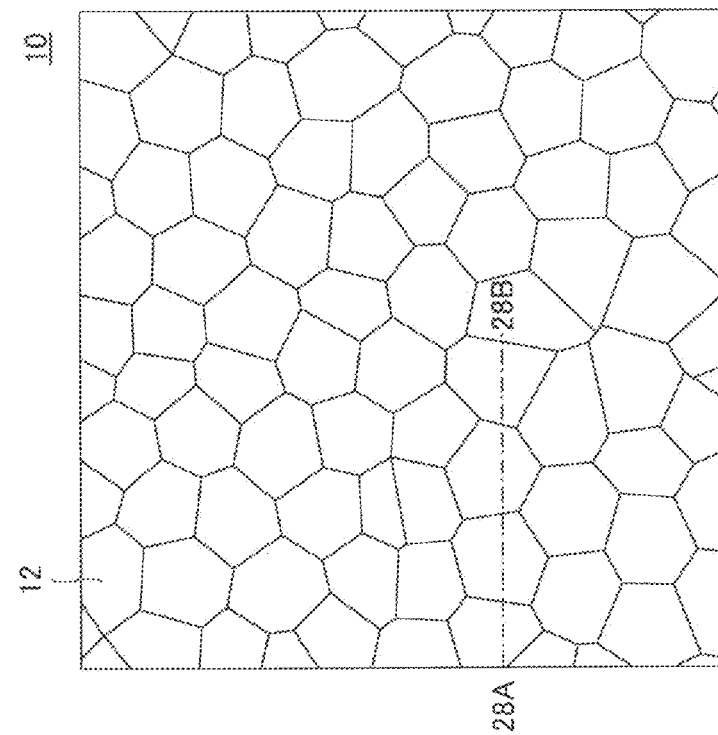

A description is given, with reference to FIGS. 28A and 28B, of an optical device according to the second embodiment. FIG. 28A is a plan view of an optical device according to this embodiment. FIG. 28B is a schematic cross-sectional view of the optical device, taken along a plane including a one-dot chain line 28A-28B in FIG. 28A.

According to this embodiment, the optical device 10 includes the base material 11 having a surface on which the concaves 12 are formed. According to this embodiment, while a description is given of the case where the concaves 12 are formed on a surface of the base material 11, multiple convexes may alternatively be formed on a surface of the base material 11 according to the optical device of this embodiment.

According to the optical device 10 illustrated in FIGS. 28A and 28B, the deepest part of each concave 12 defines the bottom 13, and the positions of the bottoms 13 of the concaves 12 in a depth (vertical) direction are not uniform but take two or more values. The difference between the depth position of the deepest bottom 13 and the depth position of the shallowest bottom 13 among the bottoms 13 of the concaves 12, that is, the height (level) difference of the bottoms 13, is Δd.

Figure 29B:
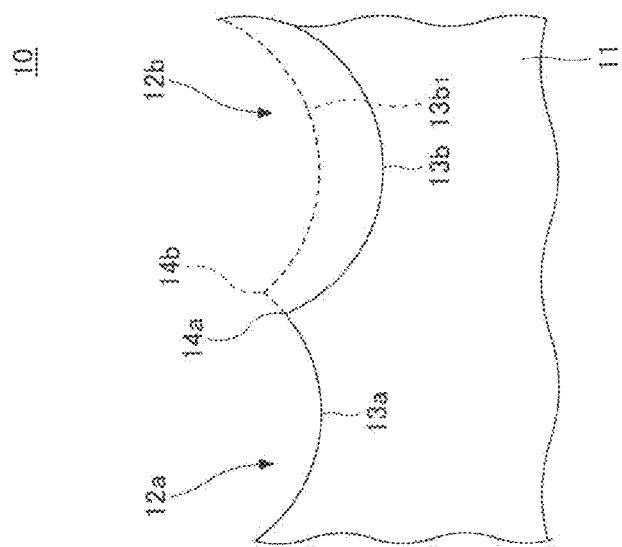
FIGS. 29A and 29B are diagrams illustrating the optical device according to the second embodiment.
Figure 29A:
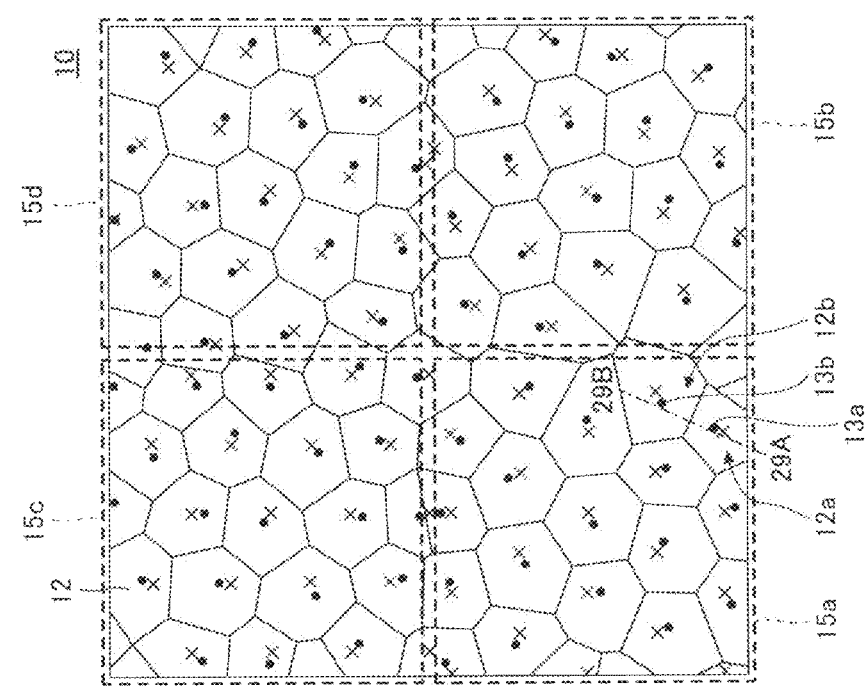
Figure 30:
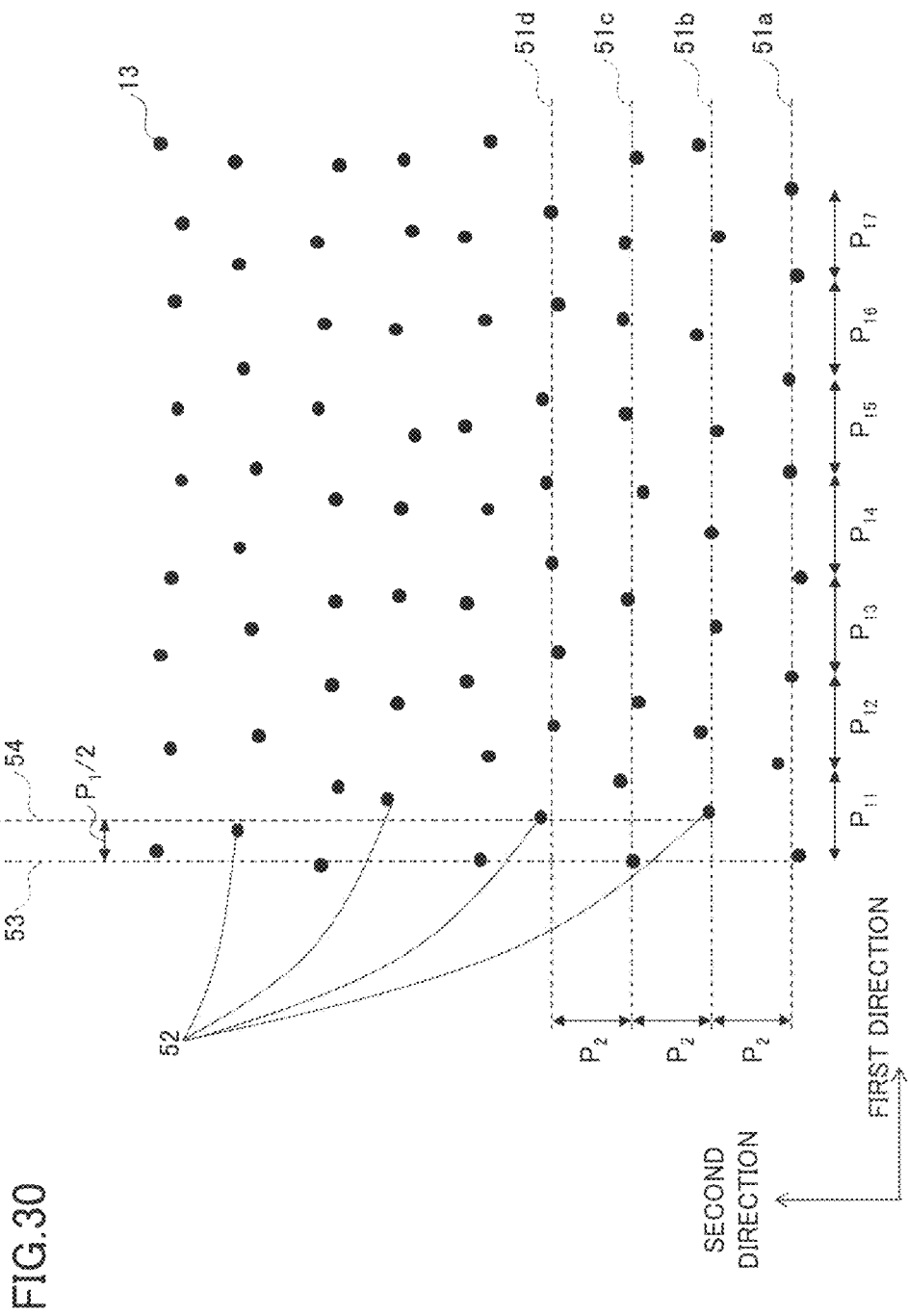
FIG. 30 is a diagram illustrating the optical device according to the second embodiment.

Next, a description is given, with reference to FIGS. 29A, 29B and 30, of planar positions of the bottoms 13. In FIG. 29A, the positions of the bottoms 13 are indicated by black circles (●). The positions of the bottoms 13 may be either regularly arranged, that is, arranged at a predetermined period or at predetermined intervals, or irregularly arranged. In the case where the positions of the bottoms 13 are irregularly arranged, letting the pitch of the regular arrangement be P, the bottoms 13 are preferably formed to be present within a circle of preferably a radius of 0.25×P, and more preferably, formed to be present within a circle of a radius of 0.15×P, with reference to the center points (regularly arranged points) of the bottoms 13 in the case where the positions of the bottoms 13 are regularly arranged. As a result, it is possible to efficiently diffuse light within a predetermined angular range as described below. In the case where the pitch of a regular arrangement differs from predetermined direction to predetermined direction, the bottoms 13 may be distributed in an elliptical area in accordance with the pitch ratio. Furthermore, the bottoms 13 are preferably distributed within regions bounded by normals each positioned at a quarter of the distance between one and an adjacent one of regularly arranged points from the one of the regularly arranged points, and are more preferably distributed within regions bounded by normals each positioned at three-twentieths of the distance between one and an adjacent one of regularly arranged points from the one of the regularly arranged points. In FIG. 29A, the positions of the regularly arranged points are indicated by crosses (x). The regular arrangement illustrated in FIG. 29A is an arrangement where the closest regularly arranged points are connected to form triangles. Here, the term "normal" refers to a line perpendicular to a line segment connecting one and an adjacent one of regularly arranged points.

Alternatively, the bottoms 13 may be arranged so that the average interval of the bottoms 13 is $P_1$ relative to a first direction. In this case, letting a direction perpendicular to the first direction be a second direction, the bottoms 13 may be arranged so that the centroids of the positions of the bottoms 13 of the rows of the bottoms 13 formed in the first direction are arranged at intervals $P_2$. Such an arrangement, which is not based on a regular arrangement, makes it possible to further reduce the effect of periodicity due to a regular arrangement. FIG. 30 illustrates an example of such an arrangement. In FIG. 30, the positions of the bottoms 13 are indicated by black circles (●). Furthermore, in FIG. 30, the bottoms 13 are arranged in multiple rows in the first direction, and the centroid positions of some of the rows in the second direction are indicated by the dotted lines $51a$, $51b$, $51c$ and $51d$. In the row of the bottoms 13 whose centroid position is indicated by the dotted line $51a$, the intervals of the bottoms 13 in the first direction are $P_{11}$, $P_{12}$ ... $P_{17}$, and their average is $P_1$. The positions of the bottoms 13 in each row of the bottoms 13 are irregularly arranged relative to the second direction while the dotted lines $51a$, $51b$, $51c$ and $51d$, which are centroid positions in the second direction, are at intervals $P_2$. Referring to FIG. 30, the centroid position (the dotted line 53) of the bottoms 13 at the left ends of the odd-numbered ($1^{st}$, $3^{rd}$, etc.) rows counted from the bottom of FIG. 30 in the first direction and the centroid position (the dotted line 54) of the bottoms 13 at the left ends of the even-numbered ($2^{nd}$, $4^{th}$, etc.) rows counted from the bottom of FIG. 30 in the first direction are at an interval of $P_1/2$ so as to satisfy $3^{0.5}/2 \times P_1 = P_2$. The bottoms 13 in each row of the bottoms 13 are preferably at intervals of $(1\pm0.25) P_1$, and more preferably, at intervals of $(1\pm0.15)P_1$, in the first direction. Furthermore, the positions of the bottoms 13 are preferably $\pm0.25P_2$, and more preferably, $\pm0.15P_2$, relative to the centroid positions of the rows of the bottoms 13 in the second direction.

Furthermore, when the bottoms 13 are irregularly arranged, the bottoms 13 may be symmetrically arranged with respect to a point or line in part of the region. Such an arrangement makes it possible to make asymmetry less likely to occur in a positive direction and a negative direction relative to one direction.

FIG. 29A illustrates a case where the bottoms 13 indicated by black circles are positioned within regions of three-twentieths of a pitch relative to the positions of the points regularly arranged in triangles indicated by crosses. The optical device 10 includes multiple regions. In the case illustrated in FIG. 29A, the optical device 10 is divided into four regions $15a$, $15b$, $15c$ and $15d$. Each of the regions $15a$, $15b$, $15c$ and $15d$ has a reference arrangement indicated by the positions of the points "x."

For example, the direction of arrangement that causes the positions of the points "x" to be closest is inclined 0° in the region $15a$, 15° in the region $15b$, 30° in the region $15c$, and 45° in the region $15d$.

In the case where there is only a single direction of arrangement that causes the positions of the points "x" to be closest, for example, in a direction of 0°, the angle of emergence of exiting light in a perpendicular direction takes different values as described below. It is possible, however, to reduce a difference in the angle of emergence of exiting light in a perpendicular direction and to prevent the intensity distribution of exiting light from being biased to a particular direction by providing multiple regions in the optical device and causing the direction of arrangement that causes the positions of the points "x" to be closest to differ from region to region.

Therefore, the optical device according to this embodiment includes at least two regions in each of which the direction of arrangement that causes the positions of the points "x" to be closest is different. Accordingly, the direction of arrangement of a regular arrangement may be rotated about a certain point to serve as the direction of arrangement that causes the positions of the points "x" to be closest. Furthermore, the method of arrangement may differ from region to region so as to be, for example, a triangular arrangement and a square arrangement. The reference arrangement may be such that the arranged points form rectangles.

FIG. 29B illustrates a cross-sectional view of the optical device 10, taken along a plane including a one-dot chain line 29A-29B that connects the bottom $13a$ of the concave $12a$ and the bottom $13b$ of the concave $12b$ in FIG. 29A.

Referring to FIG. 29B, the bottom $13a$ of the concave $12a$ and the bottom $13b$ of the concave $12b$ are at different positions in the depth direction. When a surface that forms the concave $12a$ and a surface that forms the concave $12b$ have the same curvature, a point $14a$ that serves as a boundary between the concaves $12a$ and $12b$ is not positioned on the bisector of the bottoms $13a$ and $13b$. In FIG. 2B, the case where adjacent bottoms are at the same position in the depth direction is indicated by a dotted line. In this case, a point $14b$ that serves as a boundary is positioned on the bisector of the bottom $13a$ and the bottom $13b_1$.

In general, in the case of forming concaves in a base material such as glass by wet etching, the surfaces of adjacent concaves have substantially the same curvature. Therefore, if the positions of the bottoms of concaves in the depth direction greatly differ, the point $14a$ serving as a boundary is significantly off the bisector.

When concaves adjoin at the point $14b$ serving as a boundary, the surfaces of the adjoining concaves have the same tilt angle. As a result, it is possible to make the tilt angle of the concaves at the point $14b$ serving as a boundary a predetermined diffusion angle, so that it is possible to efficiently diffuse light within a predetermined diffusion angle range. On the other hand, when concaves adjoin at the point $14a$ serving as a boundary, the surfaces of the adjoining concaves have different tilt angles, so that the tilt angle is smaller at one concave and larger at the other concave than a predetermined diffusion angle. In this case, the amount of light that diffuses out of a predetermined diffusion angle range increases.

Figure 31B:
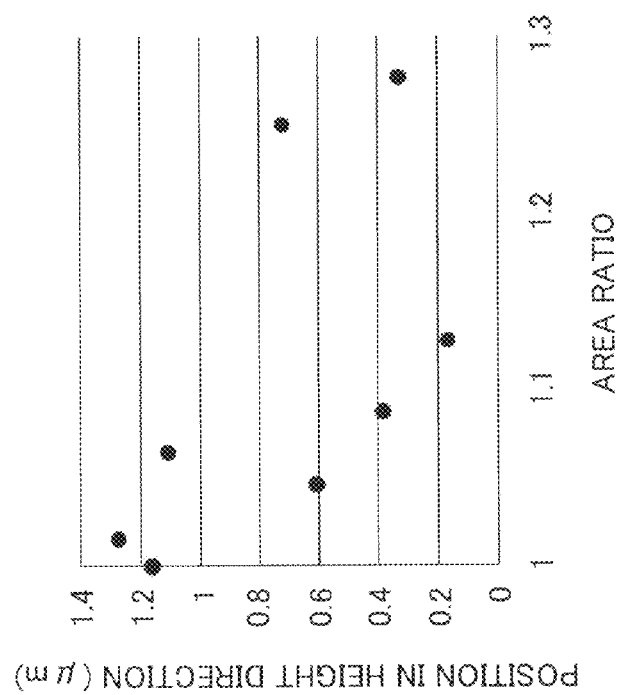
FIGS. 31A and 31B are diagrams illustrating a method of producing an optical device according to the second embodiment.
Figure 31A:
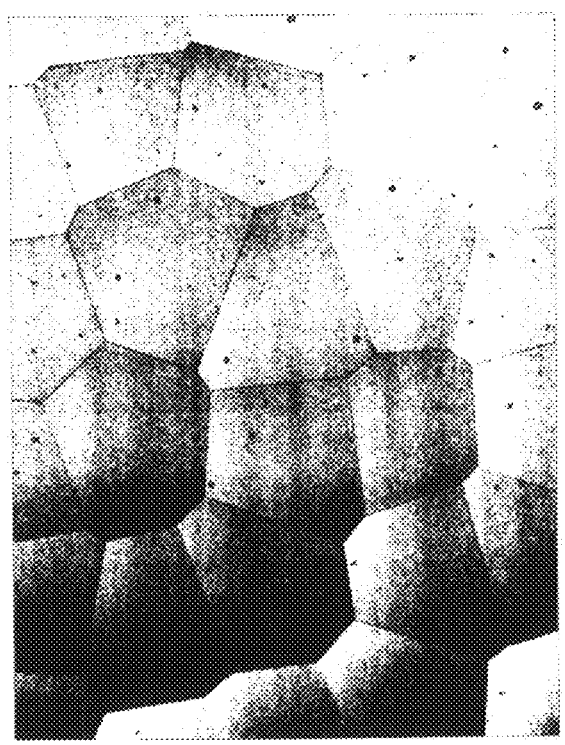

Furthermore, the optical device 10 according to this embodiment may be produced by the same methods of producing an optical device as the optical device 10 according to the first embodiment. In the case of employing such production methods, as the bottom 13b is at a deeper position, the position of the point 14a is more distant from the point 14b as illustrated in FIG. 29B. Accordingly, there is a correlation between the area of the polygon occupied by each concave 12 in a plan view like FIG. 29A and the depth of the bottom 13. Accordingly, it is possible to employ the correlation between the area of the polygon occupied by the concave 12 and the depth of the bottom 13 as an index for determining a difference between a produced device and its design. Here, it is preferable to process an optical device so that the absolute value of the coefficient of correlation of the area of the polygon occupied by the concave 12 and the depth of the bottom 13 is 0.2 or more, and more preferably, 0.4 or more, when the coefficient of correlation is calculated. FIG. 31A illustrates an observation of a surface of an optical device subjected to wet etching with the mask 21 formed using molybdenum to have openings of 3 µm in diameter arranged at an average pitch of 60 µm. FIG. 31B illustrates the results of measuring the areas occupied by the polygons of concaves and the positions of the bottoms of the concaves in a height direction at nine points and measuring the area ratio of each of the areas occupied by the polygons of the concaves normalized by their minimum value and the positions of the bottoms of the concaves in the height direction. FIG. 31B shows a negative correlation between the area ratio and the position in the height direction, and the calculated correlation coefficient is −0.64.

Examples

Next, a description is given of examples according to the second embodiment. Here, Examples 15 through 18, 25 and 26 are comparative examples, and Examples 19 through 24, 27 and 28 are examples according to this embodiment.

Example 15

First, a description is given, with reference to FIGS. 32A through 32D, of an optical device according to Example 15.

A glass base material of a refractive index of 1.53 is cleaned, and a molybdenum film of 50 nm in thickness is deposited on the glass base material as a mask. After deposition of the molybdenum film, a resist is applied, and the mask is patterned with openings of 1 µm in diameter by photolithography and etching so that the openings are arranged as illustrated in FIG. 32A. FIG. 32A illustrates the positions of openings within an area of approximately 1 mm square, where the openings are arranged in a plane at a pitch of 50 µm so that the positions of the openings form equilateral triangles. After patterning of the openings, wet etching of 480 µm is performed. Accordingly, a curved surface in the concave 12 has a radius of curvature of 480 µm. FIG. 32B illustrates a planar shape of the optical device after processing. In FIG. 32B, the depth is illustrated in grayscale, so that the color becomes darker as the depth increases.

FIG. 32C illustrates a result of calculation of an exiting light distribution in the case where 450 nm light enters this optical device. The calculation is performed by determining the Fourier transform of a phase difference generated from the shape of FIG. 32B. As illustrated in FIG. 32C, diffraction due to a regular arrangement occurs so that intense light is generated in particular directions. FIG. 32D illustrates a graphical representation of the intensity of the exiting light distribution of FIG. 32C in a horizontal direction, averaged at angular intervals of 0.21°, relative to the degree. In FIG. 32D, light within the range of angles of ±1.25° adds up to 75.2%.

Example 16

Next, a description is given, with reference to FIGS. 33A through 33D, of an optical device according to Example 16.

A glass base material of a refractive index of 1.53 is cleaned, a SiO$_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 33A. FIG. 33A illustrates the positions of openings within an area of approximately 1 mm square, where the openings are arranged in a plane at a pitch of 50 µm so that the positions of the openings form equilateral triangles. After patterning of the openings, the SiO$_2$ film is patterned by photolithography and etching, so that holes of two depth values, that is, a depth of 0 nm and a depth of 45 nm relative to a reference depth, are formed. After patterning of the holes, etching of 480 µm is performed with a wet etching liquid that is adjusted so as to cause the ratio of the etching rate of a glass base material to the etching rate of SiO$_2$ to be 10. Accordingly, a curved surface in the concave 12 has a radius of curvature of substantially 480 µm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 33B illustrates a planar shape of the optical device after processing. In FIG. 33B, the depth is illustrated in grayscale, so that the color becomes darker as the depth increases.

FIG. 33C illustrates a result of calculation of an exiting light distribution in the case where 450 nm light enters this optical device. The calculation is performed by determining the Fourier transform of a phase difference generated from the shape of FIG. 33B. As illustrated in FIG. 33C, while the effect of diffraction is reduced so that the intensity of light caused to exit in a particular direction is reduced, an intensity distribution according to a regular arrangement is generated. FIG. 33D illustrates a graphical representation of the intensity of the exiting light distribution of FIG. 33C in a horizontal direction, averaged at angular intervals of 0.21°, relative to the degree. As shown in FIG. 33D, the angle of emergence differs between a horizontal direction and a vertical direction. Furthermore, in FIG. 33D, light within the range of angles of ±1.25° adds up to 71.2%.

Example 17

Next, a description is given, with reference to FIGS. 34A through 34D, of an optical device according to Example 17.

A glass base material of a refractive index of 1.53 is cleaned, a SiO$_2$ film of 90 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 34A. FIG. 34A illustrates the positions of openings within an area of approximately 1 mm square, where the openings are arranged in a plane at a pitch of 50 µm so that the positions of the openings form equilateral triangles. After patterning of the openings, the SiO₂ film is patterned by photolithography and etching, so that holes of eight depth values relative to a reference depth are formed at depth intervals of 11.25 nm. After patterning of the holes, etching of 480 µm is performed with a wet etching liquid that is adjusted so as to cause the ratio of the etching rate of a glass base material to the etching rate of SiO₂ to be 10. Accordingly, a curved surface in the concave 12 has a radius of curvature of substantially 480 µm, and the distribution range of the positions of the bottoms 13 in a depth direction is 900 nm. Here, the bottoms 13 are disposed so as to be irregularly positioned in the depth direction in order to prevent 50% or more of the bottoms 13 from being disposed at one of the eight values (levels) of the distribution range of the positions of the bottoms 13 in the depth direction. FIG. 34B illustrates a planar shape of the optical device after processing. In FIG. 34B, the depth is illustrated in grayscale, so that the color becomes darker as the depth increases.

FIG. 34C illustrates a result of calculation of an exiting light distribution in the case where 450 nm light enters this optical device. The calculation is performed by determining the Fourier transform of a phase difference generated from the shape of FIG. 34B. As illustrated in FIG. 34C, while the effect of diffraction is reduced so that the intensity of light caused to exit in a particular direction is reduced, an intensity distribution according to a regular arrangement is generated. FIG. 34D illustrates a graphical representation of the intensity of the exiting light distribution of FIG. 34C in a horizontal direction, averaged at angular intervals of 0.21°, relative to the degree. As shown in FIG. 34D, the angle of emergence differs between a horizontal direction and a vertical direction. Furthermore, in FIG. 34D, light within the range of angles of ±1.25° adds up to 70.6%.

Example 18

Next, a description is given, with reference to FIGS. 35A through 35D, of an optical device according to Example 18.

Figure 35B:
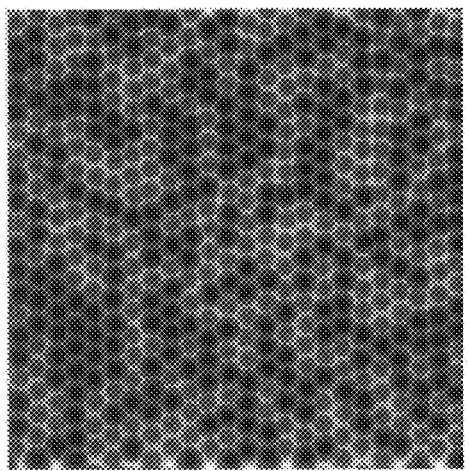
FIGS. 35A through 35D are diagrams for illustrating an optical device of Example 18.
Figure 35D:
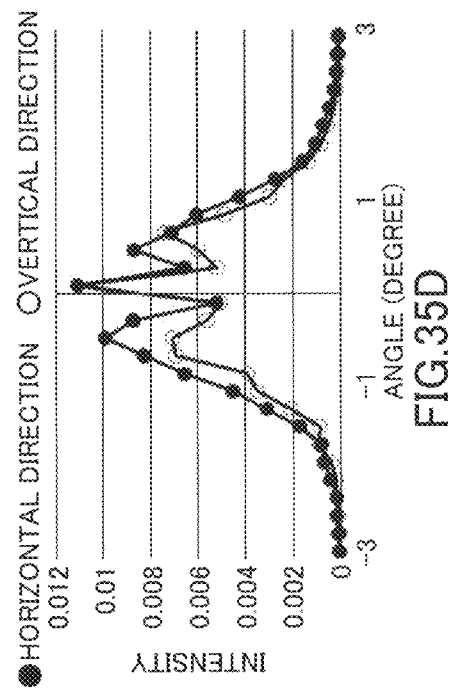
Figure 35A:
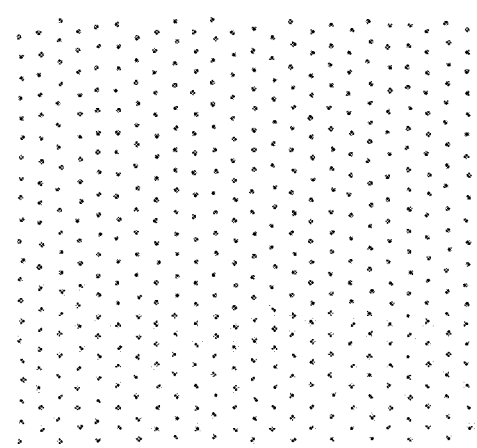

A glass base material of a refractive index of 1.53 is cleaned, a SiO₂ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 35A. FIG. 35A illustrates the positions of openings within an area of approximately 1 mm square, where a positional irregularity of the value of 10% of the pitch is introduced into such an arrangement of openings in a plane at a pitch of 50 µm that the nearest openings are connected to form equilateral triangles. After patterning of the openings, the SiO₂ film is patterned by photolithography and etching, so that holes of two depth values, that is, a depth of 0 nm and a depth of 45 nm relative to a reference depth, are formed. After patterning of the holes, etching of 480 µm is performed with a wet etching liquid that is adjusted so as to cause the ratio of the etching rate of a glass base material to the etching rate of SiO₂ to be 10. Accordingly, a curved surface in the concave 12 has a radius of curvature of substantially 480 µm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 35B illustrates a planar shape of the optical device after processing. In FIG. 35B, the depth is illustrated in grayscale, so that the color becomes darker as the depth increases.

Figure 35C:
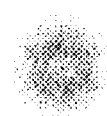

FIG. 35C illustrates a result of calculation of an exiting light distribution in the case where 450 nm light enters this optical device. The calculation is performed by determining the Fourier transform of a phase difference generated from the shape of FIG. 35B. As illustrated in FIG. 35C, while the effect of diffraction is reduced so that the intensity of light caused to exit in a particular direction is reduced, an intensity distribution according to a regular arrangement is generated. FIG. 35D illustrates a graphical representation of the intensity of the exiting light distribution of FIG. 35C in a horizontal direction, averaged at angular intervals of 0.21°, relative to the degree. As shown in FIG. 35D, the angle of emergence differs between a horizontal direction and a vertical direction. Furthermore, in FIG. 35D, light within the range of angles of ±1.25° adds up to 71.3%.

Example 19

Next, a description is given, with reference to FIGS. 36A through 36D, of an optical device according to Example 19.

Figure 36B:
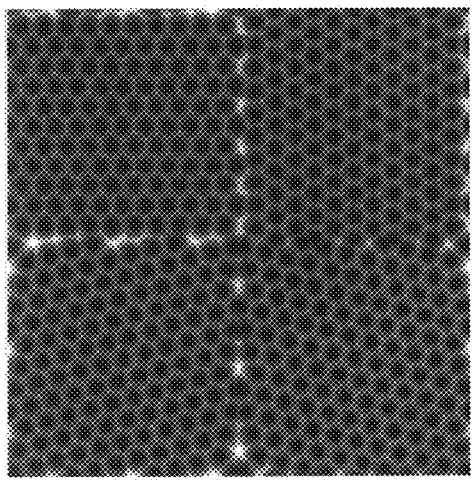
FIGS. 36A through 36D are diagrams for illustrating an optical device of Example 19.
Figure 36D:
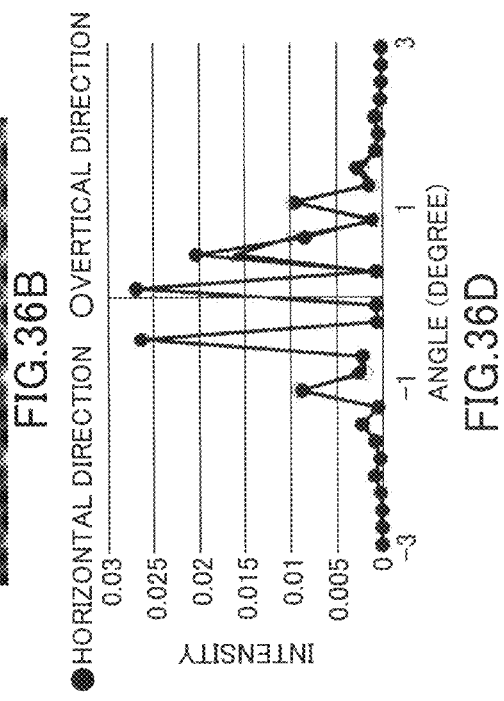
Figure 36A:
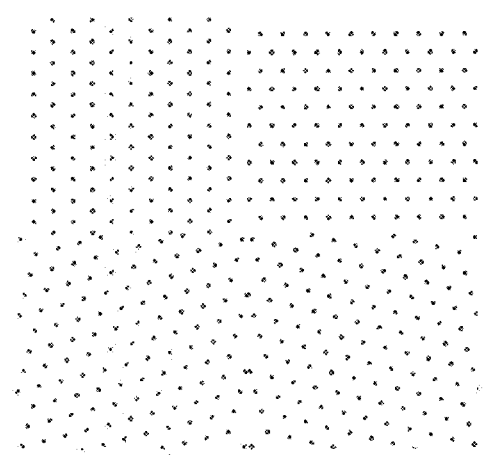

A glass base material of a refractive index of 1.53 is cleaned, and a molybdenum film of 50 nm in thickness is deposited on the glass base material as a mask. After deposition of the molybdenum film, a resist is applied, and the mask is patterned with openings of 1 in diameter by photolithography and etching so that the openings are arranged as illustrated in FIG. 36A. FIG. 36A illustrates the positions of openings within an area of approximately 1 mm square, where the openings are arranged in a plane at a pitch of 50 µm in four regions so that the positions of the openings form equilateral triangles and the direction of arrangement is 0°, 15°, 30° and 45° in the four regions. After patterning of the openings, wet etching of 480 µm is performed. Accordingly, a curved surface in the concave 12 has a radius of curvature of 480 µm. FIG. 36B illustrates a planar shape of the optical device after processing. In FIG. 36B, the depth is illustrated in grayscale, so that the color becomes darker as the depth increases.

Figure 36C:
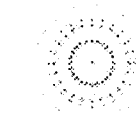

FIG. 36C illustrates a result of calculation of an exiting light distribution in the case where 450 nm light enters this optical device. The calculation is performed by determining the Fourier transform of a phase difference generated from the shape of FIG. 36B. As illustrated in FIG. 36C, no intense light is generated in a particular direction. FIG. 36D illustrates a graphical representation of the intensity of the exiting light distribution of FIG. 36C in a horizontal direction, averaged at angular intervals of 0.21°, relative to the degree. As shown in FIG. 36D, the angle of emergence is substantially the same in a horizontal direction and in a vertical direction. Furthermore, in FIG. 36D, light within the range of angles of ±1.25° adds up to 75.4%.

Example 20

Next, a description is given, with reference to FIGS. 37A through 37D, of an optical device according to Example 20.

A glass base material of a refractive index of 1.53 is cleaned, a SiO₂ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 37A. FIG. 37A illustrates the positions of openings within an area of approximately 1 mm square, where the openings are arranged in a plane at a pitch of 50 µm in four regions so that the positions of the openings form equilateral triangles and the direction of arrangement is 0°, 15°, 30° and 45° in the four regions. After patterning of the openings, the $SiO_2$ film is patterned by photolithography and etching, so that holes of two depth values, that is, a depth of 0 nm and a depth of 45 nm relative to a reference depth, are formed. After patterning of the holes, etching of 480 µm is performed with a wet etching liquid that is adjusted so as to cause the ratio of the etching rate of a glass base material to the etching rate of $SiO_2$ to be 10. Accordingly, a curved surface in the concave 12 has a radius of curvature of substantially 480 µm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 37B illustrates a planar shape of the optical device after processing. In FIG. 37B, the depth is illustrated in grayscale, so that the color becomes darker as the depth increases.

FIG. 37C illustrates a result of calculation of an exiting light distribution in the case where 450 nm light enters this optical device. The calculation is performed by determining the Fourier transform of a phase difference generated from the shape of FIG. 37B. As illustrated in FIG. 37C, the effect of diffraction is reduced, so that the intensity of light caused to exit in a particular direction is reduced. FIG. 37D illustrates a graphical representation of the intensity of the exiting light distribution of FIG. 37C in a horizontal direction, averaged at angular intervals of 0.21°, relative to the degree. As shown in FIG. 37D, the angle of emergence is substantially the same in a horizontal direction and in a vertical direction. Furthermore, in FIG. 37D, light within the range of angles of ±1.25° adds up to 69.8%.

Example 21

Next, a description is given, with reference to FIGS. 38A through 38D, of an optical device according to Example 21.

A glass base material of a refractive index of 1.53 is cleaned, a $SiO_2$ film of 90 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 38A. FIG. 38A illustrates the positions of openings within an area of approximately 1 mm square, where the openings are arranged in a plane at a pitch of 50 µm in four regions so that the positions of the openings form equilateral triangles and the direction of arrangement is 0°, 15°, 30° and 45° in the four regions. After patterning of the openings, the $SiO_2$ film is patterned by photolithography and etching, so that holes of eight depth values relative to a reference depth are formed at depth intervals of 11.25 nm. After patterning of the holes, etching of 480 µm is performed with a wet etching liquid that is adjusted so as to cause the ratio of the etching rate of a glass base material to the etching rate of $SiO_2$ to be 10. Accordingly, a curved surface in the concave 12 has a radius of curvature of substantially 480 µm, and the distribution range of the positions of the bottoms 13 in a depth direction is 900 nm. Here, the bottoms 13 are disposed so as to be irregularly positioned in the depth direction in order to prevent 50% or more of the bottoms 13 from being disposed at one of the eight values (levels) of the distribution range of the positions of the bottoms 13 in the depth direction. FIG. 38B illustrates a planar shape of the optical device after processing. In FIG. 38B, the depth is illustrated in grayscale, so that the color becomes darker as the depth increases.

FIG. 38C illustrates a result of calculation of an exiting light distribution in the case where 450 nm light enters this optical device. The calculation is performed by determining the Fourier transform of a phase difference generated from the shape of FIG. 38B. As illustrated in FIG. 38C, the effect of diffraction is reduced, so that the intensity of light caused to exit in a particular direction is reduced. FIG. 38D illustrates a graphical representation of the intensity of the exiting light distribution of FIG. 38C in a horizontal direction, averaged at angular intervals of 0.21°, relative to the degree. As shown in FIG. 38D, the angle of emergence is substantially the same in a horizontal direction and in a vertical direction. Furthermore, in FIG. 38D, light within the range of angles of ±1.25° adds up to 69.5%.

Example 22

Next, a description is given, with reference to FIGS. 39A through 39D, of an optical device according to Example 22.

A glass base material of a refractive index of 1.53 is cleaned, a $SiO_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 39A. FIG. 39A illustrates the positions of openings within an area of approximately 1 mm square, where the openings are arranged in a plane so that the direction of basic arrangement is 0°, 15°, 30° and 45° in four regions with a positional irregularity of the value of 10% of the pitch being introduced into a basic arrangement where openings are at a pitch of 50 µm and the positions of the openings form equilateral triangles in the four regions. After patterning of the openings, the $SiO_2$ film is patterned by photolithography and etching, so that holes of two depth values, that is, a depth of 0 nm and a depth of 45 nm relative to a reference depth, are formed. After patterning of the holes, etching of 480 µm is performed with a wet etching liquid that is adjusted so as to cause the ratio of the etching rate of a glass base material to the etching rate of $SiO_2$ to be 10. Accordingly, a curved surface in the concave 12 has a radius of curvature of substantially 480 µm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 39B illustrates a planar shape of the optical device after processing. In FIG. 39B, the depth is illustrated in grayscale, so that the color becomes darker as the depth increases.

FIG. 39C illustrates a result of calculation of an exiting light distribution in the case where 450 nm light enters this optical device. The calculation is performed by determining the Fourier transform of a phase difference generated from the shape of FIG. 39B. As illustrated in FIG. 39C, the effect of diffraction is reduced, so that the intensity of light caused to exit in a particular direction is reduced. FIG. 39D illustrates a graphical representation of the intensity of the exiting light distribution of FIG. 39C in a horizontal direction, averaged at angular intervals of 0.21°, relative to the degree. As shown in FIG. 39D, the angle of emergence is substantially the same in a horizontal direction and in a vertical direction. Furthermore, in FIG. 39D, light within the range of angles of ±1.25° adds up to 69.5%.

Example 23

Next, a description is given, with reference to FIGS. 40A through 40D, of an optical device according to Example 23.

A glass base material of a refractive index of 1.53 is cleaned, a $SiO_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 40A. FIG. 40A illustrates the positions of openings within an area of approximately 1 mm square, where the openings are arranged in a plane so that the direction of basic arrangement is 0°, 15°, 30° and 45° in four regions with a positional irregularity of the value of 20% of the pitch being introduced into a basic arrangement where openings are at a pitch of 50 µm and the positions of the openings form equilateral triangles in the four regions. After patterning of the openings, the $SiO_2$ film is patterned by photolithography and etching, so that holes of two depth values, that is, a depth of 0 nm and a depth of 45 nm relative to a reference depth, are formed. After patterning of the holes, etching of 480 µm is performed with a wet etching liquid that is adjusted so as to cause the ratio of the etching rate of a glass base material to the etching rate of $SiO_2$ to be 10. Accordingly, a curved surface in the concave 12 has a radius of curvature of substantially 480 µm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 40B illustrates a planar shape of the optical device after processing. In FIG. 40B, the depth is illustrated in grayscale, so that the color becomes darker as the depth increases.

FIG. 40C illustrates a result of calculation of an exiting light distribution in the case where 450 nm light enters this optical device. The calculation is performed by determining the Fourier transform of a phase difference generated from the shape of FIG. 40B. As illustrated in FIG. 40C, the effect of diffraction is reduced, so that the intensity of light caused to exit in a particular direction is reduced. FIG. 40D illustrates a graphical representation of the intensity of the exiting light distribution of FIG. 40C in a horizontal direction, averaged at angular intervals of 0.21°, relative to the degree. As shown in FIG. 40D, the angle of emergence is substantially the same in a horizontal direction and in a vertical direction. Furthermore, in FIG. 40D, light within the range of angles of ±1.25° adds up to 65.8%.

Example 24

Next, a description is given, with reference to FIGS. 41A through 41D, of an optical device according to Example 24.

Figure 41B:
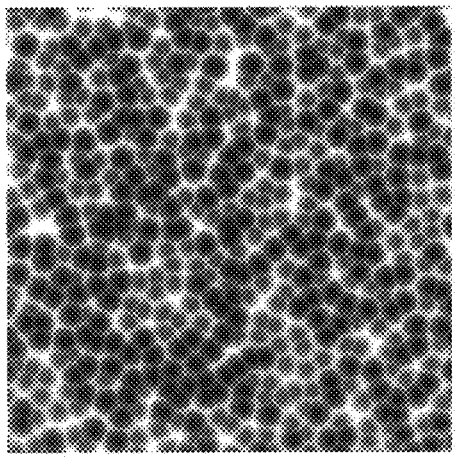
FIGS. 41A through 41D are diagrams for illustrating an optical device of Example 24.
Figure 41D:
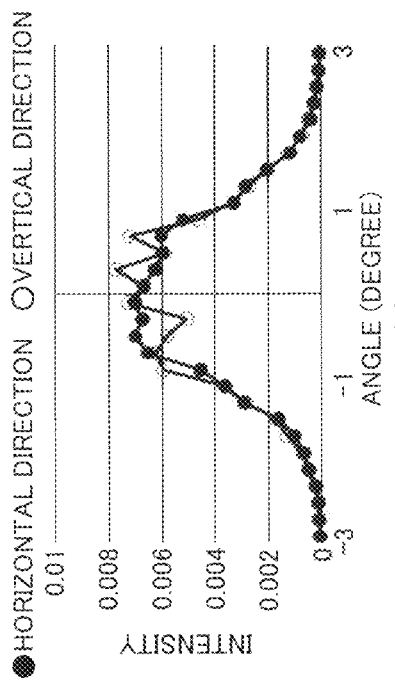
Figure 41A:
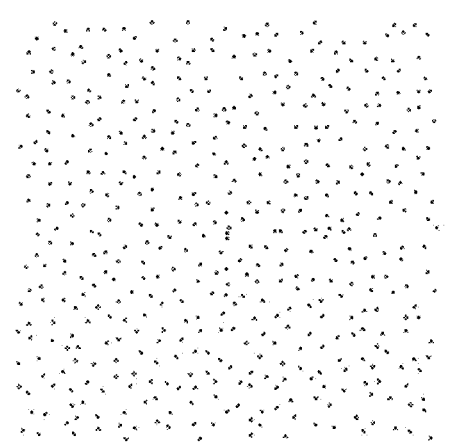

A glass base material of a refractive index of 1.53 is cleaned, a $SiO_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 41A. FIG. 41A illustrates the positions of openings within an area of approximately 1 mm square, where the openings are arranged in a plane so that the direction of basic arrangement is 0°, 15°, 30° and 45° in four regions with a positional irregularity of the value of 25% of the pitch being introduced into a basic arrangement where openings are at a pitch of 50 µm and the positions of the openings form equilateral triangles in the four regions. After patterning of the openings, the $SiO_2$ film is patterned by photolithography and etching, so that holes of two depth values, that is, a depth of 0 nm and a depth of 45 nm relative to a reference depth, are formed. After patterning of the holes, etching of 480 µm is performed with a wet etching liquid that is adjusted so as to cause the ratio of the etching rate of a glass base material to the etching rate of $SiO_2$ to be 10. Accordingly, a curved surface in the concave 12 has a radius of curvature of substantially 480 µm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 41B illustrates a planar shape of the optical device after processing. In FIG. 41B, the depth is illustrated in grayscale, so that the color becomes darker as the depth increases.

Figure 41C:
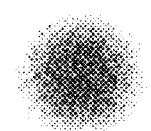

FIG. 41C illustrates a result of calculation of an exiting light distribution in the case where 450 nm light enters this optical device. The calculation is performed by determining the Fourier transform of a phase difference generated from the shape of FIG. 41B. As illustrated in FIG. 41C, the effect of diffraction is reduced, so that the intensity of light caused to exit in a particular direction is reduced. FIG. 41D illustrates a graphical representation of the intensity of the exiting light distribution of FIG. 41C in a horizontal direction, averaged at angular intervals of 0.21°, relative to the degree. As shown in FIG. 41D, the angle of emergence is substantially the same in a horizontal direction and in a vertical direction. Furthermore, in FIG. 41D, light within the range of angles of ±1.25° adds up to 63.3%.

Example 25

Next, a description is given, with reference to FIGS. 42A through 42D, of an optical device according to Example 25.

Figure 42A:
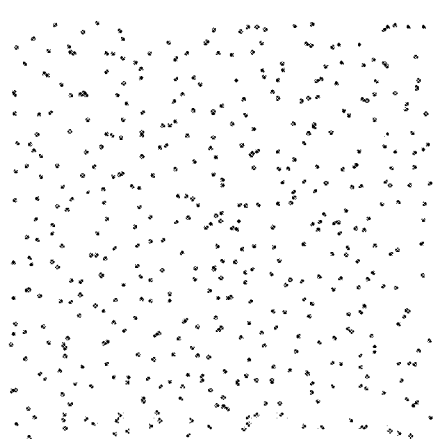
FIGS. 42A through 42D are diagrams for illustrating an optical device of Example 25.
Figure 42B:
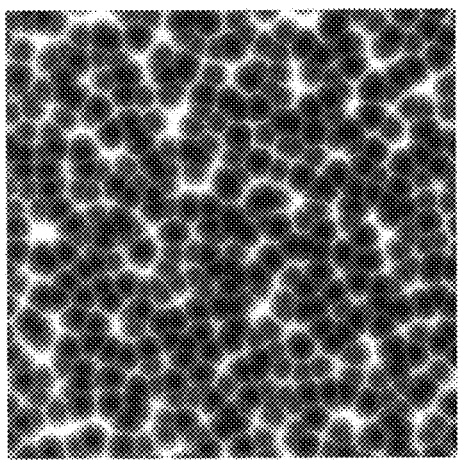

A glass base material of a refractive index of 1.53 is cleaned, a $SiO_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 µm in diameter by photolithography and etching so that the openings are arranged as illustrated in FIG. 42A. FIG. 42A illustrates the positions of openings within an area of approximately 1 mm square, where the openings are arranged in a plane so that the direction of basic arrangement is 0°, 15°, 30° and 45° in four regions with a positional irregularity of the value of 50% of the pitch being introduced into a basic arrangement where openings are at a pitch of 50

μm and the positions of the openings form equilateral triangles in the four regions. After patterning of the openings, the SiO$_2$ film is patterned by photolithography and etching, so that holes of two depth values, that is, a depth of 0 nm and a depth of 45 nm relative to a reference depth, are formed. After patterning of the holes, etching of 480 μm is performed with a wet etching liquid that is adjusted so as to cause the ratio of the etching rate of a glass base material to the etching rate of SiO$_2$ to be 10. Accordingly, a curved surface in the concave 12 has a radius of curvature of substantially 480 μm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 42B illustrates a planar shape of the optical device after processing. In FIG. 42B, the depth is illustrated in grayscale, so that the color becomes darker as the depth increases.

Figure 42C:
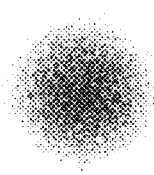
Figure 42D:
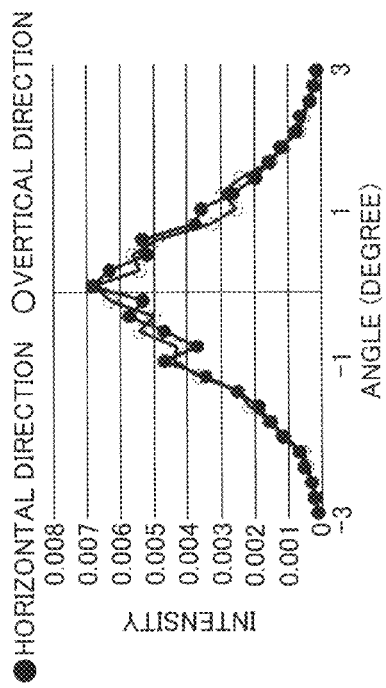

FIG. 42C illustrates a result of calculation of an exiting light distribution in the case where 450 nm light enters this optical device. The calculation is performed by determining the Fourier transform of a phase difference generated from the shape of FIG. 42B. As illustrated in FIG. 42C, the effect of diffraction is reduced, so that the intensity of light caused to exit in a particular direction is reduced. FIG. 42D illustrates a graphical representation of the intensity of the exiting light distribution of FIG. 42C in a horizontal direction, averaged at angular intervals of 0.21°, relative to the degree. As shown in FIG. 42D, the angle of emergence is substantially the same in a horizontal direction and in a vertical direction. Furthermore, in FIG. 42D, light within the range of angles of ±1.25° adds up to 51.5%.

Figure 43A:
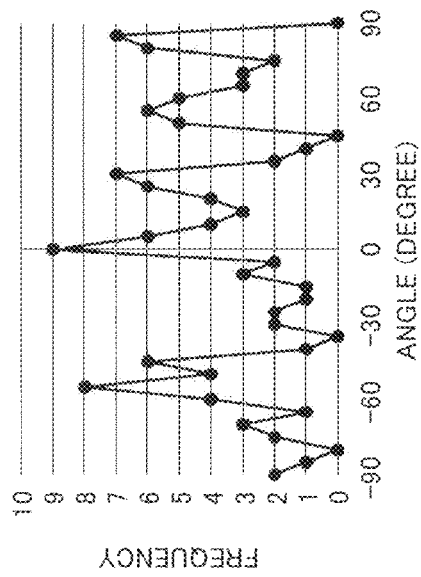
FIGS. 43A through 43D are diagrams for illustrating the optical devices of Examples 22 through 25.
Figure 43B:
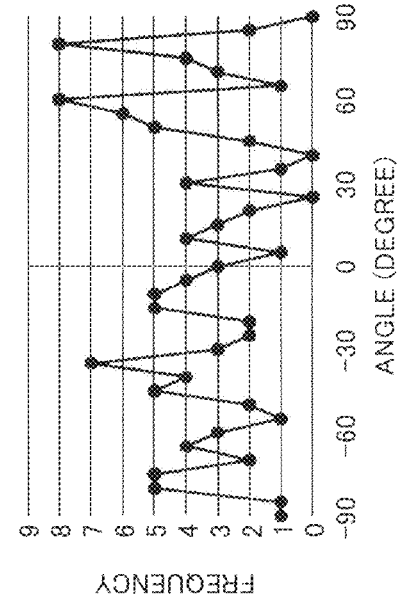
Figure 43C:
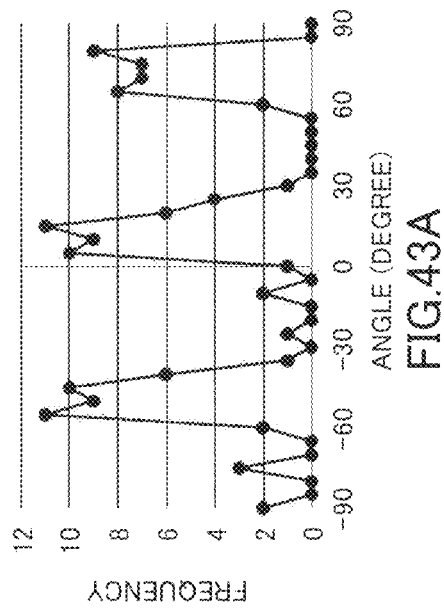
Figure 43D:
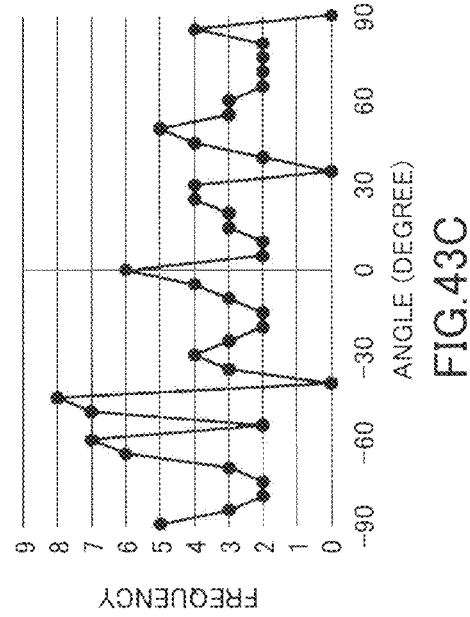

FIGS. 43A through 43D are histograms of the nearest neighboring points of a certain point in respective lower left ones of the four regions into which the opening arrangements of FIGS. 39A, 40A, 41A and 42A in Examples 22, 23, 24 and 25 are divided. Here, the nearest neighboring points of a point refer to the points closest to the point. The histograms are created with directions different from each other by 180° being regarded as the same direction. In Example 22 where an irregularity of 10% is introduced into a regular arrangement, the nearest neighboring points are present in three directions as illustrated in FIG. 43A. Likewise, in Example 23 where an irregularity of 20% is introduced into a regular arrangement, a bottom structure is seen around −35°, 45° and 90° as illustrated in FIG. 43B, so that the nearest neighboring points are found to be present in three directions. Likewise, in Example 24 where an irregularity of 25% is introduced into a regular arrangement, a bottom structure is seen around −40°, 35° and 90° as illustrated in FIG. 43C, so that the nearest neighboring points are found to be present in three directions. In Example 25 where an irregularity of 50% is introduced into a regular arrangement, the nearest neighboring points are not concentrated in a particular direction as illustrated in FIG. 43D.

In the above-described examples, the direction of concentration of the nearest neighboring points is identified by the presence of a bottom structure. Alternatively, because the nearest neighboring points concentrate in six directions, four directions, and three directions when points are arranged to form triangles, quadrangles, and hexagons, respectively, within the range of 0° to 360°, the presence of such concentration may be determined by assuming these values.

Furthermore, the amount of light included in the range of ±1.25° decreases as the value of irregularity increases.

Example 26

Next, a description is given, with reference to FIGS. 44A through 44D, of an optical device according to Example 26.

A glass base material of a refractive index of 1.53 is cleaned, a SiO$_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 μm in diameter by photolithography and etching so that the openings are arranged as illustrated in FIG. 44A. FIG. 44A illustrates the positions of openings within an area of approximately 1 mm square, where the openings are arranged at a pitch of 50 μm in four regions so that the positions of the openings form squares. After patterning of the openings, the SiO$_2$ film is patterned by photolithography and etching, so that holes of two depth values, that is, a depth of 0 nm and a depth of 45 nm relative to a reference depth, are formed. After patterning of the holes, etching of 480 μm is performed with a wet etching liquid that is adjusted so as to cause the ratio of the etching rate of a glass base material to the etching rate of SiO$_2$ to be 10. Accordingly, a curved surface in the concave 12 has a radius of curvature of substantially 480 μm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 44B illustrates a planar shape of the optical device after processing. In FIG. 44B, the depth is illustrated in grayscale, so that the color becomes darker as the depth increases.

FIG. 44C illustrates a result of calculation of an exiting light distribution in the case where 450 nm light enters this optical device. The calculation is performed by determining the Fourier transform of a phase difference generated from the shape of FIG. 44B. As illustrated in FIG. 44C, light caused to exit in a horizontal or vertical direction and light caused to exit in a direction of 45° are different in intensity. FIG. 44D illustrates a graphical representation of the intensity of the exiting light distribution of FIG. 44C in a horizontal direction, averaged at angular intervals of 0.21°, relative to the degree. As shown in FIG. 44D, the angle of emergence differs between a horizontal or vertical direction and a direction of 45°.

Example 27

Next, a description is given, with reference to FIGS. 45A through 45D, of an optical device according to Example 27.

A glass base material of a refractive index of 1.53 is cleaned, a SiO$_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 μm in diameter by photolithography and etching so that the openings are arranged as illustrated in FIG. 45A. FIG. 45A illustrates the positions of openings within an area of approximately 1 mm square, where the openings are arranged in a plane at a pitch of 50 μm in four regions so that the positions of the openings form squares and the direction of basic arrangement is 0°, 22.5°, 45° and 67.5° in the four regions. After patterning of the openings, the SiO$_2$ film is patterned by photolithography and etching, so that holes of two depth values, that is, a depth of 0 nm and a depth of 45 nm relative to a reference depth, are formed. After patterning of the holes, etching of 480 μm is performed with a wet etching liquid that is adjusted so as to cause the ratio of the etching rate of a glass base material to the etching rate of $SiO_2$ to be 10. Accordingly, a curved surface in the concave 12 has a radius of curvature of substantially 480 μm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 45B illustrates a planar shape of the optical device after processing. In FIG. 45B, the depth is illustrated in grayscale, so that the color becomes darker as the depth increases.

FIG. 45C illustrates a result of calculation of an exiting light distribution in the case where 450 nm light enters this optical device. The calculation is performed by determining the Fourier transform of a phase difference generated from the shape of FIG. 45B. As illustrated in FIG. 45C, the effect of diffraction is reduced, so that the intensity of light caused to exit in a particular direction is reduced. FIG. 45D illustrates a graphical representation of the intensity of the exiting light distribution of FIG. 45C in a horizontal direction, averaged at angular intervals of 0.21°, relative to the degree. As shown in FIG. 45D, the angle of emergence is substantially the same in a horizontal or vertical direction and in a direction of 45°.

Example 28

Next, a description is given, with reference to FIGS. 46A through 46D, of an optical device according to Example 28.

A glass base material of a refractive index of 1.53 is cleaned, a $SiO_2$ film of 45 nm in thickness is deposited on the glass base material as a thin film layer, and a molybdenum film of 50 nm in thickness is deposited on the thin film layer as a mask. After deposition of the molybdenum film, a resist is applied, and the mask is patterned with openings of 1 μm in diameter by photolithography and etching so that the openings are arranged as illustrated in FIG. 46A. FIG. 46A illustrates the positions of openings within an area of approximately 1 mm square, where the openings are arranged in a plane at a pitch of 50 μm so that the positions of the openings form squares and the direction of basic arrangement is 0° and 45° in two regions and the openings are arranged in a plane at a pitch of 50 μm so that the positions of the openings form equilateral triangles and the direction of basic arrangement is 0° and 30° in the other two regions. After patterning of the openings, the $SiO_2$ film is patterned by photolithography and etching, so that holes of two depth values, that is, a depth of 0 nm and a depth of 45 nm relative to a reference depth, are formed. After patterning of the holes, etching of 480 μm is performed with a wet etching liquid that is adjusted so as to cause the ratio of the etching rate of a glass base material to the etching rate of $SiO_2$ to be 10. Accordingly, a curved surface in the concave 12 has a radius of curvature of substantially 480 μm, and the distribution range of the positions of the bottoms 13 in a depth direction is 450 nm. Here, the bottoms 13 are disposed so as to be irregularly positioned in the depth direction in order to prevent 75% or more of the bottoms 13 from being disposed at one of the two values (levels) of the distribution range of the positions of the bottoms 13 in the depth direction. FIG. 46B illustrates a planar shape of the optical device after processing. In FIG. 46B, the depth is illustrated in grayscale, so that the color becomes darker as the depth increases.

FIG. 46C illustrates a result of calculation of an exiting light distribution in the case where 450 nm light enters this optical device. The calculation is performed by determining the Fourier transform of a phase difference generated from the shape of FIG. 46B. As illustrated in FIG. 46C, the effect of diffraction is reduced, so that the intensity of light caused to exit in a particular direction is reduced. FIG. 46D illustrates a graphical representation of the intensity of the exiting light distribution of FIG. 46C in a horizontal direction, averaged at angular intervals of 0.21°, relative to the degree. As shown in FIG. 46D, the angle of emergence is substantially the same in a horizontal or vertical direction and in a direction of 45°.

In other respects than those described above, the second embodiment is the same as the first embodiment.

A description is given above of embodiments of the present invention. The present invention, however, is not limited to the above-described embodiments. Optical devices according to embodiments of the present invention may be used for not only projectors but also various apparatuses such as three-dimensional measurement apparatuses. Furthermore, optical devices according to embodiments of the present invention may be used as diffuser plates for illumination, reticles in camera finders, and optical devices for controlling the diffusion state of a projector screen or the like.

[Third Embodiment]

In the case of emitting highly coherent light such as laser light onto a microlens array, diffraction may occur because of the periodicity of the microlens array. When diffraction thus occurs, there occurs a problem in that exiting light becomes discrete so that the uniformity of the intensity of the exiting light is reduced. When such a problem occurs, in a projector in which the microlens array is used, variations may be caused in the brightness, color, etc., of an image to be projected so as to prevent a high-quality image from being obtained.

Therefore, projectors that employ a laser as a light source and use a microlens array are required to be free of variations in brightness, color, etc.

According to a third embodiment, it is possible to obtain projectors that employ a laser as a light source and use a microlens array without variations in brightness, color, etc.

Figure 47:
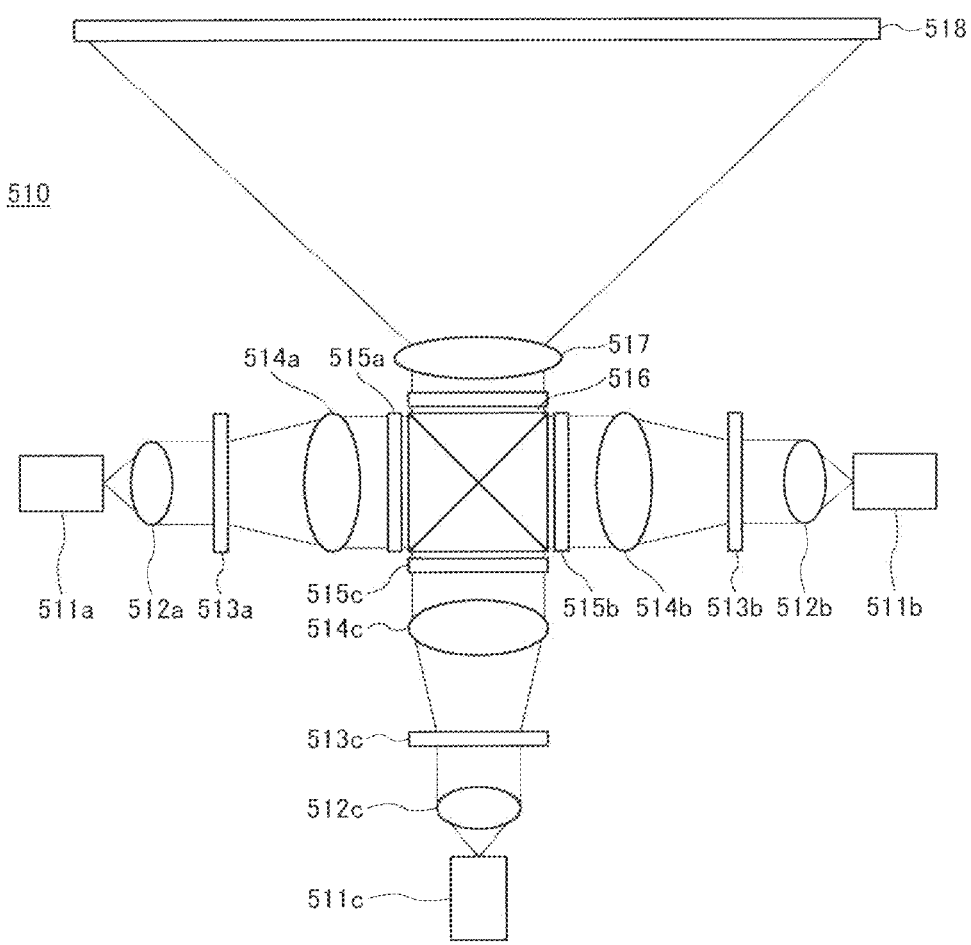
FIG. 47 is a diagram illustrating a structure of a projector according to a third embodiment.

FIG. 47 is a schematic diagram illustrating a projector 510 according to the third embodiment. The projector 510 includes laser light sources 511a, 511b and 511c, lenses 512a, 512b and 512c, microlens arrays 513a, 513b and 513c, lenses 514a, 514b and 514c, spatial light modulators 515a, 515b and 515c, a multiplexing prism 516, and a lens 517. According to this embodiment, laser light or the like emitted from each of the laser light sources 511a, 511b and 511c may be referred to as "beam flux".

The laser light source 511a emits, for example, laser light in a red wavelength region. The laser light emitted from the laser light source 511a has its angle of divergence adjusted by the lens 512a, is diffused by the microlens array 513a, again has its angle of divergence adjusted by the lens 514a, and enters the multiplexing prism 516 through the spatial light modulator 515a. The spatial light modulator 515a, for example, controls whether to transmit light or not pixel by pixel so as to form an image corresponding to a red color.

The laser light source 511b emits, for example, laser light in a green wavelength region. The laser light emitted from the laser light source 511b has its angle of divergence adjusted by the lens 512b, is diffused by the microlens array 513b, again has its angle of divergence adjusted by the lens 514b, and enters the multiplexing prism 516 through the spatial light modulator 515b. The spatial light modulator 515b, for example, controls whether to transmit light or not pixel by pixel so as to form an image corresponding to a green color.

The laser light source 511c emits, for example, laser light in a blue wavelength region. The laser light emitted from the laser light source 511c has its angle of divergence adjusted by the lens 512c, is diffused by the microlens array 513c, again has its angle of divergence adjusted by the lens 514c, and enters the multiplexing prism 516 through the spatial light modulator 515c. The spatial light modulator 515c, for example, controls whether to transmit light or not pixel by pixel so as to form an image corresponding to a blue color.

The laser light from the spatial light modulator 515a, the laser light from the spatial light modulator 515b, and the laser light from the spatial light modulator 515c enter the multiplexing prism 516 to be multiplexed and thereafter exit from the multiplexing prism 516. Thus, a laser beam of the multiplexed laser light exiting from the multiplexing prism 516 is projected onto a screen 518 through the lens 517.

According to this embodiment, various kinds of lasers such as semiconductor lasers and solid-state lasers that generate second harmonic light may be used as the laser light sources 511a, 511b and 511c. Furthermore, the laser light sources 511a, 511b and 511c may individually employ multiple lasers. The laser light sources 511a, 511b and 511c are not limited to lasers, and the exiting windows of optical fibers or the like through which beam fluxes from laser light sources propagate may also be used as equivalents of the laser light sources 511a, 511b and 511c. Furthermore, while a laser is employed for each of the red, green, and blue beam fluxes in FIG. 47, a laser may be employed for at least one of the red, green, and blue light sources. Furthermore, while the microlens arrays 513a, 513b and 513c are employed for all of the red, green, and blue beam fluxes in FIG. 47, a microlens array may be employed for at least one of the red, green, and blue beam fluxes.

As the spatial light modulators 515a, 515b and 515c, a liquid crystal on silicon (LCOS) or a digital mirror device (DMD) may be employed. FIG. 47 illustrates a case where LCOSs are employed. In the case of using a DMD, which is a reflection spatial light modulator, the DMD may be placed at a stage subsequent to the multiplexing prism 516 so that light reflected from the DMD may be projected through the lens 517, instead of employing the transmission-type arrangement as illustrated in FIG. 47.

Figure 48:
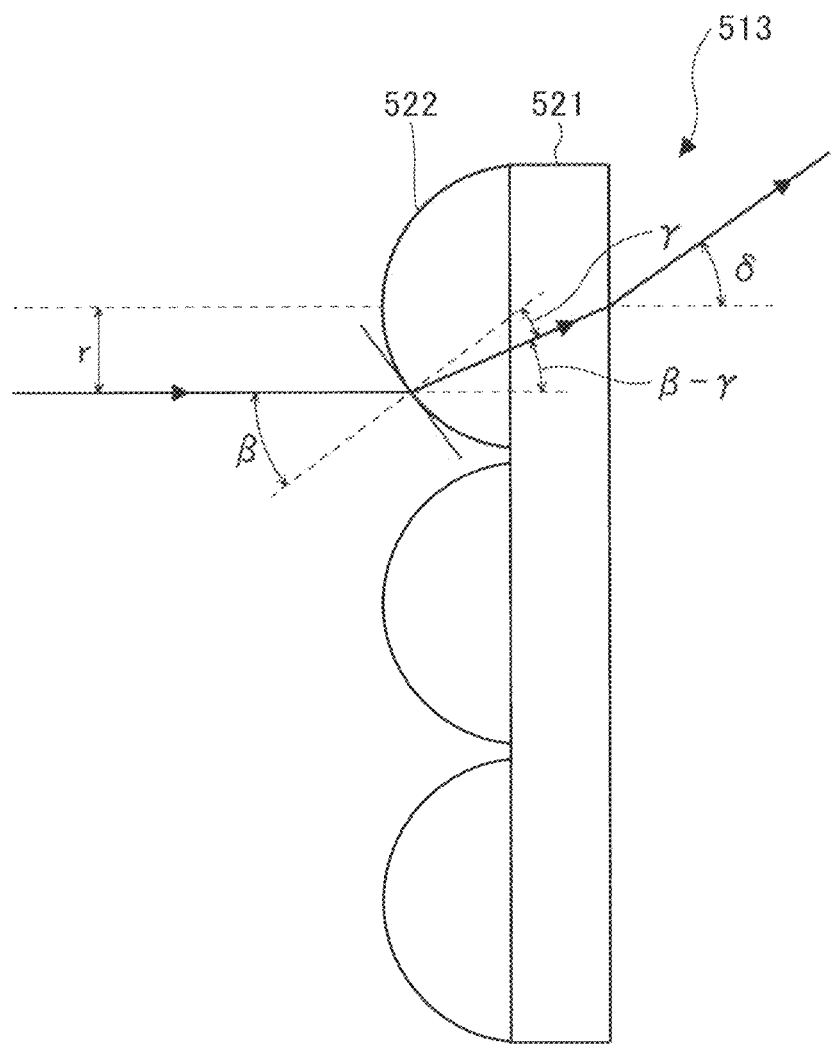
FIG. 48 is an enlarged view of a microlens array according to the third embodiment.

Next, a description is given, with reference to FIG. 48, of the angle of divergence of the microlens arrays 513a, 513b and 513c. Referring to FIG. 48, each of the microlens arrays 513a, 513b and 513c includes a transparent base material 521 having a surface on which multiple lens parts 522 serving as microlenses are formed. In this embodiment, the microlens arrays 513a, 513b and 513c may be collectively referred to as "microlens array 513" and the lens parts 522 may be collectively referred to as "lens part 522." The transparent base material 521 and the lens parts 522 may be formed of either the same material or different materials.

The lens part 522 of the microlens array 513 is formed to have a spherical or aspherical surface shape. A sag value z, which is a displacement in an optical axis direction measured from the top of the lens part 522, may be expressed by:

$$z = \frac{cr^2}{1+\sqrt{1-(1+k)c^2r^2}} + \sum_i \alpha_i r^{2i}, \quad (10)$$

where r is a radius measured from the top of the lens part 522, c is the reciprocal of a radius of curvature R of the lens part 522, k is a conic constant, and $\alpha_i$ (where i is a natural number) is an aspherical coefficient. In particular, when the lens part 522 is formed to have a spherical surface shape, k is zero and $\alpha_i$ is zero, so that z may be expressed by:

$$z = R - \sqrt{R^2 - r^2}. \quad (11)$$

In Eq. (10), an angle of inclination $\beta(r)$ of the lens part 522 at the radius r of the lens part 522 is expressed by:

$$\beta(r) = \arctan\left(\frac{cr}{\sqrt{1-(1+k)c^2r^2}} + \sum_i 2\alpha_i r^{2i-1}\right). \quad (12)$$

When the lens part 522 is formed to have a spherical surface shape, the angle of inclination $\beta(r)$ is expressed by:

$$\beta(r) = \arctan\left(\frac{r}{\sqrt{R^2-r^2}}\right). \quad (13)$$

When light enters the lens part 522 of the microlens array 513 in an optical axis direction, the light is refracted in a direction of $\beta-\gamma$ relative to the optical axis. Letting the refractive index of a material forming the lens part 522 be n, the angle $\gamma$ satisfies $\sin \beta = n \times \sin \gamma$. Next, the light is refracted at a bottom surface of the transparent base material 521 so as to exit in a direction of an angle $\delta$ relative to the optical axis. The angle $\delta$ satisfies $n \times \sin(\beta-\gamma) = \sin \delta$. When an angle of inclination $\beta(r_0)$ at a lens-end radius $r_0$ of the lens part 522 is the maximum of the angle of inclination $\beta(r)$ of the lens part 522, the angle of divergence of the microlens array 513 is expressed by $\delta(r_0)$, and may be expressed, using $\beta$, by:

$$\delta(r_0) = \arcsin(\sin \beta(r_0)\sqrt{n^2-\sin^2\beta(r_0)} - \cos \beta(r_0)\sin \beta(r_0)). \quad (14)$$

When the angle of divergence $\delta(r_0)$ of the microlens array 513 is large, an optical component may become large in size in order to capture a diffused beam flux. Therefore, $\delta(r_0)$ is preferably 10° or less.

Figure 49B:
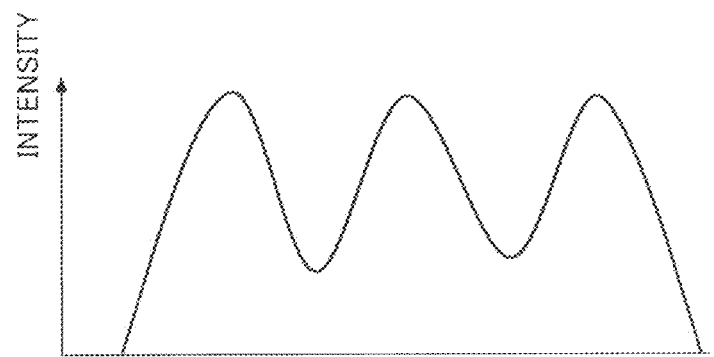
FIGS. 49A and 49B are diagrams for illustrating the microlens array.
Figure 49A:
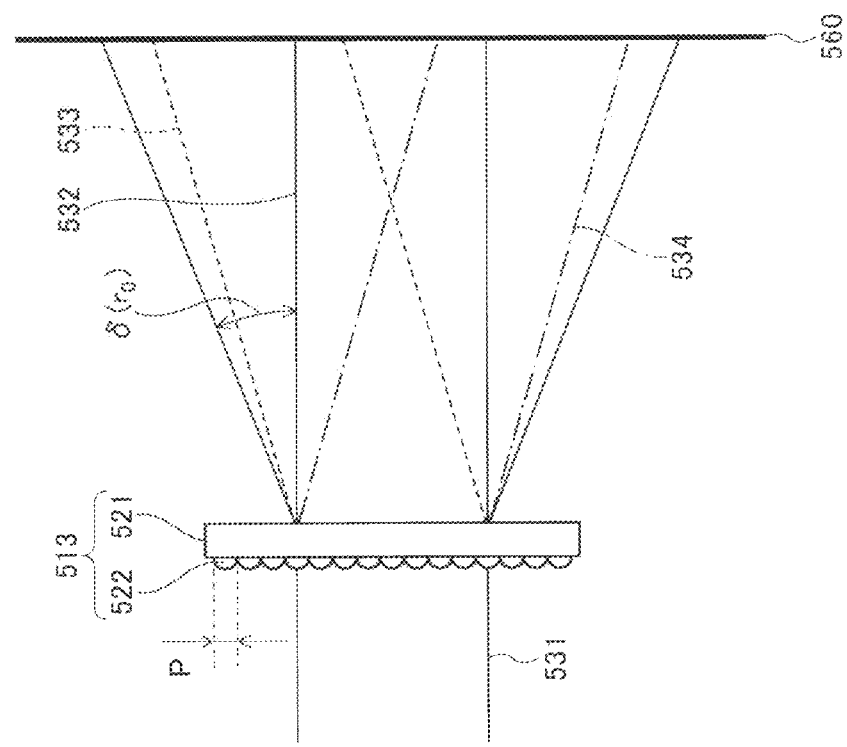

Next, a description is given, with reference to FIGS. 49A and 49B and FIGS. 50A and 50B, of the diffraction effect of the microlens array 513. It is assumed that light of a wavelength $\lambda$ enters the microlens array 513 where the distance between the tops of adjacent lens parts 522 is defined as a lens pitch P. Referring to FIG. 49A, entering light 531 diffused by the lens parts 522 spreads within a range of the angle $\delta(r_0)$, and diffraction occurs because of the periodicity of the microlens array 513 so that the angle of emergence of exiting light has discrete values. At this point, an angle of emergence $\zeta(m)$ of $m^{th}$-order diffracted light satisfies $\sin \zeta = m\lambda/P$. FIG. 49A illustrates the case where zero-order light 532, first-order light 533, and negative first-order light 534 are generated. In such a case, the uniformity of a light intensity distribution on a projection surface 560 is reduced as illustrated in FIG. 49B.

On the other hand, in the case where multiple beams of diffracted light 542 are generated within the angle $\delta(r_0)$ when entering light 541 enters the microlens array 513 as illustrated in FIG. 50A, light projected onto the projection surface 560 becomes uniform as illustrated in FIG. 50B, so that the uniformity of a light intensity distribution is unlikely to be reduced. The diffracted light 542 includes high-order diffracted light. Therefore, the highest order of diffracted light included in a certain direction within the angle $\delta(r_0)$ is preferably second-order or higher (sin $\delta(r_0) > 2\lambda/P$), more preferably, fifth-order or higher (sin $\delta(r_0) > 5\lambda/P$), and still more preferably, tenth-order or higher (sin $\delta(r_0) > 10\lambda/P$).

Furthermore, while the above-described relational expressions may be satisfied by increasing the lens pitch P, the microlens array 513 is required to be small in size relative to a diameter D of the spot of the entering light 541 in order to make the intensity distribution of the entering light 541 uniform. Accordingly, the lens pitch P preferably satisfies P<D/3, more preferably, P<D/5, and still more preferably, P<D/10.

Figure 51:
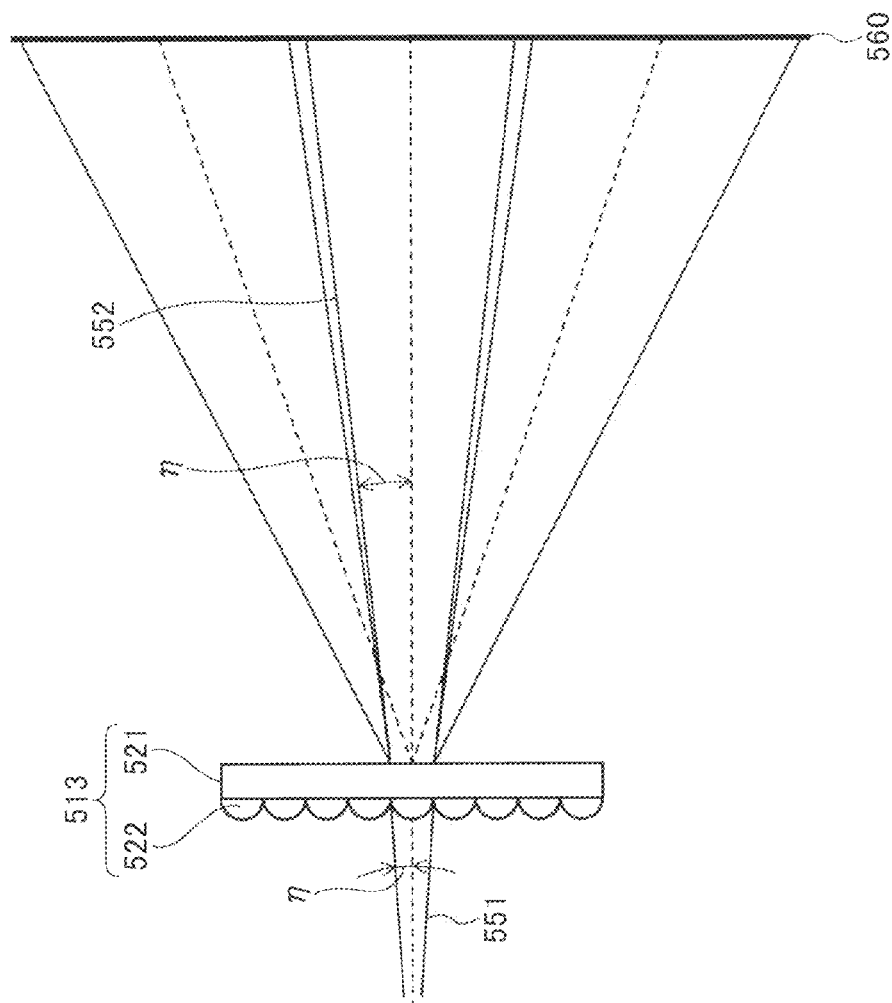
FIG. 51 is a diagram for illustrating the microlens array.

The above description is given of the case where the entering light 541 is parallel light, while entering light is preferably diverging light because in this case, an exiting beam flux has a spread so as to make it possible to make a discrete distribution due to diffraction even. FIG. 51 illustrates such a case where entering light is diverging light. Entering light 551 has a spread angle 1, so that diffracted light 552 as well is projected onto the projection surface 560 with the spread angle η. Accordingly, in such a case, it is possible to evenly illuminate the projection surface 560 with light without occurrence of a deep bottom structure between diffracted beam fluxes, which occurs in the case where parallel light enters as illustrated in FIGS. 49A and 49B. At this point, the spread angle η preferably satisfies sin η>λ/2P because in this case, it is possible to fill in a space between diffracted beam fluxes of adjacent orders. The spread angle η more preferably satisfies sin η>λ/P.

Furthermore, while entering light is explained above as diverging light, the same effect may be produced on a projection surface even when entering light is converging light, if a focus position is in front of the projection surface. In general, light of a uniform intensity distribution is projected onto a spatial light modulator serving as a projection surface. If the focus position of converging light is close to the spatial light modulator, the intensity uniformizing effect produced by providing entering light with the spread angle η is reduced. Accordingly, in the case of employing converging light, the focusing position is preferably located between the microlens array 513 and the middle of the distance between the microlens array 513 and the spatial light modulator. In the following description, it is assumed that light having the spread angle η is either diverging light or converging light.

Next, a description is given, with reference to FIGS. 52A through 54B, of various structures of the microlens array 513 according to this embodiment.

Figure 52A:
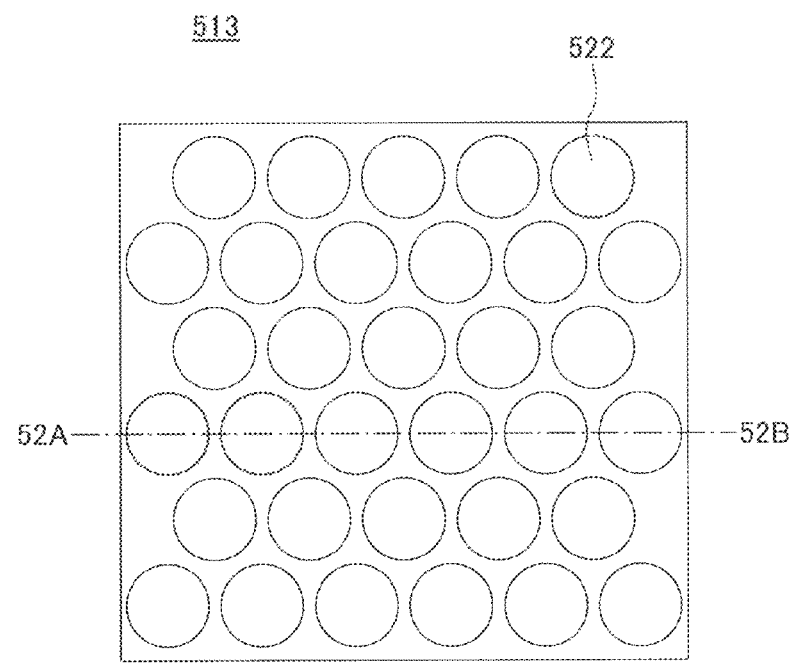
FIGS. 52A and 52B are diagrams illustrating a structure of the microlens array according to the third embodiment.
Figure 52B:
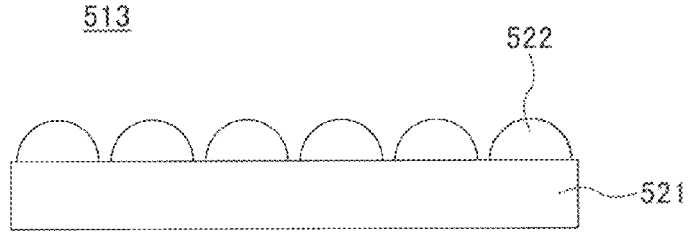

FIG. 52A illustrates a structure of the microlens array 513 where the lens parts 522 are arranged in a staggered manner and are delimited by their respective independent perimeters. FIG. 52B is a cross-sectional view of the microlens array 513, taken along a plane including a one-dot chain line 52A-52B in FIG. 52A.

Figure 53A:
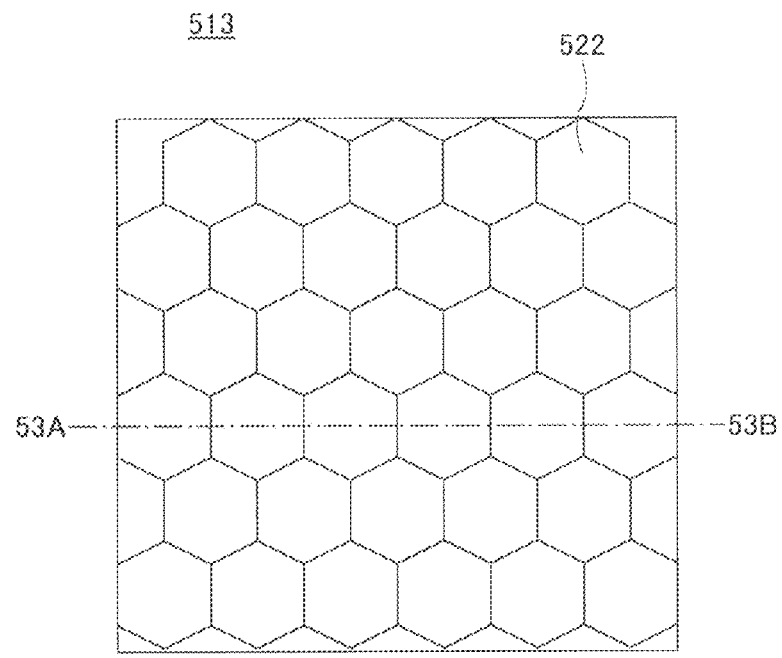
FIGS. 53A and 53B are diagrams illustrating a structure of the microlens array according to the third embodiment.
Figure 53B:
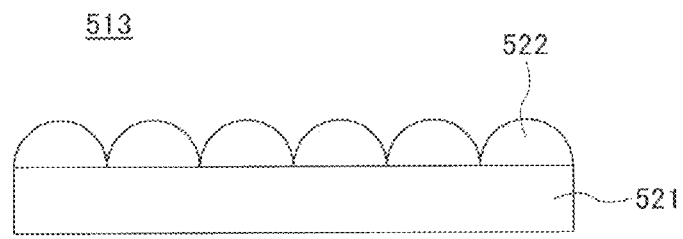

FIG. 53A illustrates a structure of the microlens array 513 where the lens parts 522 are arranged in a staggered manner and are delimited by their respective perimeters, which are shared by adjacent lens parts 522. FIG. 53B is a cross-sectional view of the microlens array 513, taken along a plane including a one-dot chain line 53A-53B in FIG. 53A.

Figure 54A:
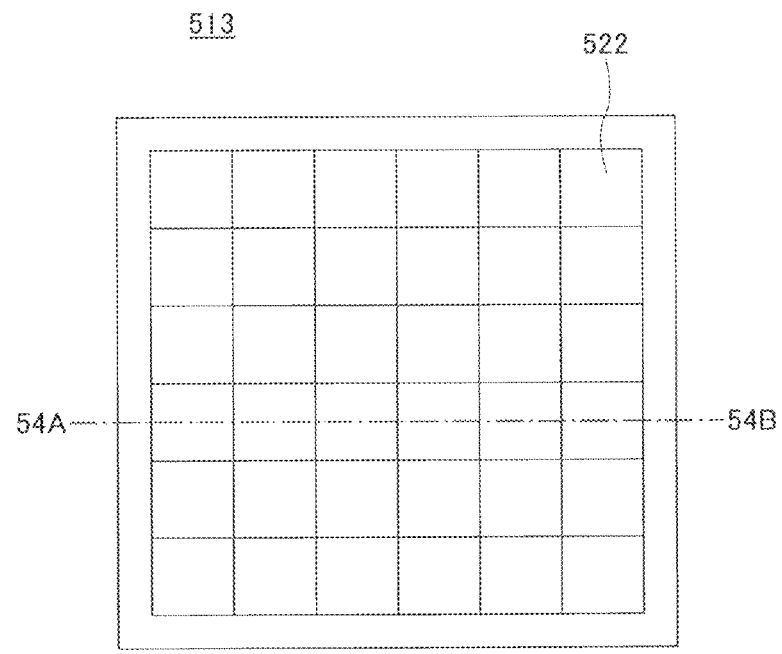
FIGS. 54A and 54B are diagrams illustrating a structure of the microlens array according to the third embodiment.
Figure 54B:
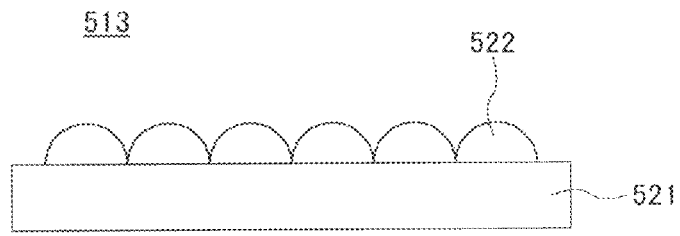

FIG. 54A illustrates a structure of the microlens array 513 where the lens parts 522 are arranged in squares and are delimited by their respective perimeters, which are shared by adjacent lens parts 522. FIG. 54B is a cross-sectional view of the microlens array 513, taken along a plane including a one-dot chain line 54A-54B in FIG. 54A.

The arrangement of the lens parts 522 in the microlens array 513 is not limited to the examples illustrated in FIGS. 52A through 54B, and various shapes may be used for the lens parts 522. For example, the lens part 522 may have not only a convex lens shape but also other shapes such as a concave lens shape.

Furthermore, when the laser light sources 511a, 511b and 511c are employed as light sources as in the projector 510 according to this embodiment, speckle noise may be generated because of scattering. Therefore, the surface roughness of a surface of the microlens array 513 preferably has a smaller value. The surface roughness is preferably 100 nm or less, and more preferably, 10 nm or less in Ra. Furthermore, the microlens array 513 may be temporally displaced, for example, rotated, in order to reduce speckle noise. In the case of rotating the microlens array 513, the microlens array 513 preferably has a disk shape.

Furthermore, when the output of a light source is high so that a beam flux of 10 W or more is emitted onto the microlens array 513, temperature increases in part of the microlens array 513 so as to generate a large temperature distribution in the microlens array 513, so that the microlens array 513 may be broken. In view of such a case, it is preferable to use glass (glass including silicon oxide) as the material of the microlens array 513. In particular, glass having a lower alkaline component content has a smaller coefficient of thermal expansion. Therefore, it is preferable to use low alkali glass or alkali-free glass. Examples of such glass include heat-resistant glass such as Pyrex (registered trademark) glass (a coefficient of linear thermal expansion of $3.3 \times 10^{-6} K^{-1}$) or TEMPAX Float (a coefficient of linear thermal expansion of $3.3 \times 10^{-6} K^{-1}$), glass for liquid crystal substrates, such as AN100 (a coefficient of linear thermal expansion of $3.8 \times 10^{-6} K^{-1}$) or EAGLE-XG (a coefficient of linear thermal expansion of $3.2 \times 10^{-6} K^{-1}$), and fused quartz (a coefficient of linear thermal expansion of $5.5 \times 10^{-7} K^{-1}$). These kinds of glass have a smaller coefficient of linear thermal expansion than soda-lime glass (a coefficient of linear thermal expansion of $8.5$-$9.0 \times 10^{-6} K^{-1}$), and therefore, are less likely to have a stress generated and be broken even when a large temperature distribution is generated. The coefficient of linear thermal expansion is preferably $8.5 \times 10^{-6} K^{-1}$ or less, and more preferably, $5.0 \times 10^{-6} K^{-1}$ or less.

The material of the microlens array 513 may be alkali-free glass that is composed substantially of 65% to 70% of $SiO_2$, 9% to 16% of $Al_2O_3$, 6% to 12% of $B_2O_3$, 0% to 6% of MgO, 0% to 7% of CaO, 1% to 9% of SrO, and 7% to 18% of MgO+CaO+SrO expressed in mol % without substantially containing BaO and has a density of less than 2.6 g/cc and a strain point of 640° C. or higher.

The required heat resistance depends also on the density of energy to which the microlens array 513 is exposed. For example, in the case of illuminating an area of 20 mm square with a 10 W beam flux having a top-hat light amount distribution, the energy density is 25 mW/mm². Considering that laser light sources have high directivity and that the light amount distribution of a beam flux emitted from a laser light source is typically a Gaussian distribution so that the energy density has a high peak value, using a material that satisfies the above-described coefficient of thermal expansion is preferable when the density of energy to which the microlens array 513 is exposed is 25 mW/mm² or higher, more preferable when the density of energy is 75 mW/mm² or higher, and still more preferable when the density of energy is 125 mW/mm² or higher.

Examples of processing methods that may be employed to form the lens parts 522 in the microlens array 513 include injection molding, press forming, imprinting, cutting, dry etching, and wet etching. When the output of a light source is high, it is preferable to employ press forming, dry etching, or wet etching of glass because the material is required to have heat resistance. In particular, in press forming of glass, surface roughness may increase because of cut marks that may be left on a forming mold when forming the forming mold by cutting. Therefore, it is more preferable to employ dry etching or wet etching. In the case of employing dry etching, a resist is first patterned by photolithography and is thereafter heated and softened using a reflow technique so as to be formed to have a spherical surface shape. Thereafter, the lens part 522 may be formed to have a spherical surface shape by performing dry etching. Alternatively, a resist may be formed to have a spherical surface shape by controlling the amount of light to which the resist is exposed, and thereafter, the lens part 522 may be formed to have a spherical surface shape by performing dry etching.

[Fourth Embodiment]

Figure 55:
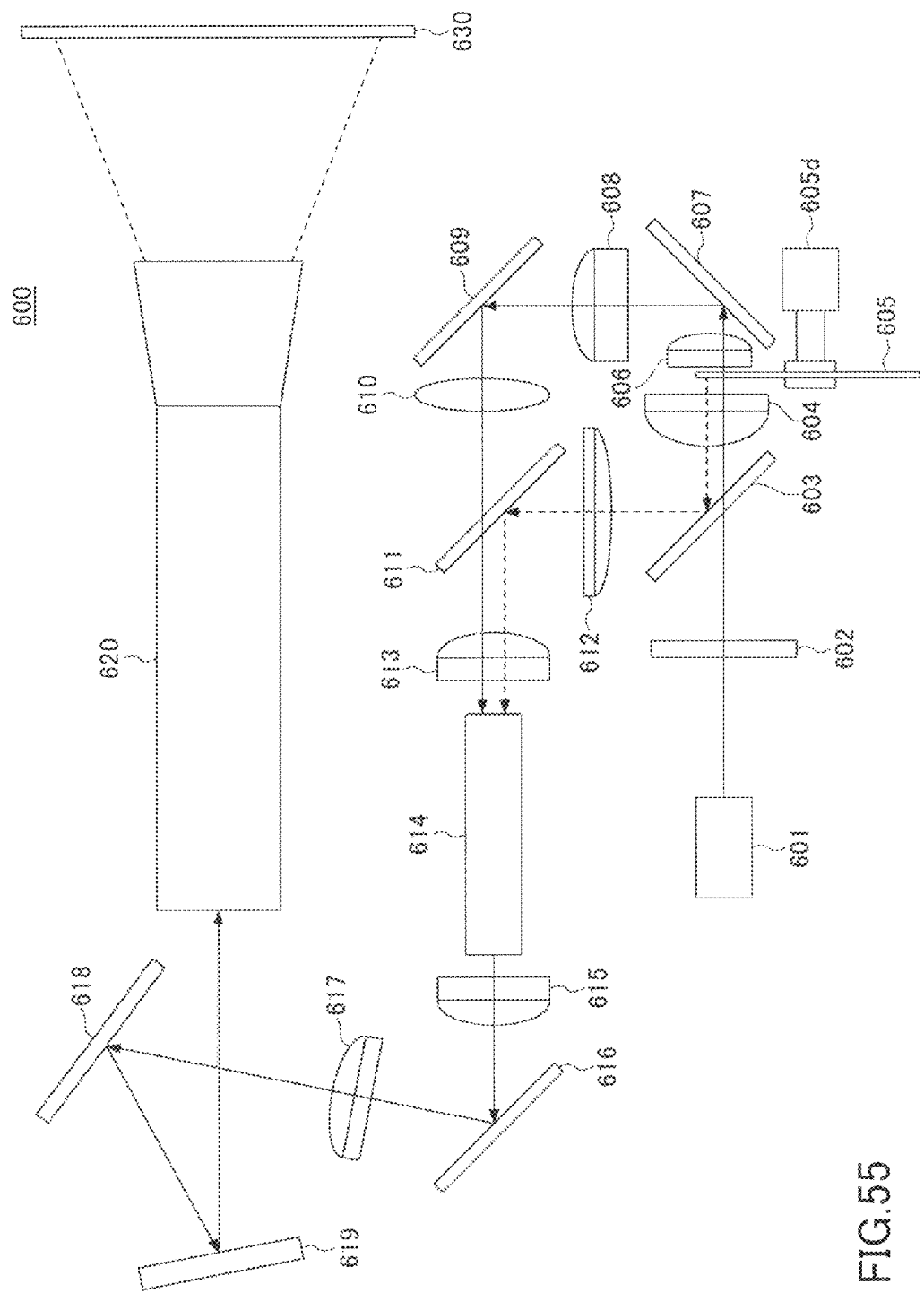
FIG. 55 is a diagram illustrating a structure of a projector according to a fourth embodiment.

Next, a description is given of a fourth embodiment. FIG. 55 is a schematic diagram illustrating a projector 600 according to this embodiment. The projector 600 includes a blue laser light source 601 as a light source. A beam flux emitted from the blue laser light source 601 is transmitted through a first microlens array 602 and a dichroic mirror 603 so as to be incident on a fluorescent wheel 605 through a lens 604. The first microlens array 602 is formed of a microlens array having the same structure as the microlens array 513 according to the third embodiment.

Figure 56:
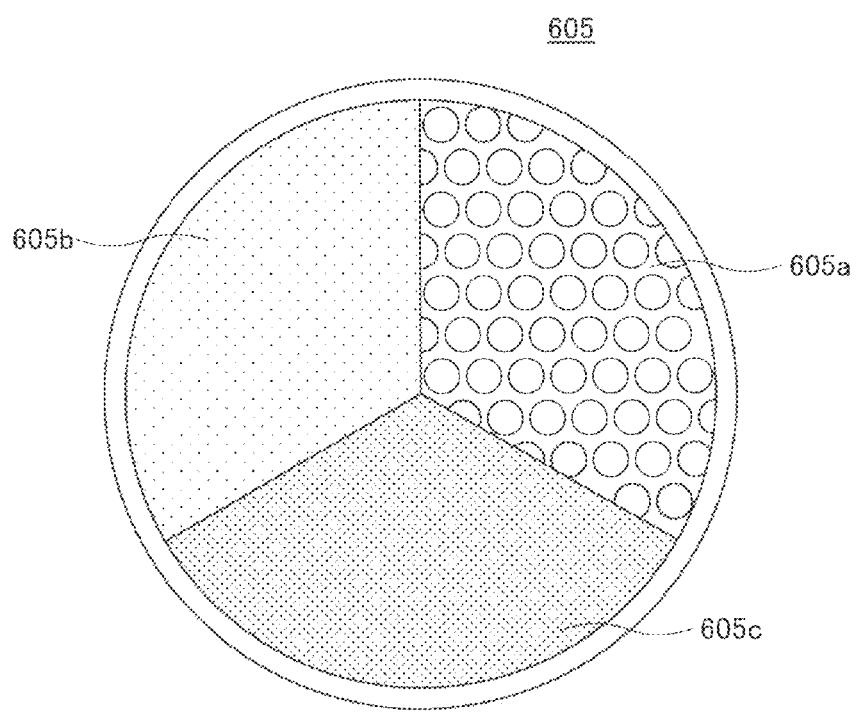
FIG. 56 is a diagram illustrating a fluorescent wheel employed in the projector according to the fourth embodiment.

Referring to FIG. 56, the fluorescent wheel 605 is divided into the three regions of a microlens array region 605a, a green fluorescent substance region 605b, and a red fluorescent substance region 605c. A second microlens array is formed in the microlens array region 605a. The green fluorescent substance region 605b is formed of a fluorescent substance (fluorescent material) that emits green light. The red fluorescent substance region 605c is formed of a fluorescent substance (fluorescent material) that emits red light. The second microlens array in the microlens array region 605a is formed of a microlens array having the same structure as the microlens array 513 according to the third embodiment.

The fluorescent wheel 605 may be rotated by a rotary drive part 605d such as a motor, so that green light is obtained when the laser light from the blue laser light source 601 is emitted onto the green fluorescent substance region 605b and red light is obtained when the laser light from the blue laser light source 601 is emitted onto the red fluorescent substance region 605c. When the laser light from the blue laser light source 601 is emitted onto the microlens array region 605a, the blue light passes through the microlens array region 605a. Accordingly, the fluorescent wheel 605 may emit blue light, green light, and red light in a time division manner by being rotated by the rotary drive part 605d. Referring to FIG. 55, the fluorescent light generated in and emitted from the green fluorescent substance region 605b and the red fluorescent substance region 605c travels in the optical path indicated by a broken line so as to enter a lens 612, and after passing through the lens 612, is reflected by a multiplexing mirror 611 to be incident on an integrator 614 through a lens 613. According to this embodiment, a yellow fluorescent substance region formed of a yellow fluorescent substance may be provided instead of or in addition to the green fluorescent substance region 605b or the red fluorescent substance region 605c in the fluorescent wheel 605.

Examples of oxide or sulfide fluorescent substances that may be employed include YAG fluorescent substances ($Y_3Al_5O_{12}$:Ce and $(Y,Gd)_3Al_5O_{12}$:Ce) and a TAG fluorescent substance ($Tb_3Al_5O_{12}$:Ce) that emit yellow light, and silicate and alkaline-earth fluorescent substances that emit fluorescent light of various colors depending on an added element. Furthermore, α-SiAlONs that emit fluorescent light of various colors depending on an added element, β-SiAlONs (SiAlON:Eu) that emit green fluorescent light, and CASN ($CaAlSi_3N_3$:Eu) that emits red fluorescent light may be employed as nitride fluorescent substances. Furthermore, La oxynitride ($LaAl(Si_6\text{-}zAl_2)N_{10}\text{-}zO_2$:Ce) may be employed as an oxynitride fluorescent substance.

When a blue beam flux is emitted onto the second microlens array in the microlens array region 605a of the fluorescent wheel 605, the blue beam flux is diffused by the second microlens array, and the blue beam flux passing through the second microlens array has its angle of divergence changed by a lens 606. Thereafter, the blue beam flux is reflected by a mirror 607, passes through a lens 608, is reflected by a mirror 609, and passes through a lens 610, the multiplexing mirror 611, and the lens 613 to be incident on the integrator 614.

The blue, green, and red beam fluxes exiting from the integrator 614 pass through a lens 615 and are reflected by a mirror 616 to be incident on a spatial light modulator 619 via a lens 617 and a mirror 618. An image is formed in the spatial light modulator 619, and the formed image is projected onto an external screen 630 through a projection lens 620.

Here, the first microlens array 602 has the function of making uniform the intensity distribution of light emitted onto fluorescent substances in the fluorescent wheel 605. A fluorescent substance in the fluorescent wheel 605 is a mixture of a silicon resin and a fluorescent material, and when exposed to a blue beam flux having a high peak value, suffers, for example, degradation of the silicon resin in a region exposed to the blue beam flux having a high peak value. The first microlens array 602 is used to reduce such degradation. Thus, by using the first microlens array 602, it is possible to achieve a top-hat exiting light distribution instead of a mountain-shaped exiting light distribution by typical diffusers. This reduces the peak value of a beam flux, thus making it possible to expose a fluorescent substance to a beam flux of greater intensity. Furthermore, the second microlens array in the microlens array region 605a of the fluorescent wheel 605 has the function of making a spatial intensity distribution uniform, so that it is possible to increase the uniformity by rotating the fluorescent wheel 605.

The first microlens array 602 and the second microlens array diffract light by being exposed to a beam flux from the blue laser light source 601. It is possible, however, to reduce the effect of the diffraction by designing the shape of the microlens array in the same manner as in the third embodiment.

[Fifth Embodiment]

Figure 57A:
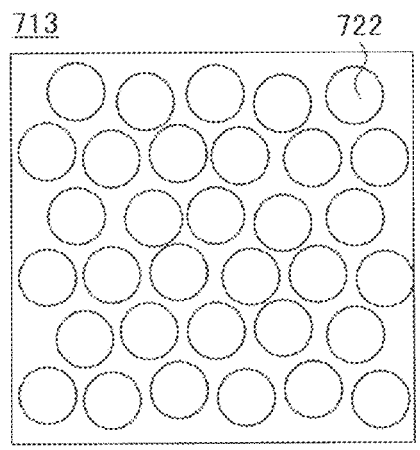
FIGS. 57A and 57B are diagrams illustrating structures of a microlens array according to a fifth embodiment.
Figure 57B:
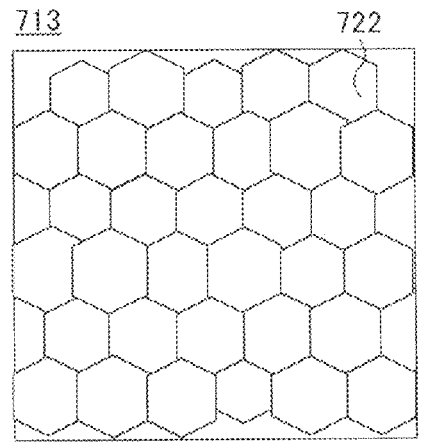

Next, a description is given of a fifth embodiment. According to this embodiment, at least one of the aperture size, radius of curvature, and lens pitch (defined the same as the lens pitch P according to the third embodiment) of a lens part 722 differs between adjacent lens parts 722 in a microlens array 713 as illustrated in FIGS. 57A and 57B. The microlens array 713 is formed of multiple microlenses formed of the lens parts 722.

Thus, according to the fifth embodiment, it is possible to reduce the diffraction effect by introducing irregularity into the arrangement of the lens parts 722 in the microlens array 713. FIGS. 57A and 57B are schematic plan views of the microlens array 713 according to this embodiment. FIG. 57A illustrates a case where irregularity is introduced into the lens pitch in the microlens array 713 where the lens parts 722 are arranged in a staggered manner and are delimited by their respective independent perimeters, so that the lens pitch is prevented from being constant. FIG. 57B illustrates a case where irregularity is introduced into the shape of the lens aperture in the microlens array 713 where the lens parts 722 are arranged in a staggered manner and are delimited by their respective perimeters, which are shared by adjacent lens parts 722.

Introduction of such irregularity makes it possible to reduce the regularity of the lens parts 722 and to reduce the diffraction effect in the microlens array 713. Irregularity may be introduced into a lens pitch, the aperture shape of the lens parts 722, and the aspherical surface shape of the lens parts 722. When the amount of introduced irregularity becomes large, the light amount distribution of exiting light becomes a mountain-shaped distribution the same as in the case of common diffuser plates, and a top-hat distribution is not obtained. For example, when the radius of curvature of the lens parts 722 varies within a range of ±50%, it is possible to significantly reduce the effect of diffraction. In this case, however, letting the reference angle of emergence be 5°, the angle of emergence has a variation of ±2.5°, which is 50% of 5°, so that there is a loss in the amount of light because of generation of a large amount of light exiting at an angle greater than or equal to 5°, which is the reference angle of emergence. Accordingly, in terms of light use efficiency, the introduced irregularity is preferably smaller in amount. The amount of introduced irregularity is preferably ±50% or less, more preferably, ±25% or less, and still more preferably, ±10% or less relative to a reference value. Furthermore, in terms of reducing such an effect of diffraction, at least one of a lens pitch, a lens aperture shape, and a lens aspherical surface shape may differ between adjacent lens parts 722. The microlens array 713 according to this embodiment may be used in place of the microlens array 513 according to the third embodiment and the first micro lens array 602 and the second micro lens array according to the fourth embodiment.

Examples

A quartz substrate having a thickness of 0.5 mm and a refractive index of 1.455 to serve as the transparent base material 521 is cleaned, and thereafter, a resist is applied on the quartz substrate. Thereafter, the resist is patterned by photolithography so that circular resists of 200 μm in diameter are arranged in a staggered manner at the lens pitch P of 202 μm. Thereafter, the resists are reflowed so as to have a spherical surface. The resists having a spherical surface are subjected to dry etching, so that the lens parts 522 having the radius of curvature R of 1000 μm are formed. As a result, the microlens array 513 is formed. The microlens array 513 thus formed is cut into a shape of 20 mm square. The angle of emergence $\beta(r_o)$ of the microlens array 513 having such a lens shape is 2.6°.

Microlens arrays such as the one described above are disposed as the microlens arrays 513a, 513b and 513c in the projector 510 illustrated in FIG. 47. Each of the microlens arrays 513a, 513b and 513c is illuminated with light of 3 mm in diameter, which is sufficiently greater than the lens pitch P of 202 μm. Furthermore, the wavelengths λ of the red, green and blue laser light sources 511a, 511b and 511c are 625 nm, 525 nm, and 450 nm, respectively, so that the λ/P values with respect to the wavelengths λ of red, green and blue colors are 3.1×10$^{-3}$, 2.6×10$^{-3}$, and 2.2×10$^{-3}$, respectively, which are sufficiently smaller than sin $\delta(r_o)$= 4.6×10$^{-2}$. Furthermore, the microlens arrays 513a, 513b and 513c are illuminated with diverging light having the spread angle η of 0.2°. At this point, sin η=3.4×10$^{-3}$, which is greater than the value of ½×λ/P.

Thus, it is possible to reduce the effect of diffraction in a microlens array, so that it is possible to obtain a uniform beam flux.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Optical devices, projectors, and methods of producing an optical device are described above based on one or more embodiments of the present invention. It should be understood, however, that the various changes, substitutions, and alterations could be made hereto without departing from the spirit and scope of the invention.

What is claimed is:

1. A projector, comprising:
a light source that emits laser light; and
a diffuser positioned to receive the laser light from the light source,
wherein the diffuser comprises a base material having a plurality of concave portions forming a surface such that each of the concave portions has a curved surface and that the concave portions have bottoms formed at at least two different bottom positions in a depth direction, the diffuser satisfies 2/7≤|(n1−n2)×Δd|/λ≤10 where n1 is a refractive index of the base material, n2 is a refractive index of a medium around the concave portions, λ is a wavelength of the laser light that enters the base material, and Δd is a range of the bottom positions of the bottoms in the depth direction, and the concave portions of the base material is formed such that a curvature radius at a boundary of two adjacent concave portions is smaller than a curvature radius of each concave portion at the bottom of the concave portion and that the bottoms of the concave portions have irregular positions with respect to a plane of the surface of the base material.

2. The projector as claimed in claim 1, wherein the diffuser transmits light.

3. The projector as claimed in claim 1, wherein the bottoms of the concave portions are each positioned within circles in which the centers of the circles are arranged at predetermined intervals P and the radius of the circles is 0.5×P.

4. The projector as claimed in claim 1, wherein the bottoms of the concave portions are each positioned within circles in which the centers of the circles are arranged at predetermined intervals P and the radius of the circles is 0.25×P.

5. The projector as claimed in claim 3, wherein the centers of the circles are arranged such that when the closest adjacent centers are connected by line segments, the line segments form equilateral triangles.

6. The projector as claimed in claim 3, wherein the predetermined interval P is 50 μm or more.

7. The projector as claimed in claim 1, wherein at least part of the concave portions further comprise a flat surface at the bottom of the concave portion.

8. The projector as claimed in claim 7, wherein the flat surfaces of the at least part of the concave portions have two or more different sizes.

9. The projector as claimed in claim 1, wherein the diffuser satisfies $2/7 \leq |(n1-n2) \times \Delta d|/\lambda \leq 2$.

10. The projector as claimed in claim 1, wherein the diffuser satisfies $2/7 \leq |(n1-n2) \times \Delta z_{avg}|/\lambda$, wherein $\Delta z_{avg}$ is an average of a difference of height of the bottom of each concave portion and the height of the boundary between the concave portion and adjacent concave portions.

11. The projector as claimed in claim 10, wherein the diffuser satisfies $1/2 \leq (n1-n2) \times \Delta z_{avg}|/\lambda$.

12. The projector as claimed in claim 10, wherein the diffuser satisfies $3/4 \leq |(n1-n2) \times \Delta z_{avg}|/\lambda$.

13. A projector, comprising:
a light source that emits laser light; and
a diffuser positioned to receive the laser light from the light source,
wherein the diffuser comprises a base material having a plurality of convex portions forming a surface such that each of the convex portions has a curved surface and that the convex portions have tops formed at at least two different top positions in a height direction, the diffuser satisfies $2/7 \leq |(n1-n2) \times \Delta d|/\lambda \leq 10$ is satisfied where n1 is a refractive index of the base material, n2 is a refractive index of a medium around the convex portions, $\lambda$ is a wavelength of the laser light that enters the base material, and $\Delta d$ is a range of the top positions of the tops in the height direction, and the convex portions of the base material is formed such that a curvature radius at a boundary of two adjacent convex portions is smaller than a curvature radius of each convex portion at the top of the convex portion and that the tops of the convex portions have irregular positions with respect to a plane of the surface of the base material.

14. The projector as claimed in claim 13, wherein the diffuser transmits light.

15. The projector as claimed in claim 13, wherein the tops of the convex portions are each positioned within circles in which the centers of the circles are arranged at predetermined intervals P and the radius of the circles is 0.5×P.

16. The projector as claimed in claim 13, wherein the tops of the convex portions are each positioned within circles in which the centers of the circles are arranged at predetermined intervals P and the radius of the circles is 0.25×P.

17. The projector as claimed in claim 15, wherein the centers of the circles are arranged such that when the closest adjacent centers are connected by line segments, the line segments form equilateral triangles.

18. The projector as claimed in claim 15, wherein the predetermined interval P is 50 μm or more.

19. The projector as claimed in claim 13, wherein at least part of the convex portions further comprise a flat surface at the top of the convex portion.

20. The projector as claimed in claim 19, wherein the flat surfaces of the at least part of the convex portions have two or more different sizes.

21. The projector as claimed in claim 13, wherein the diffuser satisfies $2/7 \leq |(n1-n2) \times \Delta d|/\lambda \leq 2$.

22. The projector as claimed in claim 13, wherein the diffuser satisfies $2/7 \leq |(n1-n2) \times \Delta z_{avg} V|/\lambda$, wherein $\Delta z_{avg}$ is an average of a difference of height of the top of each convex portion and the height of the boundary between the convex portion and adjacent convex portions.

23. The projector as claimed in claim 22, wherein the diffuser satisfies $1/2 \leq |(n1-n2) \times \Delta z_{avg}|/\lambda$.

24. The projector as claimed in claim 22, wherein the diffuser satisfies $3/4 \leq |(n1-n2) \times \Delta z_{avg}|/\lambda$.

\* \* \* \* \*